(12) United States Patent  (10) Patent No.: US 7,904,194 B2
Brown et al.  (45) Date of Patent: Mar. 8, 2011

(54) EVENT MANAGEMENT SYSTEMS AND METHODS FOR MOTION CONTROL SYSTEMS

(75) Inventors: David W. Brown, Bingen, WA (US); Skylar Stein, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 0 days.

(21) Appl. No.: 11/728,801

(22) Filed: Mar. 26, 2007

(65) Prior Publication Data
US 2010/0131079 A1 May 27, 2010

Related U.S. Application Data

(63) Continuation of application No. 11/368,231, filed on Mar. 3, 2006, now abandoned, and a continuation-in-part of application No. 10/074,577, filed on Feb. 11, 2002, now Pat. No. 7,031,798.

(60) Provisional application No. 60/658,746, filed on Mar. 3, 2005, provisional application No. 60/267,645, filed on Feb. 9, 2001.

(51) Int. Cl.
*G06F 19/00* (2006.01)
(52) U.S. Cl. ........................................ 700/174; 700/245
(58) Field of Classification Search ................ 700/8–17, 700/28–31, 44, 45, 47, 48, 83, 159, 169, 700/170, 173–180, 195, 245, 250–257, 264
See application file for complete search history.

(56) References Cited

U.S. PATENT DOCUMENTS

| 4,078,195 | A | 3/1978 | Mathias et al. |
| 4,159,417 | A | 6/1979 | Rubincam |
| 4,199,814 | A | 4/1980 | Rapp et al. |
| 4,418,381 | A | 11/1983 | Molusis et al. |
| 4,422,150 | A | 12/1983 | Keller et al. |
| 4,444,061 | A | 4/1984 | Mathias |
| 4,494,060 | A | 1/1985 | Chitayat et al. |
| 4,531,182 | A | 7/1985 | Hyatt |
| 4,563,906 | A | 1/1986 | Mathias |
| 4,688,195 | A | 8/1987 | Thompson et al. |
| 4,713,808 | A | 12/1987 | Gaskill et al. |
| 4,716,458 | A | 12/1987 | Heitzman et al. |
| 4,750,888 | A | 6/1988 | Allard et al. |
| 4,767,334 | A | 8/1988 | Thorne et al. |
| 4,769,771 | A | 9/1988 | Lippmann et al. |

(Continued)

FOREIGN PATENT DOCUMENTS

CA 2222235 12/1996

(Continued)

OTHER PUBLICATIONS

Precision Microcontrol; "Precision MicroControl Product Guide", Date Unknown, pp. 11, 27-28.

(Continued)

*Primary Examiner* — M. N. Von Buhr
(74) *Attorney, Agent, or Firm* — Michael R. Schacht; Schacht Law Office, Inc.

(57) ABSTRACT

A motion control system comprising a machine platform, at least one event destination, and an event handler. The machine platform carries out automated tasks and generates events. The event handler is configurable to receive at least one event from the machine platform and send the at least one event to the at least one event destination.

30 Claims, 14 Drawing Sheets

U.S. PATENT DOCUMENTS

| | | | |
|---|---|---|---|
| 4,782,444 A | 11/1988 | Munshi et al. | |
| 4,800,521 A | 1/1989 | Carter et al. | |
| 4,809,335 A | 2/1989 | Rumsey | |
| 4,815,011 A | 3/1989 | Mizuno et al. | |
| 4,829,219 A | 5/1989 | Penkar | |
| 4,829,419 A | 5/1989 | Hyatt | |
| 4,840,602 A | 6/1989 | Rose | |
| 4,843,566 A | 6/1989 | Gordon et al. | |
| 4,846,693 A | 7/1989 | Baer | |
| 4,852,047 A | 7/1989 | Lavallee et al. | |
| 4,853,877 A | 8/1989 | Parkhurst et al. | |
| 4,855,725 A | 8/1989 | Fernandez | |
| 4,857,030 A | 8/1989 | Rose | |
| 4,868,474 A | 9/1989 | Lancraft et al. | |
| 4,887,966 A | 12/1989 | Gellerman | |
| 4,897,835 A | 1/1990 | Gaskill et al. | |
| 4,901,218 A | 2/1990 | Cornwell | |
| 4,912,650 A | 3/1990 | Tanaka et al. | |
| 4,923,428 A | 5/1990 | Curran | |
| 4,937,737 A | 6/1990 | Schwane et al. | |
| 4,937,759 A | 6/1990 | Vold | |
| 4,987,537 A | 1/1991 | Kawata | |
| 5,005,134 A | 4/1991 | Nakashima et al. | |
| 5,005,135 A | 4/1991 | Morser et al. | |
| 5,014,208 A | 5/1991 | Wolfson | |
| 5,020,021 A | 5/1991 | Kaji et al. | |
| 5,025,385 A | 6/1991 | Froyd | |
| 5,095,445 A | 3/1992 | Sekiguchi | |
| 5,119,318 A | 6/1992 | Paradies | |
| 5,120,065 A | 6/1992 | Driscoll et al. | |
| 5,126,932 A | 6/1992 | Wolfson et al. | |
| 5,162,986 A | 11/1992 | Graber et al. | |
| 5,168,441 A | 12/1992 | Onarheim et al. | |
| 5,175,684 A | 12/1992 | Chong | |
| 5,175,817 A | 12/1992 | Adams et al. | |
| 5,175,856 A | 12/1992 | Van Dyke et al. | |
| 5,204,599 A | 4/1993 | Hohn | |
| 5,230,049 A | 7/1993 | Chang et al. | |
| 5,245,703 A | 9/1993 | Hubert | |
| 5,247,650 A | 9/1993 | Judd et al. | |
| 5,287,199 A | 2/1994 | Zoccolillo | |
| 5,291,416 A | 3/1994 | Hutchins | |
| 5,309,351 A | 5/1994 | McCain et al. | |
| 5,329,381 A | 7/1994 | Payne | |
| 5,341,451 A | 8/1994 | Latte et al. | |
| 5,368,484 A | 11/1994 | Copperman et al. | |
| 5,377,258 A | 12/1994 | Bro | |
| 5,382,026 A | 1/1995 | Harvard et al. | |
| 5,390,304 A | 2/1995 | Leach et al. | |
| 5,390,330 A | 2/1995 | Talati | |
| 5,392,207 A | 2/1995 | Wilson et al. | |
| 5,392,382 A | 2/1995 | Schoppers | |
| 5,400,345 A | 3/1995 | Ryan, Jr. | |
| 5,402,518 A | 3/1995 | Lowery | |
| 5,405,152 A | 4/1995 | Katanics et al. | |
| 5,412,757 A | 5/1995 | Endo | |
| 5,413,355 A | 5/1995 | Gonzalez | |
| 5,417,210 A | 5/1995 | Funda et al. | |
| 5,418,964 A | 5/1995 | Conner et al. | |
| 5,438,529 A | 8/1995 | Rosenberg et al. | |
| 5,450,079 A | 9/1995 | Dunaway | |
| 5,453,933 A | 9/1995 | Wright et al. | |
| 5,459,382 A | 10/1995 | Jacobus et al. | |
| 5,465,215 A | 11/1995 | Strickland et al. | |
| 5,483,440 A | 1/1996 | Aono et al. | |
| 5,485,545 A | 1/1996 | Kojima et al. | |
| 5,485,620 A | 1/1996 | Sadre et al. | |
| 5,491,813 A | 2/1996 | Bondy et al. | |
| 5,493,281 A | 2/1996 | Owens | |
| 5,511,147 A | 4/1996 | Abdel-Malek | |
| 5,541,838 A | 7/1996 | Koyama et al. | |
| 5,566,278 A | 10/1996 | Patel et al. | |
| 5,566,346 A | 10/1996 | Andert et al. | |
| 5,576,727 A | 11/1996 | Rosenberg et al. | |
| 5,577,253 A | 11/1996 | Blickstein | |
| 5,596,994 A | 1/1997 | Bro | |
| 5,600,373 A | 2/1997 | Chui et al. | |
| 5,604,843 A | 2/1997 | Shaw et al. | |
| 5,607,336 A | 3/1997 | Lebensfeld et al. | |
| 5,608,894 A | 3/1997 | Kawakami et al. | |
| 5,613,117 A | 3/1997 | Davidson et al. | |
| 5,617,528 A | 4/1997 | Stechmann et al. | |
| 5,618,179 A | 4/1997 | Copperman et al. | |
| 5,623,582 A | 4/1997 | Rosenberg | |
| 5,625,820 A | 4/1997 | Hermsmeier et al. | |
| 5,625,821 A * | 4/1997 | Record et al. | 718/100 |
| 5,636,994 A | 6/1997 | Tong | |
| 5,652,866 A | 7/1997 | Aldred et al. | |
| 5,655,945 A | 8/1997 | Jani | |
| 5,659,753 A | 8/1997 | Murphy et al. | |
| 5,666,161 A | 9/1997 | Kohiyama et al. | |
| 5,666,264 A | 9/1997 | Chandler et al. | |
| 5,670,992 A | 9/1997 | Yasuhara et al. | |
| 5,691,897 A | 11/1997 | Brown et al. | |
| 5,691,898 A | 11/1997 | Rosenberg et al. | |
| 5,692,195 A | 11/1997 | Conner et al. | |
| 5,701,140 A | 12/1997 | Rosenberg et al. | |
| 5,704,837 A | 1/1998 | Iwasaki et al. | |
| 5,707,289 A | 1/1998 | Watanabe et al. | |
| 5,724,074 A | 3/1998 | Chainani et al. | |
| 5,733,131 A | 3/1998 | Park | |
| 5,734,373 A | 3/1998 | Rosenberg et al. | |
| 5,737,523 A | 4/1998 | Callaghan et al. | |
| 5,739,811 A | 4/1998 | Rosenberg et al. | |
| 5,746,602 A | 5/1998 | Kikinis | |
| 5,752,880 A | 5/1998 | Gabai et al. | |
| 5,754,855 A * | 5/1998 | Miller et al. | 718/106 |
| 5,764,155 A | 6/1998 | Kertesz et al. | |
| 5,766,077 A | 6/1998 | Hongo | |
| 5,772,504 A | 6/1998 | Machiguchi | |
| 5,790,178 A | 8/1998 | Shibata et al. | |
| 5,800,268 A | 9/1998 | Molnick | |
| 5,801,946 A | 9/1998 | Nissen et al. | |
| 5,802,365 A | 9/1998 | Kathail et al. | |
| 5,805,442 A | 9/1998 | Crater et al. | |
| 5,805,785 A * | 9/1998 | Dias et al. | 714/4 |
| 5,818,537 A | 10/1998 | Enokida et al. | |
| 5,821,920 A | 10/1998 | Rosenberg et al. | |
| 5,821,987 A | 10/1998 | Larson | |
| 5,822,207 A | 10/1998 | Hazama et al. | |
| 5,825,308 A | 10/1998 | Rosenberg | |
| 5,825,361 A | 10/1998 | Rubin et al. | |
| 5,828,575 A | 10/1998 | Sakai | |
| 5,832,189 A | 11/1998 | Tow | |
| 5,836,014 A | 11/1998 | Faiman, Jr. | |
| 5,846,132 A | 12/1998 | Junkin | |
| 5,848,415 A | 12/1998 | Guck | |
| 5,852,441 A | 12/1998 | Nakajima et al. | |
| 5,855,483 A | 1/1999 | Collins et al. | |
| 5,867,385 A * | 2/1999 | Brown et al. | 700/56 |
| 5,873,765 A | 2/1999 | Rifkin et al. | |
| 5,889,670 A | 3/1999 | Schuler et al. | |
| 5,889,672 A | 3/1999 | Schuler et al. | |
| 5,889,924 A | 3/1999 | Okabayashi et al. | |
| 5,890,963 A | 4/1999 | Yen | |
| 5,907,704 A | 5/1999 | Gudmundson et al. | |
| 5,907,831 A | 5/1999 | Lotvin et al. | |
| 5,914,876 A | 6/1999 | Hirai | |
| 5,917,840 A | 6/1999 | Cheney et al. | |
| 5,920,476 A | 7/1999 | Hennessey et al. | |
| 5,921,780 A | 7/1999 | Myers | |
| 5,924,013 A | 7/1999 | Guido et al. | |
| 5,926,389 A | 7/1999 | Trounson | |
| 5,942,869 A | 8/1999 | Katou et al. | |
| 5,956,484 A | 9/1999 | Rosenberg et al. | |
| 5,959,613 A | 9/1999 | Rosenberg et al. | |
| 5,960,085 A | 9/1999 | de la Huerga | |
| 5,960,168 A | 9/1999 | Shaw et al. | |
| 5,977,951 A | 11/1999 | Danieli et al. | |
| 5,984,499 A | 11/1999 | Nourse et al. | |
| 5,991,528 A | 11/1999 | Taylor et al. | |
| 5,999,964 A | 12/1999 | Murakata et al. | |
| 6,012,961 A | 1/2000 | Sharpe, III et al. | |
| 6,020,876 A | 2/2000 | Rosenberg et al. | |
| 6,028,593 A | 2/2000 | Rosenberg et al. | |
| 6,031,973 A * | 2/2000 | Gomi et al. | 700/245 |
| 6,038,493 A | 3/2000 | Tow | |

| | | | | | | |
|---|---|---|---|---|---|---|
| 6,038,603 | A | 3/2000 | Joseph | 6,421,341 | B1 | 7/2002 | Han et al. |
| 6,046,727 | A | 4/2000 | Rosenberg et al. | 6,425,118 | B1 | 7/2002 | Molloy et al. |
| 6,055,579 | A | 4/2000 | Goyal et al. | 6,430,471 | B1 | 8/2002 | Kintou et al. |
| 6,057,828 | A | 5/2000 | Rosenberg et al. | 6,439,956 | B1 | 8/2002 | Ho |
| 6,061,004 | A | 5/2000 | Rosenberg | 6,442,451 | B1 * | 8/2002 | Lapham ................... 700/245 |
| 6,065,365 | A | 5/2000 | Ostler et al. | 6,463,404 | B1 | 10/2002 | Appleby |
| 6,070,010 | A | 5/2000 | Keenleyside et al. | 6,470,235 | B2 | 10/2002 | Kasuga et al. |
| 6,078,308 | A | 6/2000 | Rosenberg et al. | 6,470,377 | B1 | 10/2002 | Sevcik et al. |
| 6,078,747 | A | 6/2000 | Jewitt | 6,473,824 | B1 | 10/2002 | Kreissig et al. |
| 6,078,968 | A | 6/2000 | Lo et al. | 6,480,896 | B1 | 11/2002 | Brown et al. |
| 6,080,063 | A | 6/2000 | Khosla | 6,497,606 | B2 | 12/2002 | Fong et al. |
| 6,083,104 | A | 7/2000 | Choi | 6,513,058 | B2 | 1/2003 | Brown et al. |
| 6,090,156 | A | 7/2000 | MacLeod | 6,516,236 | B1 | 2/2003 | Brown et al. |
| 6,100,874 | A | 8/2000 | Schena et al. | 6,518,980 | B1 | 2/2003 | DeMotte et al. |
| 6,101,425 | A | 8/2000 | Govindaraj et al. | 6,519,594 | B1 | 2/2003 | Li |
| 6,101,530 | A | 8/2000 | Rosenberg et al. | 6,519,646 | B1 | 2/2003 | Gupta et al. |
| 6,104,158 | A | 8/2000 | Jacobus et al. | 6,523,171 | B1 | 2/2003 | Dupuy et al. |
| 6,125,385 | A | 9/2000 | Wies et al. | 6,528,963 | B1 | 3/2003 | Hong |
| 6,128,006 | A | 10/2000 | Rosenberg et al. | 6,542,925 | B2 | 4/2003 | Brown et al. |
| 6,131,097 | A | 10/2000 | Peurach et al. | 6,546,436 | B1 | 4/2003 | Fainmesser et al. |
| 6,133,867 | A | 10/2000 | Eberwine et al. | 6,559,860 | B1 | 5/2003 | Hamilton et al. |
| 6,139,177 | A | 10/2000 | Venkatraman et al. | 6,560,513 | B2 | 5/2003 | Krause et al. |
| 6,144,895 | A | 11/2000 | Govindaraj et al. | 6,560,592 | B1 | 5/2003 | Reid et al. |
| 6,147,647 | A | 11/2000 | Tassoudji et al. | 6,571,141 | B1 * | 5/2003 | Brown ......................... 700/86 |
| 6,161,126 | A | 12/2000 | Wies et al. | 6,606,665 | B2 | 8/2003 | Govindaraj et al. |
| 6,166,723 | A | 12/2000 | Schena et al. | 6,615,091 | B1 | 9/2003 | Birchenough et al. |
| 6,167,491 | A | 12/2000 | McAlpine | 6,647,328 | B2 | 11/2003 | Walker |
| 6,169,540 | B1 | 1/2001 | Rosenberg et al. | 6,652,378 | B2 | 11/2003 | Cannon et al. |
| 6,173,316 | B1 | 1/2001 | De Boor et al. | 6,658,325 | B2 | 12/2003 | Zweig |
| 6,191,774 | B1 | 2/2001 | Schena et al. | 6,658,627 | B1 | 12/2003 | Gallup et al. |
| 6,195,592 | B1 | 2/2001 | Schuler et al. | 6,662,361 | B1 | 12/2003 | Jackson |
| 6,201,996 | B1 | 3/2001 | Crater et al. | 6,665,688 | B1 | 12/2003 | Callahan, II et al. |
| 6,208,640 | B1 | 3/2001 | Spell et al. | 6,668,211 | B1 | 12/2003 | Fujita et al. |
| 6,209,037 | B1 * | 3/2001 | Brown et al. ................... 709/230 | 6,678,713 | B1 * | 1/2004 | Mason et al. ................... 718/102 |
| 6,216,173 | B1 | 4/2001 | Jones et al. | 6,684,157 | B2 | 1/2004 | Barman et al. |
| 6,219,032 | B1 | 4/2001 | Rosenberg et al. | 6,733,382 | B2 | 5/2004 | Oe et al. |
| 6,219,033 | B1 | 4/2001 | Rosenberg et al. | 6,778,949 | B2 | 8/2004 | Duan et al. |
| 6,232,891 | B1 | 5/2001 | Rosenberg | 6,848,107 | B1 | 1/2005 | Komine et al. |
| 6,233,545 | B1 | 5/2001 | Datig | 6,850,806 | B2 | 2/2005 | Yutkowitz |
| 6,242,880 | B1 | 6/2001 | Hong | 6,859,671 | B1 | 2/2005 | Brown |
| 6,243,078 | B1 | 6/2001 | Rosenberg | 6,859,747 | B2 | 2/2005 | Yutkowitz |
| 6,246,390 | B1 | 6/2001 | Rosenberg | 6,865,499 | B2 | 3/2005 | Yutkowitz |
| 6,247,994 | B1 | 6/2001 | DeAngelis et al. | 6,879,862 | B2 | 4/2005 | Brown et al. |
| 6,252,579 | B1 | 6/2001 | Rosenberg et al. | 6,885,898 | B1 | 4/2005 | Brown et al. |
| 6,252,853 | B1 | 6/2001 | Ohno | 6,889,118 | B2 | 5/2005 | Murray, IV et al. |
| 6,259,382 | B1 | 7/2001 | Rosenberg | 6,892,115 | B2 | 5/2005 | Berkcan et al. |
| 6,271,833 | B1 | 8/2001 | Rosenberg et al. | 6,892,145 | B2 | 5/2005 | Topka et al. |
| 6,278,439 | B1 | 8/2001 | Rosenberg et al. | 6,909,942 | B2 | 6/2005 | Andarawis et al. |
| 6,285,351 | B1 | 9/2001 | Chang et al. | 6,920,408 | B2 | 7/2005 | Yutkowitz |
| 6,286,133 | B1 | 9/2001 | Hopkins | 6,922,826 | B2 | 7/2005 | Bates et al. |
| 6,288,705 | B1 | 9/2001 | Rosenberg et al. | 6,925,357 | B2 | 8/2005 | Wang et al. |
| 6,288,716 | B1 | 9/2001 | Humpleman et al. | 6,941,543 | B1 | 9/2005 | Brown et al. |
| 6,290,565 | B1 | 9/2001 | Galyean III et al. | 6,944,584 | B1 | 9/2005 | Tenney et al. |
| 6,290,566 | B1 | 9/2001 | Gabai et al. | 7,024,255 | B1 | 4/2006 | Brown et al. |
| 6,292,170 | B1 | 9/2001 | Chang et al. | 7,024,666 | B1 | 4/2006 | Brown |
| 6,292,174 | B1 | 9/2001 | Mallett et al. | 7,031,798 | B2 * | 4/2006 | Brown et al. ................... 700/174 |
| 6,292,712 | B1 * | 9/2001 | Bullen ......................... 700/245 | 7,035,697 | B1 | 4/2006 | Brown |
| 6,292,714 | B1 | 9/2001 | Okabayashi | 7,076,336 | B2 | 7/2006 | Murray, IV et al. |
| 6,295,530 | B1 | 9/2001 | Ritchie et al. | 7,113,833 | B1 | 9/2006 | Brown et al. |
| 6,300,936 | B1 | 10/2001 | Braun et al. | 7,137,107 | B1 | 11/2006 | Brown |
| 6,300,937 | B1 | 10/2001 | Rosenberg | 7,137,891 | B2 | 11/2006 | Neveu et al. |
| 6,301,634 | B1 * | 10/2001 | Gomi et al. .................... 710/267 | 7,139,843 | B1 | 11/2006 | Brown et al. |
| 6,304,091 | B1 | 10/2001 | Shahoian et al. | 7,216,179 | B2 | 5/2007 | Ott et al. |
| 6,305,011 | B1 | 10/2001 | Safonov | 7,302,676 | B2 | 11/2007 | Schmitt et al. |
| 6,309,275 | B1 | 10/2001 | Fong et al. | 7,617,501 | B2 | 11/2009 | Peterson et al. |
| 6,310,605 | B1 | 10/2001 | Rosenberg et al. | 2001/0020944 | A1 * | 9/2001 | Brown et al. ................... 345/474 |
| 6,317,116 | B1 | 11/2001 | Rosenberg et al. | 2001/0032268 | A1 * | 10/2001 | Brown et al. ................... 709/230 |
| 6,317,871 | B1 | 11/2001 | Andrews et al. | 2001/0032278 | A1 | 10/2001 | Brown et al. |
| 6,319,010 | B1 | 11/2001 | Kikinis | 2001/0056539 | A1 | 12/2001 | Pavlin et al. |
| 6,343,349 | B1 | 1/2002 | Braun et al. | 2002/0004423 | A1 | 1/2002 | Minami et al. |
| 6,345,212 | B1 | 2/2002 | Nourse | 2002/0045956 | A1 | 4/2002 | Kapitan |
| 6,353,850 | B1 | 3/2002 | Wies et al. | 2002/0064157 | A1 | 5/2002 | Krause |
| 6,366,272 | B1 | 4/2002 | Rosenberg et al. | 2002/0065941 | A1 | 5/2002 | Kaan et al. |
| 6,366,273 | B1 | 4/2002 | Rosenberg et al. | 2002/0156872 | A1 | 10/2002 | Brown |
| 6,366,293 | B1 | 4/2002 | Hamilton et al. | 2002/0165627 | A1 * | 11/2002 | Brown et al. ................... 700/56 |
| 6,374,195 | B1 | 4/2002 | Li et al. | 2002/0173877 | A1 | 11/2002 | Zweig |
| 6,374,255 | B1 | 4/2002 | Peurach et al. | 2002/0181937 | A1 | 12/2002 | Yamamoto et al. |
| 6,400,996 | B1 | 6/2002 | Hoffberg et al. | 2003/0046380 | A1 | 3/2003 | Steger et al. |
| 6,401,005 | B1 | 6/2002 | Schwarz et al. | 2003/0093187 | A1 | 5/2003 | Walker |

| | | | |
|---|---|---|---|
| 2003/0109959 | A1 | 6/2003 | Tajima et al. |
| 2003/0165227 | A1 | 9/2003 | De Beer |
| 2003/0171846 | A1 | 9/2003 | Murray, IV et al. |
| 2005/0114444 | A1 | 5/2005 | Brown et al. |
| 2005/0132104 | A1 | 6/2005 | Brown |
| 2005/0286457 | A1* | 12/2005 | Foster et al. .................. 370/315 |
| 2006/0064503 | A1 | 3/2006 | Brown et al. |
| 2006/0149824 | A1* | 7/2006 | Park et al. ..................... 709/206 |
| 2006/0206219 | A1 | 9/2006 | Brown et al. |
| 2006/0241811 | A1 | 10/2006 | Brown et al. |
| 2006/0247801 | A1 | 11/2006 | Brown et al. |
| 2006/0282180 | A1 | 12/2006 | Brown et al. |
| 2007/0022194 | A1 | 1/2007 | Brown et al. |
| 2008/0275576 | A1 | 11/2008 | Brown et al. |
| 2008/0275577 | A1 | 11/2008 | Brown et al. |
| 2009/0030977 | A1 | 1/2009 | Brown et al. |
| 2009/0063628 | A1 | 3/2009 | Brown et al. |
| 2009/0082686 | A1 | 3/2009 | Brown et al. |
| 2009/0157199 | A1 | 6/2009 | Brown et al. |
| 2009/0157807 | A1 | 6/2009 | Brown et al. |
| 2009/0271007 | A1 | 10/2009 | Brown et al. |
| 2010/0005192 | A1 | 1/2010 | Brown et al. |
| 2010/0064026 | A1 | 3/2010 | Brown et al. |

FOREIGN PATENT DOCUMENTS

| | | | |
|---|---|---|---|
| CA | 2586401 | | 12/1996 |
| CA | 2389183 | | 5/2001 |
| CA | 2625283 | | 5/2001 |
| CA | 2586401 | | 10/2009 |
| EP | 0 275 826 | A1 | 7/1988 |
| EP | 0 281 427 | A2 | 9/1988 |
| EP | 0 442 676 | A2 | 8/1991 |
| EP | 0 508 912 | A1 | 10/1992 |
| EP | 0 583 908 | A2 | 2/1994 |
| EP | 821522 | A2 | 1/1998 |
| EP | 0829039 | | 3/1998 |
| EP | 1 174 779 | A1 | 4/2000 |
| EP | 2000155693 | | 6/2000 |
| EP | 1560093 | | 8/2005 |
| EP | 1678589 | | 7/2006 |
| EP | 1690173 | | 8/2006 |
| EP | 2081094 | | 7/2009 |
| GB | 2 244 896 | A | 12/1991 |
| JP | 59-228473 | | 12/1984 |
| JP | 06-168157 | | 6/1994 |
| JP | 8 161335 | A | 6/1996 |
| JP | 11506234 | | 6/1999 |
| JP | 2000 020114 | A | 1/2000 |
| JP | 2003513348 | | 4/2003 |
| JP | 2004078904 | | 3/2004 |
| JP | 2007102796 | | 4/2007 |
| JP | 2008159046 | | 7/2008 |
| WO | WO 92/11731 | | 7/1992 |
| WO | WO 93/08654 | | 4/1993 |
| WO | WO 95/07504 | | 3/1995 |
| WO | 96/38769 | | 5/1995 |
| WO | 0067081 | | 11/2000 |
| WO | 0131408 | | 5/2001 |
| WO | 0163431 | | 8/2001 |
| WO | 02054184 | | 7/2002 |
| WO | 02071241 | | 9/2002 |
| WO | 03019397 | | 3/2003 |
| WO | 2005031542 | | 4/2005 |
| WO | 2005048086 | | 5/2005 |

OTHER PUBLICATIONS

SEMI; "SEMI E4-0699 SEMI Equipment Communications Standard 1 Message Transfer (SECS-I)", Jan. 2, 1980.

SEMI; "SEMI E5-1104 SEMI Equipment Communications Standard 2 Message Content (SECS-II)", 1982, Sections 1-9 (pp. 1-9).

Fitzgerald, M., Barbera, A.; "A Low-Level Control Interface for Robot Manipulators," Robotics and Computer-Integrated Manufacturing, 1985, vol. 2, No. 3/4, pp. 201-213.

Rembold, J., Blume, C., Frommherz, B.; "The Proposed Robot Software Interfaces SRL and IRDATA", Robotics and Computer-Integrated Manufacturing, 1985, vol. 2, No. 3/4, pp. 219-225.

Taylor, R.; "A General Purpose Control Architecture for Programmable Automation Research", IBM T.J. Watson Research Center, 1986, pp. 165-173.

Hayward, V., Paul, R.; "Robot Manipulator Control under Unix RCCL: A Robot Control "C" Library", The International Journal of Robotics Research, 1986, vol. 5, No. 4, pp. 94-111.

Lloyd, J., Parker, M., McClain, R.; "Extending the RCCL Programming Environment to Multiple Robots and Processors", IEEE, 1988, pp. 465-469.

Mangaser, A., Wang, Y., Butner, S.; "Concurrent Programming Support for a Multi-Manipulator Experiment on RIPS", IEEE, 1989, pp. 853-859.

Tesar, D., Butler, M.; "A Generalized Modular Architecture for Robot Structures", American Society of Mechanical Engineers, Jun. 1, 1989, pp. 91-118.

Stewart, Schmitz, Khosla; "Implementing Real-Time Robotic Systems Using CHIMERA II", IEEE, 1990, pp. 254-255, Sections 3.1 and 3.2.

Bloom, H.; "Software and Computer Integrated Manufacturing", 1990, pp. 1-14.

Kasahara, T.; "MAP 2.0 Entering the Practical Use Period in the CIM Era: MAP 3.0 MMS Architecture and Mounting Method", Ohmsha Ltd., Mar. 1, 1990, pp. 57-62, Computer and Network LAN vol. 8, No. 3.

Paidy, Reeve; "Software Architecture for a Cell Controller", IEEE, 1991, pp. 344-349.

Yared, W., Sheridan, T.; "Plan Recognition and Generalization in Command Languages with Application to Telerobotics", IEEE, Mar. 1, 1991, vol. 21, No. 2, pp. 327-338.

Senehi, M., Wallace, S., Barkmeyer, E., Ray, S., Wallace, E.; "Control Entity Interface Document", Jun. 1, 1991, pp. 1-38.

Payton, D., Bihari, T.; "Intelligent Real-Time Control of Robotic Vehicles", ACM, Aug. 1, 1991, pp. 49-63, vol. 34, No. B.

SEMI; "SEMI E30-1103 General Model For Communications and Control of Manufacturing Equipment (GEM)", 1992.

Smith, M.; "An Environment for More Easily Programming a Robot", International Conference on Robotics and Automation, May 1, 1992, pp. 10-16.

Nielsen, L., Trostmann, S., Trostmann, E.; "Robot Off-line Programming and Simulation As a True CIME-Subsystem", International Conference on Robotics and Automation, May 1, 1992, pp. 1089-1094.

Albus, J.; "A Reference Model Architecture for Intelligent Systems Design", NIST, 1993, pp. 1-38.

Tanaka, K.; "U.S. Publication No. 2002/0044297", USPTO, Jul. 7, 1993.

Proctor, F., Damazo, B., Yang, C., Frechette, S.; "Open Architectures for Machine Control", NIST, 1994, pp. 1-17.

US Department of Energy; "Robotic Technology Development Program", Feb. 1, 1994, pp. 1-114.

Miller, D.; "Using Generic Tool Kits to Build Intelligent Systems (AIAA 94-1214)", Sandia National Laboratories, Mar. 9, 1994, pp. 1-9.

Sakai, K.; "Object Orientation and C++ Language: Facts of Object-Oriented Programming", CQ Publishing Co., Ltd., Jun. 1, 1994, vol. 20, No. 6, pp. 83-93.

Blasvaer, Pirjanian; "An Autonomous Mobile Robot System", Jun. 8, 1994, pp. 52-61 and 122-124, Chapters 4 and 6.7.

Hori, K.; "Protocol Conversion Software That Makes Possible Communication between Different Types of Field Devices", Cosmo Technica, Sep. 1, 1994, pp. 1-12.

Daiyo, M.; "The Full Color Era Has Arrived with Scanner and Printer Development", Nikkei Byte, Oct. 1, 1994, No. 130, pp. 160-172.

Senehi, M., Kramer, T., Michaloski, J., Quintero, R., Ray, S., Rippey, W., Wallace, S.; "Reference Architecture for Machine Control Systems Integration: Interim Report", Oct. 20, 1994, pp. 1-52.

Putnam, F.; "The WinSEM OLE Messaging Architecture Working Paper", Labtech, Dec. 1, 1994.

Fanuc Ltd.; "FANUC Robot i series Product Manual", 1995, pp. 1-8.

Koizumi, A.; "Pursuing Design Development with a Focus on Compatibility and Permeability with Incorporation of Worldwide Standard Specifications", Instrumentation: Instrumentation and Control Engineering, May 1, 1995, vol. 38, No. 5, pp. 58-62.

Brown, D., Clark, J.; "U.S. Publication No. 2001/0032268", USPTO, May 30, 1995.
Pirjanian, Christensen; "Hierarchical Control for Navigation Using Heterogeneous Models", Nov. 1, 1995, 19 pages, Denmark.
Ge Fanuc; "TCP/IP Ethernet Communications for the Series 90-70 PLC", 1996.
Baruch, J., Cox, M.; "Remote control and robots: an Internet solution", Computing and Control Engineering Journal, Feb. 1, 1996.
Burchard, R., Feddema, J.; "Generic Robotic and Motion Control API Based on GISC-Kit Technology and COBRA Communications", Sandia National Laboratories, Apr. 1, 1996, pp. 712-717.
Schneeman, R.; "Device Driver Development for Microsoft Windows NT: Accessing Motion Control Hardware Using a Multimedia Framework", NIST, Oct. 1, 1996, pp. 1-43.
Suzuki, T., Fujii, T., Yokota, K., Asama, H., Kaetsu, H., Endo, I.; "Teleoperation of Multiple Robots through the Internet", Nov. 14, 1996, pp. 84-88.
Kapoor, C.; "A Reusable Operational Software Architecture for Advanced Robotics", UMI, Dec. 1, 1996, pp. vi-vii, 1-79, 111-253, 302-368 (ch1, ch2, ch4, ch5 and ch7).
OPC Foundation; "OLE for Process Control, Data Access Standard", Sep. 11, 1997, Updated, version 1.0A, Chapter 1-5 (pp. 1-169).
Jennings, R.; "Special Edition Using Access 97, Second Edition", Que, Oct. 9, 1997, Chapter 25.
Ge Fanuc; "Windows '95 and Windows NT 32-Bit Drivers and Libraries for Open CNC Systems", Nov. 1, 1997, pp. 8-828.
Hall, E.; "Intelligent Robot Trends for 1998", University of Cincinnati, 1998, pp. 1-13.
Siemens AG Automation and Drives; "IT-Solutions for Machine Tools: SinCOM Computer Link SINUMERIK 840D/810D Description of Functions", 1998, 272 pages.
Xiaowei, M., Xiaoli, L., Yulin, M., Hegao, C.; "Real-time Self-reaction of Mobile Robot with Genetic Fuzzy Neural Network in Unknown Environment", Proceedings of the IEEE Intl. Conf. on Sys, Man, and Cybernetics, 1998, vol. 4.
Claverie, S.; "Working the 'NET: Developing Applications with Internet Information Server and Visual Basic Active X Controls", Loyola University, Sep. 1, 1998, pp. 158-162.
Ge Fanuc; "Open Systems (Type II High Speed Serial Bus Setup for 32-Bit Windows 95 and Windows NT Applications)", Oct. 1, 1998.
OPC Foundation; "OPC Overview", Oct. 27, 1998, Version 1.0.
Globalspec; "About CNC Controllers", 1999, Internet Location: http://motion-controls.globalspec.com/LearnMore/Motion_Controls/Machine_Motion_Controllers/CNC_Controllers.
Ge Fanuc; "Cimplicity HMI OPC Server", Apr. 1, 1999.
Platt, D.; "Understanding COM+: Events", Microsoft Press, Jun. 30, 1999, pp. 149-182.
Platt, D.; "Understanding COM+: Security", Microsoft Press, Jun. 30, 1999, pp. 44-57.
Jara; "Specifications of ORiN (Ver. 0.5)", Aug. 1, 1999.
Brown, D., Clark, J.; "U.S. Publication No. 2001/0020944", USPTO, Oct. 27, 1999.
Jeppsson, J.; "Sensor Based Adaptive Control and Prediction Software - Keys to Reliable HSM", The Boeing Company, Nov. 3, 1999.
Ge Fanuc; "Cimplicity HMI for CNC - CNC Machining Interface Plus Operation Manual", Dec. 1, 1999, pp. 1-1 to B-2.
Holzmann; "U.S. Publication No. 2001/0037492 A1", USPTO, Mar. 8, 2000.
LEGO; "LEGO MindStorms RCX 2.0 Firmware Command Overview", Jul. 4, 2000.
Ott, M., Reininger, D., Makwana, D., Singh, M.; "U.S. Publication No. 2002/0150093", USPTO, Aug. 16, 2000.
Brown, K.; "SOAP for Platform Neutral Interoperability", Sep. 1, 2000, 16 pages.
Chen; "U.S. Publication No. 2002/0177453 A1", USPTO, Nov. 15, 2000.
Ge Fanuc; "CIMPLICITY Integrator's Toolkit - Application Developer's Guide", Dec. 1, 2000, pp. 1-1 to 48-12.
Nacsa, J.; "Comparison of Three Different Open Architecture Controllers", 2001.
Evolution Robotics, Inc.; "ERSP 3.0 - Getting Started Guide", 2001.
Evolution Robotics, Inc.; "ERSP 3.0 - Robotic Development Platform", 2001, pp. 1-1134.
Evolution Robotics, Inc.; "ERSP 3.0 - Tutorials", 2001.
Evolution Robotics, Inc.; "ERSP 3.0 - User's Guide", 2001.
Jara; "Outline of ORiN (Open Robot Interface for the Network)", 2001.
Lee, K.; "U.S. Publication No. 2002/0052939", USPTO, Feb. 8, 2001.
Brown, D., Clark, J.; "U.S. Publication No. 2002/0165627", USPTO, Feb. 9, 2001.
Aronoff, E., Collings, J.; "U.S. Publication No. 2002/0049776 A1", USPTO, Feb. 12, 2001.
Popular Mechanics; "United Internet Technologies Transforms Toy Industry With Intelligent Creative Interactive Technology", Mar. 1, 2001.
Miyahira; "U.S. Publication No. 2001/0029443 A1", USPTO, Mar. 26, 2001.
Kumhyr; "U.S. Publication No. 2002/0165708 A1", USPTO, May 3, 2001.
Sarkinen, S., Sarkinen, G., Trivedi, H.; "U.S. Publication No. 2002/0163909", USPTO, May 4, 2001.
Ge Fanuc; "Cimplicity HMI for CNC-Operation Manual", Jun. 1, 2001, 260 pages.
Menezes, A., Richardson, S.; "U.S. Publication No. 2003/00161023 A1", USPTO Jun. 1, 2001.
Loffler, M., Dawson, D., Zergeroglu, E., Costescu, N.; "Object-Oriented Techniques in Robot Manipulator Control Software Development", Proceedings of the American Control Conference, Jun. 25, 2001, pp. 4520-4525.
Balan, R., Comaniciu, D., Rosca, J., Sudarsky, S.; "U.S. Publication No. 2003/0033150 A1", USPTO, Jul. 27, 2001.
Brown, D., Clark, J.; "U.S. Publication No. 2003/0069998 A1", USPTO, Aug. 31, 2001.
Chandhoke, S., Vazquez, N., Fuller, D., Cifra, C.; "U.S. Publication No. 2002/0129333", USPTO, Jan. 18, 2002.
Brown, D.; "OMAC-HMI, OSACA, JOP Standard CNC Data Type Analysis", ROY-G-BIV Corporation, Feb. 9, 2002.
Ge Fanuc; "TCP/IP Ethernet Communications-Station Manager Manual", May 1, 2002, Chapters 1,3,4 and 5, pp. 1-9, 14-56.
Kepware Technologies; "KEPServerEX OPC Server Software", Jul. 12, 2002, pp. 1-202.
Lee, K., Yu, J., Ozdemir, H.; "U.S. Publication No. 2004/0019683", USPTO, Jul. 25, 2002.
Tabuchi; "U.S. Publication No. 2003/0037117", USPTO, Aug. 15, 2002.
Srinivasan; "U.S. Publication No. 2004/0044794", USPTO, Oct. 7, 2002.
Siemens AG Automation and Drives; "SCADA: The Strategic Centre - IT and Business Integration Technical Article", Dec. 10, 2002.
Rockwell Automation Technologies, Inc.; "FactoryTalk - Enabled Solutions", 2003.
Fanuc Robotics America, Inc; "Handling Works Products Brochure", 2003, pp. 1-2.
Baron, M.; "Process Visualization - Up To Date - Technical Article", Siemens AG Automation and Drives, 2003.
Siemens AG Automation and Drives; "Simatic WinCC Version 6 System Description Product Brochure", 2003.
Miyaji, S., Kakutani, K., Kataoka, S., Tojo, N.; "U.S. Publication No. 2003/0230998", USPTO, Jun. 16, 2003.
Heishi, T., Sakata, T., Ogawa, H., Miyachi, R., Miyasaka, S., Ishikawa, T.; "U.S. Publication No. 2004/0025150 A1", USPTO, Jul. 31, 2003.
Kepware Technologies; "User Configurable Driver Users Manual", 2004.
Rockwell Automation Technologies, Inc.; "Integrated Architecture Product Literature", Apr. 1, 2004.
Ge Fanuc; "Proficy Machine Edition - a suite of Proficy products for Control, Motion, and Operator Interface applications", Jul. 1, 2004, pp. 1-120.
Siemens AG Automation and Drives; "Standardized access to process data Product Brochure", Nov. 1, 2004.
FANUC Robotics America, Inc; "HandlingTool Application Software Product Brochure", 2005, pp. 1-2.
Microsoft Corporation; "Microsoft.NET Interface for LEGO MINDSTORMS", Feb. 11, 2005.

Rockwell Automation Technologies, Inc.; "Logix5000 Controllers Motion Instructions", May 1, 2005.
Rockwell Automation Technologies, Inc.; "Rsassetsecurity Product Profile", May 1, 2005.
Rockwell Automation Technologies, Inc.; "Rsassetsecurity Technical Data", May 1, 2005.
Rockwell Automation Technologies, Inc.; "RSView Machine Edition - Technical Data", May 1, 2005.
Rockwell Automation Technologies, Inc.; "RSView Supervisory Edition - Technical Data", May 1, 2005.
Rockwell Automation Technologies, Inc.; "RSLINX Classic - Getting Results Guide", Jun. 1, 2005.
Foster, D., Yoshida, L., Zhang, R.; "U.S. Publication No. 2005/0286457", Dec. 29, 2005.
Park, J., Shim, H., Kim, H., Kang, B.; "U.S. Publication No. 2006/0149824 A1", USPTO, Dec. 30, 2005.
Siemens AG Automation and Drives; "Simatic IT MES Extended Manufacturing - Modeling with innovations Product Brochure", 2006.
Siemens AG Automation and Drives; "Simatic IT Production Suite - Syhchronize your production Product Brochure", 2006.
Krar, S., Gill, A.; "Open Architecture CNC (Advanced Manufacturing Magazine)", CLB Media Inc., Mar. 1, 2002, pp. 23-27. vol. 4, No. 2.
Roy-G-Biv Corporation; "Pleadings: Plaintiff Roy-G-Biv Corporation's Complaint for Patent Infringement and Demand for Jury Trial", Sep. 19, 2007, pp. 1-9.
Ge Fanuc; "Pleadings: Defendants Fanuc Ltd., Fanuc Robotics America, Inc., Ge Fanuc Automation Americas, Inc., and Ge Fanuc Intelligent Platforms, Inc.'s Answer to Plaintiff's Complaint for Patent Infringement and Counterclaims for Invalidity and Noninfringement", Nov. 15, 2007, pp. 1-12.
Ge Fanuc; "Pleadings: Motion to Dismiss", Nov. 21, 2007, 9 pages.
Roy-G-Biv Corporation; "Pleadings: Plaintiff Roy-G-Biv Corporation's Reply to Defendants' Counterclaims for Invalidity and Noninfringement", Dec. 10, 2007, pp. 1-5.
Ge Fanuc; "Pleadings: Defendant Ge Fanuc Automation Americas, Inc.'s Notice of Change of Corporate Name", Dec. 14, 2007, pp. 1-3.
Martin Marietta, "Next Generation Workstation/Machine Controller (NGC): vol. III—Workstation Management Standardized Application (WMSA)", 1992, pp. 1-85.
Martin Marietta, "Next Generation Workstation/Machine Controller (NGC): vol. II—NGC Data", 1992, pp. 1-309.
Martin Marietta, "Next Generation Workstation/Machine Controller (NGC): vol. I—Specification for an Open System Architecture Standard (SOSAS)", 1992, pp. 1-259.
Steven K. Sorensen, "An Off-line Approach to Task Level State Driven Robot Programming", 1989, pp. 1-229.
Sercos Interface, Inc., "SERCOS Interface: Digital Interface for Communications Between Controls and Drives for Numerically Controlled Machines", 1991, pp. 1-366.
Charles Petzoid, "Programming Windows: The Microsoft Guide to Writing Applications for Windows 3—Second Edition", 1990, pp. 1-952, Microsoft Press.
Paul Wright et al., "MOSAIC: An Open-Architecture MachineTool for Precision Manufacturing", 1993, pp. 1-10.
Steven Ashley, "A Mosaic for Machine Tools", Mechanical Engineering CIME, 1990, pp. 1-6.
Adrian King, "Inside Windows 95", 1994, pp. 1-505, Microsoft Press.
Bruel & Kjaer, "Bruel & Kjaer Product Brochure: A System to Build Systems", 1991, pp. 1-64.
Bruel & Kjaer, "Major Challenges in Test Systems for the 1990's", 1991, pp. 1-22.
Daniel A. Norton, "Writing Windows Device Drivers", 1992, pp. 1-435, Addison-Wesley Publishing Company, Inc.
Microsoft Corporation, "Win32 Programmer's Reference: vol. I—Windows Management and Graphics Device Interface", 1993, pp. 1-869, Microsoft Press.
Microsoft Corporation, "Windows NT Device Driver Kit: Win32 Subsystem Driver Design Guide", 1993, pp. 1-80, Microsoft Corporation.

Microsoft Corporation, "Windows NT Device Driver Kit: Network Drivers", 1993, pp. 1-12, Microsoft Corporation.
Microsoft Corporation, "Windows NT Device Driver Kit: Win32 Subsystem Driver Reference", 1993, pp. 1-11, Microsoft Corporation.
Microsoft Corporation, "Windows NT Device Driver Kit: Programming Guide", 1993, pp. 1-11, Microsoft Corporation.
Microsoft Corporation, "Windows NT Device Driver Kit: Kernel-Mode Driver Design Guide", 1993, pp. 1-7. Microsoft Corporation.
Microsoft Corporation, "Windows NT Device Driver Kit: Kernel-Mode Driver Reference", 1993, pp. 1-5. Microsoft Corporation.
Martin Marietta, "Next Generation Workstation/Machine Controller (NGC): vol. VI—Sensor/Effector Standardized Application (SESA)", 1992, pp. 1-38.
Martin Marietta, "Next Generation Workstation/Machine Controller (NGC): vol. V—Controls Standardized Application (CSA)", 1992, pp. 1-95.
Martin Marietta, "Next Generation Workstation/Machine Controller (NGC): vol. VI—Workstation Planning Standardized Application (WPSA)", 1992, pp. 1-120.
Bruel & Kjaer, "Modular Test System: A Second Generation VXI Architecture", date unknown, pp. 1-23.
VME Bus Extensions for Instrumentation, "System Specification VXI-1, Draft 1.4", 1991, pp. 1-24.
Bruel & Kjaer, "Short Form Catalog 1991", 1991, pp. 1-68.
Bruel & Kjaer, "Modular Test System Software Presentation", date unknown, pp. 1-36.
Ability Systems Corporation, "Development in Motion", 1990, p. 1.
Ability Systems Corporation, "Indexer LPT Version 5", 1989, pp. 1-214.
Cahners Publishing Company, "New Family of 'NT' Process Software Set to Move In", 1993, 2 pages.
Cahners Publishing Company, "Is Windows NT the PC Platform for the Future?", 1993, 3 pages.
Cahners Publishing Company, "From Distributed Control to Integrated Information", 1992, pp. 13-16.
Thomas, R.; "The Languages of Tape", American Machinist, Jan. 6, 1964, DEFS 00011360-00011367, Special Report No. 545.
Aerotech, Inc.; "Aerotech UNIDEX 31 Series Machine Controller Brochure", Date Unknown, Aerotech 613-623.
Mishra, B., Antoniotti, M.; "ED I: NYU Educational Robot", Date Unknown, DEFS 00007791-00007873.
Wright, P., Hong, J., Tan, X., Pavlakos, L, Hansen, F.; "Mosaic: Machine-tool, Open-System, Advanced Intelligent Controller", Date Unknown, DEFS 00030957-00030962.
Wizdom Controls, Inc.; "Paradym-31 User's Guide and Reference", Date Unknown, DEFS 00047946-00048274.
Precision Microcontrol; "Precision MicroControl Product Guide (with DEFS)", Date Unknown, RGB00076292-RGB00076323.
Wright, P., Hansen, F., Pavlakos, L.; "Tool Wear and Failure Monitoring on an Open-Architecture Machine Tool", New York University, Date Unknown, DEFS 00031419-00031436.
Allen-Bradley Company, Inc.; "Servo Positioning Assembly User Manual", Oct. 1, 1985, DEFS 00034317-00034478.
Gmfanuc Robotics Corporation; "GMFCOMM Communications Program Reference Manual - Version 2.11", 1986, DEFS 00058429-00058553.
Gmfanuc Robotics Corporation; "KCS-PC KAREL Communications Software Reference Manual - Version 1.0", 1986, DEFS 00058611-00058786.
Gmfanuc Robotics Corporation; "KAREL OLPC Off-line Programming Software Operations Guide - Version OLPC-V1.50P", 1987, DEFS 00058098-00058305.
Gmfanuc Robotics Corporation; "KAREL-VAX Communication Software Reference Manual - Version 1.1", 1987, DEFS 00057536-00057757.
Greenfeld, I., Hansen, F., Wright, P.; "Self-Sustaining, Open-System Machine Tools", NAMR/SME, 1989, DEFS 00030204-00030210, 1989 Transactions of NAMR/SME.
Greenfeld, I., Hansen, F., Fehlinger, J., Pavlakos, L.; "Robotics Research Technical Report", New York University, 611511989, DEFS 00040323-00040398.

Fanuc Ltd.; "Fanuc MMC-II Product Literature", Aug. 1, 1999, DEFS 00055223-00055228.
Reeker, L. , Wright, P. , Greenfeld, I. , Hansen, F. , Fehlinger, J. , Pavlakos, L.; "Investigation and Desing of Open System Controllers for Machine Tools", Defense Advanced Research Project Agency, Nov. 1, 1989, DEFS 00030700-00030946.
Fanuc Ltd.; "Fanuc MMC-II Programming Manual", 1990, DEFS 00055273-00055555.
Microsoft Corporation; "Microsoft Windows Software Development Kit Reference - vol. 2", 1990, DEFS 00050303-00050674.
Denardo, P. , Lapage, S. , Staniulis, E.; "Network Communications with DAE 1.0", IBM Corporation, Mar. 6, 1990, DEFS 00002923-00002935.
Aerotech, Inc.; "UNIDEX 31 Integrated Machine Controller Software Manual", Jun. 29, 1990, Aerotech 001-357.
Compumotor Division, Parker Hannifin; "Compumotor 6000 Series Software Reference Guide", 1991, RGBINSP00001703-rgbinsp00001970.
Intellution, Inc.; "I/O Driver Manual Allen-Bradley KT/KT2", 1991, DEFS 00020252-00020340.
IEC/TC; "Electrical Equipment of Industrial Machines - Serial Data Link for Real-time Communications Between Controls and Drives", Nov. 22, 1991, DEFS 00039926-00040070.
Intellution, Inc.; "FIXDMACS Product Documentation", 1992, DEFS 00018984-00019624.
Intellution, Inc.; "I/O Driver Manual I/O Driver Toolkit", 1992, DEFS 00020348-00020516.
Intellution, Inc.; "I/O Driver Manual I/O Driver Toolkit (Duplicate with different DEFS)", 1992, DEFS 00035971-00036139.
Ge Fanuc Automation; "MMC-II Application Reference Manual", 1992, DEFS 00054848-00055222.
Ge Fanuc Automation; "MMC-II Programming Manual", 1992, DEFS 00054538-00054847.
Tele-Denken Resources, Inc.; "VIEWpoint Product Documentation", May 18, 1992, DEFS 00014912-00015830.
Sercos Interface; "Digital Interface for Communication between Controls and Drives in Numerically Controlled Machines", Jul. 1, 1992, DEFS 00041190-00041207.
Hewlett Packard Company; "PCL 5 Printer Language Technical Reference Manual - Part 1", Oct. 1, 1992, HP 0001-0369.
Shaw, L., Bidstrup, E., Wu, Z.; "United States Pat. 5,604,843 (with DEFS)", USPTO, Dec. 23, 1992, RGB00061667-RGB00061713.
Smith, M.; "CNC Machining Technology - vol. III Part Programming Techniques", Springer-Verlag, Inc., 1993, DEFS 00010649-00010723.
Intellution, Inc.; "FIX DMACS Recipe Manual", 1993, DEFS 00035624-00035793.
Ability Systems; "HPGL Controller Design Reference", 1993, DEFS 00043010-00043052.
Intellution, Inc.; "I/O Driver Manual Eurotherm 800 Series", 1993, DEFS 00036515-00036600.
Fanuc Robotics America, Inc; "KFLOPPY-DOS PS-100/200 Floppy Disk Drive Emulator - Version 3.07P", 1993, DEFS 00058306-00058404.
Fanuc Robotics North America, Inc., "Robot Controller Terminal Emulator Manual (Version 3.0)", 1993, DEFS 00058405-00058428.
Cahners Publishing Company; "The First Open Architecture, Multitasking Machine Controller Plus Computer", 1993, DEFS 00045272-00045237, Article in Jan. 1993 issue of Control Engineering.
Hewlett Packard Company; "The HP-GL12 and HP RTL Reference Guide", 1993, DEFS 00031028-00031418.
Pritschow, G. , Daniel, C. , Junghans, G. , Sperling, W.; "Open System Controllers: A Challenge for the Future of the Machine Tool Industry (with DEFS)", Jan. 15, 1993, RGB00076341-RGB00076344, Annals of the CIRP, pp. 449-452, vol. 42.
Microsoft Corporation; "WOSA Backgrounder: Delivering Enterprise Services to the Windows-based Desktop (with DEFS)", Jul. 1, 1993, RGB00078542-RGB00078560, Backgrounders and Whitepapers: Operating Systems Extensions - MSDN Archive Edition, pp. 1-19.
National Instruments; "LabVIEW for Windows User Manual", Aug. 1, 1993, DEFS 00031588-00032047.
National Instruments; "LabVIEW Networking Reference Manual", Aug. 1, 1993, DEFS 00032048-00032154.
Wonderware; "Wonderware NetDDE for Windows Users Guide", Nov. 1, 1993, DEFS 00017524-00017663.
ACE Technical Sales; "Third Party I/O Driver List", Dec. 7, 1993, DEFS 00055557-00055565.
Wonderware; "InTouch Getting Started Reference", 1994, DEFS 00016956-00017007.
Wonderware; "InTouch User's Guide", 1994, DEFS 00017008-00017523.
Proctor, F. , Damazo, B. , Yang, C. , Frechette, S.; "Open Architectures for Machine Control (with DEFS)", NIST, 1994, DEFS 00010471-00010487.
Fanuc Robotics North America, Inc.; "Pontiac Truck and Bus PAINTworks II Manual", 1994, DEFS 00055734-00055920.
Fanuc Ltd.; "Fanuc MMC-IV Operator's Manual", Mar. 1, 1994, DEFS 00053795-00054125.
Ge Fanuc Automation; "MMC-IC Descriptions Manual", Mar. 1, 1994, DEFS 00054457-00054479.
Ge Fanuc Automation; "MMC-IC Operator's Manual", Mar. 1, 1994, DEFS 00054126-00054456.
Wonderware; "Entensibilit Toolkit for InTouch", Jul. 1, 1994, DEFS 00016606-00016955.
Ge Fanuc Automation; "MMC-IC Connection and Maintenance Manual", Dec. 1, 1994, DEFS 00054480-00054537.
Hibbard, S.; "Open Drive Interfaces for Advanced Machining Concepts", Indramat Division, Rexroth Corporation, 1995, DEFS 00051134-00051151.
Mitchell, D.; "OLE Based Real-Time Device Interface", USDATA, Mar. 24, 1995, DEFS 00007882-00007908.
Schofield, S.; "Open Architecture Controllers for Advanced Machines Tools", Dec. 12, 1995, DEFS 00030394-00030590.
"OSACA Open System Architecture for Controls within Automation Systems Final Report", Feb. 21, 1996, DEFS 00009106-00009173.
Compumotor Division, Parker Hannifin; "Compumotor Motion Builder Start-Up Guild and Tutorial", Oct. 1, 1996, DEFS 00009960-00010053.
Schneeman, R.; "Device Driver Development for Microsoft Windows NT: Accessing Motion Control Hardware Using a Multimedia Framework (with DEFS)", NIST, Oct. 1, 1996, DEFS 00010531-00010580.
Compumotor Division, Parker Hannifin; "Motion Toolbox User Guide", Jul. 1, 1997, DEFS 00010095-00010214.
Pacific Scientific; "Advanced Motion Language", Date Unknown, pp. C-2 thru C-11.
Moore; "Advanced Process Automation and Control System (APACS Product Literature)", Date Unknown, pp. 1-13.
Katila, P.; "Applying Total Productive Maintenance - TPM Principles in the Flexible Manufacturing Systems", Date Unknown, Lulea Tekniska Universitet, pp. 1-41.
Silma; "CimStation Product Literature", Date Unknown, pp. 1-12.
Galil Motion Control; "Galil Dynamic Data Exchange Server for DMC-1000", Date Unknown, pp. 1-2.
Galil Motion Control; "Galil OPINT600 Product Features", Date Unknown, pp. 1-3.
Fanuc Robotics North America; "Manufacturing solutions for value-minded companies (Product Brochure)", Date Unknown, pp. 1-5.
Highland Technology, Inc.; "Perfect Parts Product Literature", Date Unknown, pp. 1-4.
Mitutoyo; "Quick Vision Product Literature", Date Unknown, pp. 1-8.
Fanuc Robotics North America; "Robotic Palletizing Provides Flexibility at High Speeds", Date Unknown, pp. 1-2.
ISO - International Standards Organization; "ISO 10303-49: Industrial automation systems and integration - Product data representation and exchange - Part 49: Integrated generic resources: Process structure and properties: First Edition", Jun. 15, 1998, pp. 1-64.
ISO - International Standards Organization; "ISO 13584-20: Industrial automation systems and integration - Parts library - Part 20: Logical resource: Logical model of expressions: First Edition", Jul. 1, 1998, pp. 1-96.

Can In Automation (CIA); "CAN Specification 2.0, Addendum - Implementation Guide for the CAN Protocol", Jul. 7, 1998, pp. 1-3, document created on Jul. 7, 1998.
ISO - International Standards Organization; "ISO - DIS 14649-1: Industrial automation systems and integration - Physical device control - Data model for Computerized Numerical Controllers - Part 1: Overview and Fundamental Principles", Sep. 1, 1998, pp. 1-15.
Haynes, T.; "Data Interface for Numerical Controls", Sep. 21, 1998, National Center for Manufacturing Sciences, all pages, NCMS Fall Conference.
Barco Gerber Systems Corporation; "Gerber RS-274X Format User's Guide", Sep. 21, 1998, pp. 1-55.
Price, D.; West, M.; Fowler, J.; "The STEP Data Integration Architecture Activity", Oct. 1, 1998, pp. 1-9, document creation date: Oct. 1, 1998.
ISO 10303 Editing Committee; "ISO 10303 - STEP on a Page", Oct. 23, 1998, p. 1.
ISO 10303 Editing Committee; "ISO 10303: STEP on a Page #2", Oct. 23, 1998, p. 1.
ISO/IEC; "ISO/IEC 8824-1: Information technology - Abstract Syntax Notation One (ASN.1): Specification of basic notation: Second Edition", Dec. 15, 1998, all pages.
Bargen, "Inside Direct X, In Depth Techniques for Developing High Performance Multimedia Applications", Microsoft Press, 1998, Chapters 1, 18-20, 22-27.
Bouzouia, B. et al., "A Three-Layer Workcell Control Architecture Design", IEEE, May 1, 1998, pp. 1185-1191.
Ge Fanuc, "Open Systems (Type II High Speed Serial Bus Setup for 32-Bit Windows 95 and Windows NT Applications) User's Manual", Oct. 1, 1998, pp. 1-1 to B-5.
Michaloski et al., "A Framework for Component base CNC Machines", SPIE, Nov. 1, 1998, pp. 132-143, vol. 3518.
Leu et al., "A Telemanufacturing Workcell Over the Internet", SPIE, Nov. 1, 1998, pp. 230-237.
Muir et al., "Mechatronic Objects for Real-Time Control Software Development", SPIE, Nov. 1, 1998, pp. 251-265, vol. 3518.
Choy et al., "A Compact/Open Network-based Controller Incorporating Modular Software Architecture for a Humanoid Robot", Kluwer Academic Publishers, Apr. 19, 1999, Journal of Intelligent and Robotic Systems, pp. 341-355.
Nilsson et al., "Integrated Architecture for Industrial Robot Programming and Control", Elsevier Science Publishers B.V., May 20, 1999, Robotics and Autonomous Systems, pp. 205-226, vol. 29.
Valera et al., "Interactive Online Evaluation of Robot Motion Control", IEEE, Aug. 2, 1999, Proceedings of the 1999 IEEE International Conference on Control Applications, pp. 1039-1043.
Natale et al., "Robust Hybrid Force/Position Control with Experiments on an Industrial Robot", IEEE, Sep. 19, 1999, Proceedings of the 1999 IEEE/ASME Intl. Conf. on Advanced Intelligent Mechatronics, pp. 956-961.
Mizukawa, et al., "De Facto Standard API for Open and Networked Industrial Robots", Oct. 1, 1999, pp. 455-462.
Morales, "GENERIS: The EC-JRC Generalized Software Control System for Industrial Robots", MCB University Press, Nov. 1, 1999, Industrial Robot, pp. 26-32, vol. 26, No. 1.
Farsi et al., "CANopen Implementation, Applications to Industrial Networks", Research Studies Press Ltd., 2000, Chapters 1, 2 and 3.
Kovach, "Inside Direct 3D, The Definitive Guide for Real-Time 3D Power and Performance for Microsoft Windows", Microsoft Press, 2000, Chapters 1, 7 and 15.
Mizukawa et al., "OriN: Open Robot Interface for the Network: A Proposed Standard", MCB University Press, May 1, 2000, Industrial Robot, 7 pages, pp. 344-350.
Mitsuishi, M.; Mutou, K.; Anmi, S.; Inazuru, I.; Kanemoto, M.; Shirakata, N.; Takagi, T.; Naitou, M.; Matsuda, S.; Yamaguchi, M.; Miyajima, H.; "User Interface for an Open-Architecture Controller", Jul. 1, 2000, 2000 Japan USA Symposium on Flexible Automation, pp. 1-4.
ISO—International Standards Organization; "ISO 10303-42: Industrial automation systems and integration - Product data representation and exchange - Part 42: Integrated generic resource: Geometric and topological representation", Sep. 1, 2000, pp. 1-346.

Manufacturing Science and Technology Center (MSTC); "MSTC/JOP-1202: Specifications of the OpenMES Framework, Version 1.0 (Draft alpha 2)", Sep. 1, 2000, pp. 1-72.
Spada, S.; "Roy-G-Biv Tames the Motion Control Tiger", Sep. 6, 2000, ARC Advisory Group, pp. 1-4.
Red, E.; "Introduction to Robotics", Sep. 8, 2000, BYU Mechanical Engineering Department, pp. 1-30, document created on Sep. 8, 2000.
ISO-13 International Standards Organization; "ISO 3592: Industrial automation systems - Numerical control of machines - NC processor output - File structure and language format, Second Edition", Sep. 15, 2000, all pages.
Price, D.; "STEP Modularization Overview Presentation", Oct. 1, 2000, IBM Corporation, pp. 1-41.
Weyrich, M.; Rommel, B.; Haasis, S.; Mueller, P.; "First Prototype of a NC Controller based on STEP-NC", Oct. 4, 2000, pp. 1-11, document creation date Oct. 4, 2000.
Individual; "ISO 4343: Industrial Automation Systems - Numerical control of machines - NC processor output - Post processor commands: Second Edition", Oct. 15, 2000, all pages.
Wonderware; "The Factory Suite Product Literature", 1997, pp. 1-18.
Cahners Publishing Company; "Software Allows Combined Relay Ladder Logic And Flowchart Programming", Feb. 1, 1997, p. 1 (Reprint from Control Engineering, Feb. 1997).
Nematron Corporation; "Nematron OpenControl Product Literature", Mar. 15, 1997, pp. 1-7.
Compumotor Division, Parker Hannifin; "Motion Toolbox User Guide", Jul. 1, 1997, DEFS 00010095-00010214.
Iconics, Inc.; "GENESIS32 Version 5.2 Product Workshop", 1998, pp. 1-247.
Pirjanian, P.; "Behavior Coordination Mechanisms - State-of-the-art", Oct. 7, 1999, USC Robotics Research Laboratory, pp. 1-49.
ARC Advisory Group; "HMI Software Strategies", Apr. 1, 2000, pp. 1-16.
ARC Advisory Group; "E-Security Strategies for Enterprises", May 1, 2000, pp. 1-20.
ARC Advisory Group; "Open Control Strategies", May 1, 2000, pp. 1-20.
Deltheil, C.; Didier, L.; Hospital, E.; Brutzman, D.; "Simulating an Optical Guidance System for the Recovery of an Unmanned Underwater Vehicle", Oct. 1, 2000, IEEE Journal of Oceanic Engineering, pp. 568-574.
Wonderware; "InTouch 5 PDK/NT (Product Data Sheet)", Apr. 19, 1994, pp. 1-4.
Control; "Simulation Software Helps Troubleshoot PLC Code", Jun. 1, 1994, p. 1 (reprinted from Control, Jun. 1994).
Tele-Denken Resources, Inc.; "SoftPLC (Product Data Sheet)", Jun. 1, 1994, pp. 1-5.
Galil Motion Control; "Galil ServoTRENDS vol. X. No. 2", Jul. 1, 1994, pp. 1-4.
Tele-Denken Resources, Inc.; "TopDoc (Product Data Sheet)", Oct. 1, 1994, pp. 1-7.
National Instruments; "LabVIEW Graphical Programming for Instrumentation", 1995, pp. 1-16.
Wizdom Controls, Inc.; "Paradym-31 Software Brochure", 1995, pp. 1-4.
Fanuc Robotics North America; "SpotTool Application Software", 1995, pp. 1-2.
Iconics, Inc.; "Configuring Input/Output (I/O) Devices (GENISIS Product Guide)", Feb. 15, 1995, pp. 1-31.
Quinn, T.; George, G.; "Windows 95 Marks a New Era in PC-Based Automation", Mar. 1, 1995, Cahners Publishing Company, pp. 19-20, 22 (Control Engineering, Mar. 1995).
Bengtsson, K.; "Industry Interest - Design, Engineering Simulation", Nov. 1, 2001, EPM Technology, pp. 1-24, NorduGrid Workshop.
Michaloski, J.; "STEP-NC Architecture Overview", Nov. 28, 2001, NIST, pp. 1-2, document creation date: Nov. 28, 2001.
ROY-G-BIV Corporation; "ROY-G-BIV Teams With OKUMA to Help Lean Manufacturing Vision Become Reality", Dec. 1, 2001, pp. 1-2.
ROY-G-BIV Corporation; "XMC Powers Robotic Welding Application for Future NASA Space Shuttles", Dec. 1, 2001, pp. 1-2.

Downie, B.; Hardwick, D.; "3D Data for Pipe Bending and Cutting Machines", 2002, Step Tools, Inc., pp. 1-12.
Jerard, R.; Ryou, O.; "E-Commerce for the Metal Removal Industry", Jan. 7, 2002, International Business Machines Corporation, pp. 1-28.
ISO—International Standards Organization; "ISO/FDIS 14649-10: Industrial automation systems and integration - Physical device control - Data model for Computerized Numerical Controllers - Part 10: General Process Data: Draft 2002", Feb. 6, 2002, pp. 1-179.
ISO—International Standards Organization; "ISO/FDIS 14649-11: Industrial automation systems and integration - Physical device control - Data model for Computerized Numerical Controllers - Part 11: Process Data for Milling: Draft 2002", Feb. 6, 2002, pp. 1-76.
ISO—International Standards Organization; "ISO/FDIS 14649-111: Industrial automation systems and integration - Physical device control - Data model for Computerized Numerical Controllers - Part 111: Tools for Milling: Draft 2002", Feb. 6, 2002, pp. 1-27.
ISO—International Standards Organization; "ISO/WD 10303-238: STEP-NC AIM v2.8 - Draft", Feb. 24, 2002, pp. 1-810.
Step Tools, Inc.; "Introduction to STEP-NC: Project and Setups", 2001, pp. 1-12.
Step Tools, Inc.; "Introduction to STEP-NC: Stock", 2001, pp. 1-3.
Step Tools, Inc.; "Introduction to STEP-NC: The STEP-NC Backbone: Executables", 2001, pp. 1-20.
Step Tools, Inc.; "Introduction to STEP-NC: The STEP-NC Backbone: Workpiece and Features", 2001, pp. 1-37.
Step Tools, Inc.; "Introduction to STEP-NC: What is STEP-NC and What Does it Cover?", 2001, pp. 1-31.
Terakado, Y.; "Standardization Group - STEP Group", 2001, ECOM Journal, pp. 1-5, Published in ECOM Journal, No. 3 (believed published in 2001 or later as the article describes events occurring in 2001).
Loffredo, D.; "STEP-NC: E-Manufacturing Using STEP Presentation", 2001, Step Tools, Inc., pp. 1-22.
Shah, H.; "Packaging Industry Encourages Broad Adoption of Motion Control Technology", Jan. 4, 2001, ARC Advisory Group, pp. 1-4.
ROY-G-BIV Corporation; "Techno-isel CAD/CAM & CNC Brochure", Feb. 11, 2001, pp. 8-9.
OSACA Association; "OSACA Handbook, Version 2.0", Feb. 16, 2001, pp. 1-440 (all pages).
Aerotech, Inc., "Aerotech Motion Control Product Guide", date unknown, pp. 233-234.
Intec Controls Corp., "Paragon TNT Product Brochure", date unknown, 6 pages.
Seven Technologies A/S, "The complete, computer-based automation tool - Control at your fingertips (IGSS)", date unknown, 6 pages.
Wright, P., Greenfeld, I., "Open Architecture Manufacturing: The Impact of Open System Computers on Self-sustaining Machinery and the Machine Tool Industry", 1990, Proc. Manuf. Int. 90, Part 2: Advances in Manufacturing, pp. 41-47.
Altintas, Y., Peng, J., "Design and Analysis of a Modular CNC System", Elsevier Science Publishers B.V., Mar. 4, 1990, pp. 305-316, vol. 13, Computers in Industry.
Miller, D., Lennox, C., "An Object-Oriented Environment for Robot System Architectures", IEEE Control Systems, Feb. 1, 1991, pp. 14-23.
Robert Bosch GmbH, "CAN Specification", Sep. 1, 1991, 72 pages, Version 2.0.
Motion Engineering, Inc., "PC/DSP-Series Motion Controller C Programming Guide", 1992, pp. 1-54.
Delta Tau Data Systems, Inc., "PMAC Product Catalog", 1992, p. 43.
Microsoft Corporation, "Win32 SDK Programming Reference vol. 2", 1992, Dynamic Data Exchange Management Library, Chapter 77, 26 pages.
Microsoft Corporation, "Windows 3.1 SDK Guide to Programming", 1992, Dynamic Data Exchange, Chapter 22, 21 pages.
Microsoft Corporation, "Windows for Workgroups 3.1 Resource Kit", 1992, Network dynamic Data Exchange, Chapter 11, 19 pages.
Allen Bradley Company, Inc., "CNCnet Software Library", Oct. 1, 1992, Publication 800-6.1.1.
TA Engineering Co., Inc., "AIMAX-WIN MMI Software for the New DCS Era", 1993, 8 pages.

Compumotor, "Compumotor Digiplan Positioning Control Systems and Drives", 1993, 1993-94 Catalog, pp. 10-11.
Manufacturing Science and Technology Center (MSTC); "MSTC/JOP-1014: FL-net Implementation Guideline, Version 1.0", Jul. 1, 1999, pp. 1-39.
Manufacturing Science and Technology Center (MSTC); "MSTC/JOP-1015: Basic Specifications of FL-net Product Certification System, Version 1.0", Jul. 1, 1999, pp. 1-11.
Manufacturing Science and Technology Center (MSTC); "MSTC/JOP-1302: CNC Application Programming Interface, PAPI Specification 1.01E", Jul. 26, 1999, pp. i-v, 1-143.
Can in Automation (CIA); "CAN Application Fields", Jul. 28, 1999, pp. 1-5, document created on Jul. 28, 1999.
Can in Automation (CIA); "CAN Data Link Layer", Aug. 9, 1999, pp. 1-44, document created on Aug. 9, 1999.
Can in Automation (CIA); "CAN Implementation", Aug. 9, 1999, pp. 1-33, document created on Aug. 9, 1999.
Can in Automation (CIA); "CAN Physical Layer", Aug. 9, 1999, pp. 1-45, document created on Aug. 9, 1999.
Loffredo, D.; "Fundamentals of STEP Implementation", Sep. 9, 1999, STEP Tools, Inc., pp. 1-12, document creation date: Sep. 9, 1999.
Manufacturing Science and Technology Center (MSTC); "MSTC/JOP-1101: Specifications for Autonomous Decentralized Protocol (R 3.0)", Sep. 30, 1999, pp. 1-79.
ISO—International Standards Organization; "EXPRESS-X Language Reference Manual - Draft", Oct. 15, 1999, all pages.
ISO—International Standards Organization; "ISO/FDIS 14649-10: Industrial automation systems and integration - Physical device control - Data model for Computerized Numerical Controls - Part 10: General Process Data: Draft", Aug. 29, 2001, pp. 1-172.
ISO—International Standards Organization; "ISO/FDIS 14649-11: Industrial automation systems and integration - Process device control - Data model for Computerized Numerical Controllers - Part 11: Process Data for Milling: Draft", Aug. 29, 2001, pp. 1-76.
ISO—International Standards Organization; "ISO/FDIS 14649-111: Industrial automation systems and integration - Physical device control - Data model for Computerized Numerical Controllers - Part 111: Tools for Milling: Draft", Aug. 29, 2001, pp. 1-27.
Ryou, O.; Jerard, R.; "FACILE: A Clean Interface for Design and Fabrication of Mechanical Parts", Sep. 1, 2001, University of New Hampshire, Mechanical Engineering Department, pp. 1-85.
Michaloski, J.; "OMAC HMI Data Type Overview using W3C XML and STEP", Sep. 18, 2001, OMAC HMI Working Group, pp. 1-11, document created on Sep. 18, 2001.
National Electronic Manufacturing Initiative, Inc.; "NEMA Members Letter: Industry Input on Data Exchange Convergence", Sep. 21, 2001, pp. 1-6.
Stark, J.; "2PDM e-zine Web Article (www.johnstark.com)", Sep. 24, 2001, pp. 1-10, vol. 4, No. 3.
Loffredo, D.; "STEP-NC Mapping Notes", Sep. 26, 2001, Step Tools, Inc., pp. 1-21.
Hoske, M.; "Connect the plant floor to supply chain", Oct. 1, 2001, Cahners Publishing Company, pp. 1-7, Oct. 2001 issue of Control Engineering.
Hardwick, D.; "STEP-NC Frequently Asked Questions", Oct. 1, 2001, pp. 1-10.
Lewis, M.; "Five best bets for the machine-tool industry", Mar. 1, 1997, Penton Media, Inc., p. 79, 80, 92 (Mar. 1997 issue of American Machinist).
Penton Media, Inc.; "CAM software offers simultaneous 5-axis machining", Apr. 1, 1997, p. 32, Apr. 1997 edition of American Machinist.
Penton Media, Inc.; "Software opens up many possibilities", Sep. 1, 1997, p. 36 (Sep. 1997 issue of American Machinist).
Fritz, K.; Grant, K.; Khambholja, K.; Krueger, J.; "Circuit Board Prototyping System, CS400 Senior Design", Oct. 10, 1997, Milwaukee School of Engineering, pp. 1-17.
Scholar's International Publishing Corp.; "Chapter 1—CNC Programming Fundamentals - From MasterCam Documentation", 1998, all pages.

Petzold, C.; "The Technique of Banding", 1998, Microsoft Development Library, Jul. 1994 MSDN, Programming Windows 3.1, pdf pp. 1-9.
Loffredo, D.; "Efficient Database Implementation of EXPRESS Information Models (Presentation)", Apr. 10, 1998, pp. 1-26.
Loffredo, D.; "Efficient Database Implementation of EXRESS Information Models", May 1, 1998, pp. 1-133.
Can in Automation (CIA); "CAN Specification 2.0, Part A", Jun. 12, 1998, pp. 1-31, document created on Jun. 12, 1998.
Can in Automation (CIA); "CAN Specification 2.0, Part B", Jun. 12, 1998, pp. 1-38, document created on Jun. 12, 1998.
Kanehiro, F.; Inaba, M.; Inoue, H.; Hirukawa, H.; Hirai, S.; "Developmental Software Environment that is applicable to Small-size Humanoids and Life-sized Humanoids", May 21, 2001, IEEE, pp. 4084-4089.
Delta Tau Data Systems, Inc.; "PMAC Quick Reference Guide", Dec. 10, 2001, pp. 1-79.
OMAC Users Group; "OMAC STEP-NC: The Value Proposition For STEP-NC", May 1, 2002, pp. 1-23.
Alvares, A.; Da Silva, F.; Ferreira, J.; "WebTurning: Teleoperation of a Turning Center Via Internet", 2005.
Microsoft Development Library; "Chapter 4—Specifying Control Information", 1992, Jul. 1994 MSDN, Windows 3.1 DDK: Minidriver Development Guide, pdf pp. 1-16.
Microsoft Development Library; "Chapter 5 Printer Escapes", 1992, Jul. 1994 MSDN, Windows 3.1 SDK: Programmers Reference, vol. 3: Messages, Structures, Macros, pdf pp. 1-5.
Microsoft Development Library; "Chapter 7 Minidriver", 1992, Jul. 1994 MSDN, International SDKS: Hanguel Windows DDK, pdf pp. 1-8.
Lynch, M.; "Computer Numerical Control for Machining", 1992, McGraw-Hill Inc., All pages. (Copyright 1992).
Microsoft Development Library; "Win32 SDK Programmers API Reference, Escape Function", 1992, Jul. 1994 MSDN, Win32 SDK Programmers API Reference, vol. 3, pdf pp. 1-2.
Microsoft Development Library; "Windows 3.1 SDK: Programmers Reference vol. 2: Functions—SpoolFile", 1992, Jul. 1994 MSDN, Windows 3.1 Programmers Reference vol. 2: Functions, pdf p. 1.
Ambrose, C.; "The Development of an Interactive Synthesis Tool For Intelligent Controllers of Modular Reconfigurable Robots", Dec. 1, 1992, pp. 1-304.
Microsoft Development Library; "How to Send Printer Escape Codes from a WinWord Document", Oct. 25, 1993, Jul. 1994 MSDN, Knowledge Base Article, PSS ID No.: Q93658, pdf p. 1.
Lin, S.; "Computer Numerical Control—From Programming to Networking", 1994, Delmar Publishers, Inc, All pages. (Copyright 1994).
Microsoft Development Library; "Using PASSTHROUGH Escape to Send Data Directly to Printer", Feb. 2, 1994, Jul. 1994 MSDN, Knowlege Base Article, PSS ID No. Q96795, pdf pp. 1-2.
ISO/IEC; "ISO/IEC 8824: Information Technology - Open Systems Interconnection - Specification of Abstract Syntax Notation One", Dec. 15, 1990, all pages.
Compumotor Division, Parker Hannifin; "6000 Series Programmer's Guide", 1991, all pages.
Iyengar, S.; Elfes, A.; "Autonomous Mobile Robots: Control, Planning, and Architecture", 1991, IEEE Computer Society Press, All pages.
Iyengar, S.; Elfes, A.; "Autonomous Mobile Robots: Perception, Mapping, and Navigation", 1991, IEEE Computer Society Press, All pages.
Microsoft Development Library; "1.1 Printer Driver Operation", 1992, Jul. 1994 MSDN, Windows NT DDK: Win32 Subsystem Driver Design Guide, pdf pp. 1-6.
Microsoft Development Library; "3.1.1 Using Unitool", 1992, Jul. 1994 MSDN, Windows NT DDK: Win32 Subsystem Driver Design Guide, pdf pp. 1-101.
Microsoft Development Library; "3.4 Specifying Cursor-Movement Commands", 1992, Jul. 1994 MSDN, Windows NT DDK: Win32 Subsystem Driver Design Guide, pdf pp. 1-7.
Microsoft Development Library; "4.1.22 Banding Drivers", 1992, Jul. 1994 MSDN, Windows 3.1 DDK: Device Driver Adaptation Guide, pdf pp. 1-3.

Microsoft Development Library; "Chapter 11—Graphics-Driver Escapes", 1992, Jul. 1994 MSDN, Windows 3.1 DDK: Device Driver Adaptation Guide, pdf pp. 1-50.
Microsoft Development Library; "Chapter 2 Supporting DDI Printing and User Interface Functions", 1992, Jul. 1994 MSDN, Windows NT DDK: Win32 Subsystem Driver Design Guide, pdf pp. 1-5.
General Motors, "Open, Modular Architecture Controls at GM Powertrain", May 14, 1996, 39 pages, Version 1.
Brockschmidt, K., "What OLE Is Really About, OLE (General) Technical Articles", Microsoft Corp., Jul. 1, 1996, 33 pages.
Mitsubishi Electric Corp., "Mitsubishi Electric Advance: Programmable Logic Controllers Edition", Sep. 1, 1996, vol. 76.
Marcos et al., "A New Solution for Integrating Control Devices Involved in Computer-Integrated Manufacturing", IEEE, Sep. 2, 1996, UKACC International Conference Publication No. 427, pp. 485-490.
National Electronic Manufacturing Initiative, Inc., "NEMI Low Cost Controller Project", Dec. 1, 1996, pp. 1-392.
Matsui, "An Event Driven Architecture for Controlling Behaviors of the Office Conversant Mobile Robot, Jijo 2: Proceedings of the 1997 IEEE International Conference on Robotics and Automation", IEEE, 1997, pp. 3367-3372, vol. 4.
Lawrenz, "CAN System Engineering From Theory to Practical Applications", Springer Verlag, Inc., 1997, Chapters 1, 2.1, 2.2, 3.2 and 4.1.
ISO/IEC, "ISIO/IEC 7498-3 Information Technology, Open Systems Interconnection Basic Reference Model: Naming and Addressing", Apr. 1, 1997, ISO/IEC 7498-3.
Szabo, "Validation Results of Specifications for Motion Control Interoperability", SPIE, Sep. 1, 1997, pp. 166-176, vol. 2912.
Feng, "Distributed Control of a Multiple-Tethered Mobile Robot System for Highway Maintenance and Construction", Nov. 1, 1997, Microcomputers in Civil Engineering, pp. 383-392, vol. 12.
Sperling, "Desigining Applications for an OSACA Control", Nov. 16, 1997, Proceedings of the International Mechanical Engineering Congress and Exposition, 5 pages.
Lutz, "OSACA The vendor neutral Control Architecture", Dec. 1, 1997, The European Conference on Integration in Manufacturing, pp. 247-256.
Morales, "A Generalised Software Control System for Industrial Robots", IEEE, 1998, pp. 411-416.
Chang, "Development and Implementation of an Application Programming Interface for PC/DSP-based Motion Control System", SPIE, 1998, pp. 94-105, vol. 3518.
Step Tools, Inc.; "Database Use Case Presentation", Apr. 1, 2000, p. 1.
Can in Automation (CIA); "CANopen", Apr. 3, 2000, pp. 1-125, document created on Apr. 3, 2000.
Manufacturing Science and Technology Center (MSTC); "MIMOSA CRIS V2.1 Terminology", Apr. 7, 2000, pp. 1-3, document created Apr. 7, 2000.
Individual; "Containment Early Binding - Draft 1.2", Apr. 12, 2000, pp. 1-17.
ISO/IEC; "Part 203: Application Protocol: Configuration controlled 3D designs of mechanical Parts and assemblies, Amendment 1", May 4, 2000, all pages.
Machinery Information Management Open Systems Alliance (MIMOSA); "Common Relational Information Schema, CRIS Version 2.1", May 8, 2000, all pages.
Individual; "Containment Early Binding - Draft 1.6", May 24, 2000, pp. 1-23.
Can in Automation (CIA); "CANopen: Electronic Data Sheet Specification for CANopen", May 31, 2000, pp. 1-24, CiA Draft Standard Proposal 306, Version 1.0.
Can in Automation (CIA); "CANopen: Layer Setting Services and Protocol", May 31, 2000, pp. 1-17, CiA Draft Standard Proposal 305, Version 1.0.
Yee, K.; "Step @ Boeing", Jun. 1, 2000, The Boeing Company, pp. 1-19.
Manufacturing Science and Technology Center (MSTC); "MSTC/JOP - 1304: Management-data Format for Machine tool", Nov. 30, 1999, pp. i-iii, 1-10.

Hemmett, J.; Fussell, B.; Jerard, R.; "A Robust and Efficient Approach to Feedrate Selection for 3-axis Machining", 2000, ASME IMECE, pp. 1-15, Submission for "Dynamics and Control of Material Removal Process", 2000 ASME IECE.
Proctor, F.; Kamatsu, C.; Glantschnig, F.; "ISO/DIS 14649-1: Industrial automation systems and integration - Physical device control - Data model for computerized numerical controllers - Part 1: Overview and fundamental principles: Draft", 2000, ISO—International Standards Organization, all pages.
ISO—International Standards Organization; "ISO/DIS 14649-10: Industrial automation systems and integration - Physical device control - Data model for computerized numerical controllers - Part 10: General process data: Draft", 2000, pp. 1-149.
Westenberg, A.; "Linux CAN-bus HOWTO", 2000, pp. 1-33.
EPM Technology; "STEP-NC A NewData Interface for NC-Programming", 2000, p. 1, The Expressway web-site.
Loffredo, D.; "The STEP ISO Standard Presentation", 2000, STEP Tools, Inc., pp. 1-15.
Jerard, R.; Ryou, O.; "Internet Based Fabrication of Discrete Mechanical Parts", Jan. 3, 2000, Proceedings of the 2000 Design and Mfg Research Conference, pp. 1-9.
Can in Automation (CIA); "CANopen Representation of SI Units and Prefixes", Jan. 19, 2000, pp. 1-7.
Individual; "Non-Neutral Comparison of the Part 28 Early Bindings", Mar. 24, 2000, pp. 1-10.
OMAC Users Group, "Requirements of Open Modular Architecture Controllers for Applications in the Automotive Industry", Dec. 13, 1994, pp. 1-13, Version 1.1.
Farsi, M., "A Production Cell Communication Model in Factory Automation Using the Controller Area Network", 1995, pp. 90-95.
EIA, "ANSI/EIA-484-A: Electrical and Mechanical Interface Characteristics and Line Control Protocol Using Communication Control Characters for Serial Data Link Between a Direct Numerical Control System and Numerical Control Equipment Employing Asynchronous Full Duplex Transmission", Jun. 1, 1993, ANSI/EIA Specification 484-A.
Schuett, T., "The Benefits and Data Bottlenecks of High Speed Milling: Conference paper presented at SE Michigan Chapter American mold Builders Association", Creative Technology Corp., Aug. 1, 1995.
Leitao et al., "A Manufacturing Cell Integration Solution, paper developed at CCP as part of the ESPIRIT 5629 Project", Oct. 1, 1995.
Mcgraw, "A Friendly Command, Control, and Information System for Astronomy", 1996, ASP Conference Series, pp. 356-367.
Farsi, M., "CANopen: The Open Communications Solution", 1996, pp. 112-116.
Sisco, Inc., "MMS EASE", 1996, pp. 1-4.
Jackman, "Robotic Control Using Sequential Function Charts", SPIE, 1996, pp. 120-128, vol. 2911.
Schuett, T., "The Ultimate DNC, Direct CNC Networking (DCN)", Modern Machine Shop, 1996, Creative Technology Corp.
Proctor, F., "Validation of Standard Interfaces from a Machine Control", NIST, 1996, NIST Internatl Report, pp. 659-664.
Team ICLP API Working Group, "Technologies Enabling Agile Manufacturing (TEAM) Intelligent Closed Loop Processing", Jan. 11, 1996, pp. 1-30.
Sperling et al., "Enabling Open Control Systems: An Introduction to the OSACA System Platform", ASME Press, May 1, 1996, Robotics and Manufacturing, pp. 1-8, vol. 6.
Schuett, T., "Advanced Controls for High Speed Milling", conference paper presented at the SME "High Speed Machining", Creative Technology Corp., May 7, 1996.
Gerry Engineering Software, Inc., "ExperTune PID Tuning Software Product Brochure", 1993, 6 pages.
Farsi, M., "Flexible and Reliable Robotics Cells in Factory Automation", 1993, pp. 520-525.
Oregon Micro Systems, Inc., "Precision Motion Controls At Affordable Prices Product Guide", 1993, pp. 1-20.
Anderson, R., "Smart: A Modular Architecture for Robotics and Teleoperation", IEEE, 1993, pp. 416-421.
Iconics, Inc., "Software Products for Industrial Automation", 1993, 6 pages.

Pritschow, G., Daniel, C., Junghans, G., Sperling, W., "Open System Controllers: A Challenge for the future of the Machine Tool Industry", Jan. 15, 1993, Annals of the CIRP, pp. 449-452, vol. 42.
Katayama et al., "A Motion Control System with Event driven Motion-module Switching Mechanism for Robotic Manipulators", IEEE, Jul. 1, 1993, International Workshop on Robot and Human Communication pp. 320-325, U.S.
Microsoft Corporation, "WOSA Backgrounder, Delivering Enterprise Services to the Windows-based Desktop", Jul. 1, 1993, Backgrounders and Whitepapers, Operating Systems Extensions, MSDN Archive Ed., pp. 1-19.
Wallace, S. et al., "Control Entity Interface Specification", Sep. 1, 1993, pp. 10-20.
Microsoft Corporation, "Object-Linking and Embedding 2.0 Backgrounder", Sep. 1, 1993, pp. 1-15.
Microsoft Corporation, "Microsoft OLE Today and Tomorrow: Technology Overview", Dec. 1, 1993, pp. 1-9.
Chen, S., Lin, J., "Computer Numerical Control: Essentials in Programming and Networking", Delmar Publishers, Inc. 1994, pp. 824-848, Part V, Chapter 27.
Farsi, M., "Device Communication for Flexible Manufacturing - A New Concept", 1994, pp. 328-334.
Intellution, Inc., "FIX Product Brochure", 1994, 6 pages.
King, A., "Inside Windows 95", Microsoft Press, 1994, pp. 348-351, WOSA Section.
Microsoft Corp., "How to Write and Use ActiveX Controls for Microsoft Windows CE 3.0", Jun. 1, 2000, Windows CE 3.0 Technical Articles, 5 pages.
ISO/IEC, "ISO 9506-1 Industrial Automation Systems, Manufacturing Message Specification, Part 1: Service definition", Aug. 1, 2000, pp. i-22, 38 pages.
ISO/IEC, "ISO 9506-2 Industrial Automation Systems, Manufacturing Message Specification, Part 2: Protocol Specification", Aug. 1, 2000, pp. i-6, 18 pages.
Ge et al., "A One-Stop Solution in Robotic Control System Design", IEEE, Sep. 1, 2000, Robotics and Automation Magazine, pp. 42-55.
Erol et al., "Open System Architecture Modular Tool Kit for Motion and Machine Processing Control", IEEE, Sep. 1, 2000, pp. 281-291, vol. 5, No. 3.
Microsoft Corp., "Categorizing by Component Capabilities", Nov. 1, 2001, Platform SDK.COM.
ISO—International Standards Organization; "ISO/PDTS 10303-28: XML representation of EXPRESS schemas and data", Oct. 16, 2000, all pages.
ISO—International Standards Organization; "Proposal of New Process Data Model based on AP213", Oct. 16, 2000, all pages.
ISO—International Standards Organization; "ISO 10303-41: Industrial automation systems and integration - Product data representation and exchange - Part 41: Integrated generic resource: Fundamentals of product description and support: Second Edition", Nov. 1, 2000, all pages.
Penton Media, Inc.; "When data transfer goes awry", Dec. 7, 2000, all pages, Dec. 7, 2000 issue of Machine Design (www.machinedesign.com).
Step Tools, Inc.; "Introduction to STEP-NC: Advanced Control Flow for NC Workplans", 2001, pp. 1-14.
Step Tools, Inc.; "Introduction to STEP-NC: AP-238 and the STEP Integrated Resources", 2001, pp. 1-19.
Step Tools, Inc.; "Introduction to STEP-NC: Cutting Tools for Milling", 2001, pp. 1-12.
Step Tools, Inc.; "Introduction to STEP-NC: Explicit Toolpaths", 2001, pp. 1-11.
Step Tools, Inc.; "Introduction to STEP-NC: In-Process Features", 2001, pp. 1-12.
Step Tools, Inc.; "Introduction to STEP-NC: Milling Operations", 2001, pp. 1-18.
Birla, S.; Yen, J.; Skeries, F.; Berger, D.; "Controls Software Requirements for Global Commonization", 1999, Cahners Publishing Company, pp. 1-4, Jan. 1999 issue of Control Engineering.
Lee, K.; "Principles of CAD/CAM/CAE Systems", 1999, Addison Wesley Longman, Inc., All pages (Copyright 1999).

Manufacturing Science and Technology Center (MSTC); "The Introduction of Standard Protocol in Japanese Manufacturing Systems and a Proposal of Collaboration", 1999, pp. 1-48.
Brooks, M.; "CAN Bus Simulation Results", Mar. 30, 1999, pp. 1-4.
Brooks, M.; "Rate Monotonic Analysis of an Antenna CAN Bus", May 28, 1999, pp. 1-3.
Mathias, D.; Hellmann, R.; "Boeing Implements HMI", Jun. 1, 1999, Manufacturing Engineering, pp. 1-3.
Hardwick, D.; "STEP Database Tutorial, Chapter One - Making Business Objects Using EXPRESS-X", Jun. 21, 1999, STEP Tools, Inc., pp. 1-20.
ISO/IEC; "CEI/IEC 9506-5: Industrial automation systems - Manufacturing message specification - Part 5: Companion Standard for Programmable Controllers", Jul. 1, 1999, pp. 1-129.
Manufacturing Science and Technology Center (MSTC); "MST/JOP -1012: FL-net Protocol Specifications, Version 1.0", Jul. 1, 1999, pp. 1-65.
Manufacturing Science and Technology Center (MSTC); "MSTC/JOP - 1013: FL-net Device Profile Common Specification, Version 1.0", Jul. 1, 1999, pp. 1-28.
Fredriksson, L; "A CAN Kingdom", 1995, KVASER AB, pp. 1-109, Rev 3.01.
Webb, J.; Reis, R.; "Programmable Logic Controllers - Principles and Applications (Third Edition)", 1995, Prentice-Hall, Inc., All pages. (Copyright 1995).
ISO—International Standards Organization; "ISO/CD 10303-214 - Application protocol: Core Data for Automotive Mechanical Design Process - Draft", Aug. 8, 1995, pp. 1-1967.
Kramer, T.; Proctor, F.; "The NIST RS274/NGC Interpreter - Version 2", Oct. 26, 1995, NIST, pp. 1-58.
Selamoglu, H.; "Component Categories", Dec. 1, 1995, Microsoft Development Library, pp. 1-19.
OPC Foundation; "OLE for Process Control Standard - Version 1.0 Draft", Dec. 22, 1995, pp. 1-70.
Esprit 5629 Project; "Open System Architecture for Controls within Automation Systems EP 6379 and EP 9115, OSACA I and II Final Report", Apr. 30, 1996, pp. 1-79.
Individual; "SC4 Framework Presentation - Annex A-N326 Presentation", Sep. 30, 1996, pp. 1-8, document creation date: Sep. 30, 1996.
ISO/IEC; "ISO/IEC 8649: Information Technology - Open Systems Interconnection - Service definition for the Association Control Service Element", Oct. 15, 1996, all pages.
Penton Media, Inc.; "Computer Store (American Machinist)", 1997, p. 83 (Jan. 1997 issue of American Machinist).
Can in Automation (CIA); "CAN Physical Layer for Industrial Applications", Apr. 20, 1994, pp. 1-4, CiA Draft Standard 102, Version 2.0.
Kramer, T.; Proctor, F.; Michaloski, J.; "The NIST RS274/NGC Interpreter - Version 1", Apr. 28, 1994, NIST, pp. 1-26.
ISO—International Standards Organization; "ISO/CD 10303-204: Application protocol: Mechanical design using boundary representation - Draft", Apr. 29, 1994, pp. 1-214.
Microsoft Development Library; "INF: An Alternative to SpoolFile()", May 6, 1994, Jul. 1994 MSDN, Knowledge Base Article, PSS ID No. Q111010, pdf pp. 1-5.
Microsoft Development Library; "INF: Banding, Printing, and the Number of Bands", May 6, 1994, Jul. 1994 MSDN, Knowledge Base Article, PSS ID No. Q72691.
Microsoft Development Library; "INF: Basics of Banding Printing in Windows", May 6, 1994, Jul. 1994 MSDN, Knowledge Base, PSS ID No. Q75471, pdf pp. 1-2.
ISO/IEC; "ISO/IEC 9506-6: Industrial automation systems - Manufacturing message specification - Part 6: Companion Standard for Process Control", Jun. 1, 1994, pp. 1-267.
ISO/IEC; "ISO/IEC 9545: Information technology - Open Systems Interconnection - Application Layer structure", Aug. 15, 1994, pp. 1-20.
ISO—International Standards Organization; "ISO 10303-1: Industrial automation systems and integration - Product data representation and exchange - Part 1: Overview and fundamental principles: First Edition", Dec. 15, 1994, pp. 1-28.
ISO—International Standards Organization; "ISO 1033-11: Part 11: Description methods: The EXPRESS language reference manual", Dec. 15, 1994, all pages.
Radack, G.; "WG3 Presentation to SC4 Opening Plenary - T24 - STEP-Manufacturing Presentation", Feb. 19, 2001, ISO—International Standards Organization, pp. 1-2.
Slansky, D.; Spada, S.; "OMAC Embraces the Internet to Enable Machine Tool Collaboration", Mar. 7, 2001, ARC Advisory Group, pp. 1-4.
Acroloop Motion Control Systems, Inc.; "Acroloop - Perfection in Motion Catalog", Mar. 29, 2001, pp. 3-54, document created on Mar. 29, 2001.
AB Journal; "AB Journal New and Noteworthy", Apr. 1, 2001, pp. 1-5.
ISO—International Standards Organization; "ISO 13584-1: Industrial automation systems and integration - Parts library - Part 1: Overview and fundamental principles: Apr. 15, 2001", Apr. 15, 2001, pp. 1-26.
Can in Automation (CIA); "CANopen Cabling and Connector Pin Assignment", Apr. 20, 2001, pp. 1-22.
Compumotor Division, Parker Hannifin; "CompuCAM Computer Aided Motion", May 6, 2001, pp. 1-27.
Lutz, P.; "OSACA Proposal of an XML Model for OSACA", May 23, 2001, OSACA Association, pp. 1-13.
Can in Automation (CIA); "CANopen Indicator Specification", Jun. 1, 2001, pp. 1-7, Draft Recommendation 303-3.
Nell, J.; "ISO 10303: STEP on a Page - #3", Jun. 7, 2001, p. 1.
Numerical Control Society; "Who'S Who in Numerical Control - 1972", 1972, all pages.
Numerical Control Society; "Who'S Who in Numerical Control - 1973", 1973, all pages.
Greenfeld, I.; Wright, P.; "A Generic User-Level Specification for Open-System Machine Controllers", Date Unknown, New York University, pp. 1-17.
Penton Media, Inc.; "Technology Trends section of American Machinist", Date Unknown, all pages. (publish date unknown, from American Machinist).
ISO—International Standards Organization; "ISO 6983/1: Numerical control of machines - Program format and definition of address words: Part 1: Data format for positioning, line motion and contouring control systems: First Edition", Sep. 15, 1982, pp. 1-16.
ISO—International Standards Organization; "ISO 4342: Numerical control of machines - NC processor input - Basic part program reference language, First Edition", Dec. 15, 1985, all pages.
Petzold, C.; "The GDI Philosophy", 1988, Microsoft Development Library, Jul. 1994 MSDN, Programming Windows 3.1, pdf pp. 1-2.
Electronic Industries Association; "EIA-511 Manufacturing Message Specification - Service Definition and Protocol", Mar. 1, 1989, pp. 1-177.
Electronic Industries Association; "EIA-511 Errata", Apr. 18, 1989, pp. 1-7.
Salkind, L.; "Robotics Research Technical Report - SAGE A Real-Time Operating System for Robotic Supervisory Control", May 1, 1990, New York University, pp. 1-132.
GE Fanuc Automation; "PowerMotion Servo and Machine Control (Product Brochure)", 1996, pp. 1-8.
Compumotor Division, Parker Hannifin; "Step Motor and Servo Motor Systems and Controls", 1996, pp. 1, 28-29.
Sperber, B.; "Try These Two Little Disks for a Bit Step In Streamlined, Object-Oriented SCADA", Apr. 1, 1996, Control, pp. 1-2 (reprinted from Control - Apr. 1996).
GE Fanuc Automation; "GE Fanuc Automation Product Guide", May 1, 1996, pp. 1-8.
National Instruments; "Lookout Product Literature", May 15, 1996, pp. 1-12.
Fusaro, D.; "A Standard for Programming PLCs Emerges - Now What?", Jun. 1, 1996, Control, pp. 1-4 (reprint from Control - Jun. 1993).
GE Fanuc Automation; "CIMPLICITY Product Brochure", Jun. 1, 1996, pp. 1-4.
Siemens Energy and Automation, Inc.; "Siemens Automation Technology Newsletter (Q2/96)", Jul. 1, 1996, pp. 1-24.

Steeplechase Software, Inc.; "Flow Charts Give Focus to Manufacturing", Oct. 1, 1996, pp. 1-2 (Reprinted from Managing Automation, Oct. 1996).
Wonderware; "Wonderware InTouch DDE I/O Server Listing", Nov. 1, 1996, pp. 1-14.
Automation and Control; "PLC Programming Standard Expands", Apr. 1, 1995, pp. 3-4 (Reprinted from Automation and Control, Apr. 1995).
Cahners Publishing Company; "PC Control Software Combines Ladder Logic, HMI and I/O", May 1, 1995, pp. 1-3 (reprint from Control Engineering - May 1995).
OASYS Group, Inc.; "OASYS Open Architecture System", Jul. 11, 1995, pp. 1-23.
Cahners Publishing Company; "PC Software Adds 'Joy-of-Use' To Power and Flexibility", Sep. 1, 1995, pp. 2-3 (reprinted from Control Engineering, Sep. 1995).
Wonderware; "InTouch 5.6 (Product Data Sheet)", Sep. 15, 1995, pp. 1-4.
ARC Advisory Group; "PC-Based Control Strategies", Oct. 1, 1995.
Wonderware; "InTrack Manufacturing Execution System (Product Data Sheet)", Nov. 15, 1995, pp. 1-5.
Kagami, S.; Tamiya, Y.; Inaba, M.; Inoue, H.; "Design of Real-Time Large Scale Robot Software Platform and its Implementation in the Remote-Brained Robot Project", 1996, IEEE, pp. 1394-1399.
Factorysoft, Inc.; "FactorySoft Report Product Literature", 1996, pp. 1-2.
Galil Motion Control; "Motion Control Product Catalog", 1996, pp. 1-10, 82-91, 106-125.
Cahners Publishing Company; "Control Engineering Software", Oct. 1, 1993, p. 184 of Oct. 1993 issue of Control Engineering.
Christensen, J.; "Programmable controller users and makers to go global with IEC 1131-3", Oct. 1, 1993, Instrument and Control Systems, pp. 1-4 (reprint from Instrument and Control Systems - Oct. 1993).
Tuggle, E.; "Introduction to Device Driver Design", Oct. 5, 1993, Proceedings of the Fifth Annual Embedded Systems Conference, pp. 455-468, vol. 2.
National Instruments; "LabWindows/CVI Product Literature", 1994, pp. 1-8.
Honeywell Inc.; "SDS Physical Layer Specification", 1994, pp. 1-34.
Tal, J.; "Step-By-Step Design of Motion Control Systems", 1994, Galil Motion Control.
Steeplechase Software, Inc.; "Visual Logic Controller (Product Literature)", 1994, pp. 1-3.
Tele-Denken Resources, Inc.; "The History of Programmable Controllers", Apr. 1, 1994, pp. 1-26.
Wonderware; "InTouch 5 Lite (Product Data Sheet)", Apr. 14, 1994, pp. 1-4.
Wonderware; "InTouch 5 (Product Data Sheet)", Apr. 19, 1994, pp. 1-4.
Xanalog; "Model NL SIM Product Brochure", 1994, 4 pages.
PID, Inc., "OpenBatch Product Brief", 1994, 6 pages.
Sisco, Inc., "Overview and Introduction to the Manufacturing Message Specification (MMS)", 1994, pp. 1-47, Revision 2.
Trihedral Engineering Ltd; "WEB 3.0 Product Brochure", 1994, 6 pages.
Microsoft Corporation, "Open Systems: Technology, Leadership, and Collaboration", Mar. 1, 1994, Backgrounders and Whitepapers: Operating System Extensions MSDN Archive Edition, pp. 1-15.
Microsoft Corporation, "The Microsoft Object Technology Strategy", Mar. 1, 1994, Backgrounders and Whitepapers: Operating System Extension, MSDN Archive Edition, pp. 1-33.
Chu, Wang, "Development of a Practical SFC System for CNC machine Shop: International Conference on Data and Knowledge Systems for Manufacturing and Engineering", May 1, 1994, pp. 362-367, vol. 1, pp. xx-745, vol. 2.
Ford, W., "What Is an Open Architecture Robot Controller", IEEE, Aug. 16, 1994, pp. 27-32.
Brockschmidt, K., "Notes on Implementing an OLE Control Container", Microsoft Development Library, Sep. 21, 1994, pp. 1-47.
ISO/IEC, "ISO/IEC 7498-1 Information Technology, Open systems Interconnection Basic Reference Model: The Basic Model", Nov. 1, 1994.

Danner, B.; Frechette, S.; Vorburger, T.; "AP219 Dimensional Inspection - Informational requirements document Presentation", Jun. 14, 2002, Seneca-IT.com, pp. 1-24.
Danner, B.; Frechette, S.; Vorburger, T.; "A Step-Based Information Model for Dimensional Inspection - Draft", Jun. 20, 2002, ISO—International Standards Organization, pp. 1-95.
Fanuc Ltd.; "FANUC Series 30i/31i/32i:300i/310i/320i:300is/310is/320is-MODEL A Brochure", 2003, pp. 1-28.
Fanuc Robotics North America, Inc.; "R-J3/R-J3iB Integrated PMC", 2003, pp. 1-2.
Roy-G-Biv Corporation; "XMC Helps Systems Integrator Improve Customer's Efficiency With CNC Machine-Tool Retrofit", 2003, pp. 1-2.
Individual; "AP240_ARM_DIS_012003 Presentation", Feb. 25, 2003, pp. 1-20, document creation date: Feb. 25, 2003.
Fanuc Robotics America, Inc; "Flexible Loading Solutions", 2005, All pages. (copyright 2005).
Fanuc Ltd.; "FANUC Sales Brochure", Apr. 1, 2005, All pages. (pdf created date: Apr. 1, 2005).
Cover, R.; "The XML Cover Pages STEP/EXPRESS and XML", Mar. 29, 2002, pp. 1-11.
Step Tools, Inc.; "ST-XML Manual", Apr. 1, 2002, pp. 1-60.
Individual; "AAM for AP2xx (Process Plans for Machined Products) Presentation", Apr. 11, 2002, pp. 1-11, document creation date: Apr. 11, 2002.
Callen, J.; "A View from the CAM Side - Moving into 3D", May 1, 2002, Desktop Engineering Magazine, pp. 1-3, Desktop Engineering Magazine Web Article (www.deskeng.com).
I++ Working Group; "I++ DME Interface, Version 1.09", May 17, 2002, pp. 1-76, document created on May 17, 2002.
Wood, R.; "Integrated Steel Processing Environment (ISPE) Project Presentation", Jun. 10, 2002, Northrop Grumman Corporation, pp. 1-3.
Vorburger, T.; "Report on AP219 - Dimensional Inspection Information Exchange Project Presentation", Jun. 10, 2002, NIST, pp. 1-16.
Radack, G.; "WG3 Presentation to SC4 Opening Plenary - TC4 - STEP-Manufacturing", Jun. 10, 2002, ISO—International Standards Organization, pp. 1-4, document creation date: Jun. 10, 2002.
Individual; "AP2XX_ARM_060602 Presentation", Jun. 11, 2002, pp. 1-18, document creation date: Jun. 11, 2002.
Individual; "TC 184, SC4, WG3, T24 (Manufacturing) Session on AP219 Meeting Notes", Jun. 12, 2002, pp. 1-2.
Fanuc Robotics North America; "The Growing Demand for Advanced Robotic Packaging Systems", Date Unknown, pp. 1-2.
Tal, J.; "Motion Control by Microprocessors", 1984, Galil Motion Control.
Mack, B.; Bayoumi, M.; "Design and Integration of New Software for the Robot Controller Test Station", 1988, IEEE, pp. 866-873.
Tal, J.; "Motion Control Applications", 1989, Galil Motion Control.
Galil Motion Control; "Galil G-Code Translator News Release", Apr. 14, 1989, pp. 1-2.
Pritchard, K.; "Applying Simulation to The Control Industry", May 1, 1989, Cahners Publishing Company, pp. 1-3 (reprinted from Control Engineering, May 1989).
Galil Motion Control; "Galil OPINT600 Product Literature", Jun. 1, 1989, pp. 1-2.
Galil Motion Control; "Galil OPINT600 Press Release", Jul. 10, 1989, pp. 1-2.
Vaataja, H.; Hakala, H.; Mattila, P.; Suoranta, R.; "3-D Simulation of Ultrasonic Sensor System in Mobile Robots", 1992, IEEE, pp. 333-336.
USDATA; "FactoryLink IV for Microsoft Windows and NT", 1992, pp. 1-4.
Software Horizons, Inc.; "Operator Interface Software for Supervisory Control, Monitoring and Reporting For Windows Operating System (Product Literature)", 1993, pp. 1-12.
Pro-Log Corporation; "Pro-Log Motion Control for Allen-Bradley PLCs (Product Literature)", 1993, pp. 1-5.
Tele-Denken Resources, Inc.; "VIEWpoint (Product Data Sheet)", 1993, pp. 1-11.
Dictionary.Com LLC; "www.dictionary.com definition of 'persistent'", 1993.

Pritchard, K.; "PC-based Simulation In Control System Design", Feb. 1, 1993, Cahners Publishing Company, pp. 1-2 (reprinted from Control Engineering, Feb. 1993).
Laduzinsky, A.; "An Open Look for PLC Programs", May 1, 1993, Cahners Publishing Company, p. 1 (reprint from Control Engineering - May 1993).
Galil Motion Control; "Galil ServoTRENDS vol. IX. No. 2", Sep. 1, 1993, pp. 1-4.
Van Der Wal, E.; "PLCopen: changing the world of industrial automation - status, structuring tools, activities and libraries", Nov. 18, 2003, PLCopen, pp. 1-108.
Folsom, D.; "Order: Judgment Dismissing Action by Reason of Settlement", Oct. 19, 2009, US Dist Court EDTX, Marshal Div, pp. 1-2.
Folsom, D.; "Order: Reopen and Dismissal of Case", Nov. 20, 2009, US Dis Court EDTX, Marshal Div, p. 1.
Galil Motion Control; "Galil ServoTRENDS vol. V. No. 3", Jul. 1, 1989, pp. 1-3.
Takase, K.; "Project of a robot performing in an extreme situation", Oct. 15, 1991, vol. 9, No. 5, pp. 79-82, p. 59.
National Instruments; "IEEE 488 and VXIbus Control, Data Acquisition, and Analysis (Catalog)", 1993, pp. Main Table of Contents, Introduction pp. ii-xi, Section 1 Instrumentation Software Products.
Fedrowitz, "IRL Based Expansion of the Commonly Used High Level Language C for Robot Programming", Oct. 1, 1995, 5 pages.
Proctor, "Open Architecture Controllers", IEEE, Spectrum, Jun. 1, 1997, pp. 60-64.
ISO—International Standards Organization; "CEB Binding - Draft 3.0", Sep. 29, 2000, pp. 1-45.
Stegbauer, W.; "Intertask-Communication Inside A Real-Time Database", 1989, IFAC Distributed Databases in Real-time, pp. 63-69.
Sycara, K.; Pannu, A.; Williamson, M.; Zeng, D.; "Distributed Intelligent Agents - 1", Dec. 1, 1996, IEEE Expert, Downloaded from IEEE, 11(6): pp. 36-46.
Sycara, K.; Pannu, A.; Williamson, M.; Zeng, D.; "Distributed Intelligent Agents - 2", Dec. 1, 1996, IEEE Expert, (Downloaded from CiteSeer) 11(6): 36-46.
Think and Do Software, Inc.; "Think and Do Smart Distributed System Brochure", May 18, 1998, pp. 1-2, (document creation date May 18, 1998).
Rockwell Automation; "Interchange for Windows Release Notes", Jun. 1, 1999, pp. 1-14.
Renu Electronics Pvt Ltd.; "Gateway Protocol Converter Product Brochure", Mar. 3, 2005, pp. 1-4 (pdf marked with creation date of Mar. 3, 2005).
Siemens Energy and Automation, Inc.; "Why integrate MES and ERP? Because you can't afford not to!", Feb. 1, 2006, pdf pp. 1-8.
Brockschmidt, K.; "Inside OLE - Second Edition", 1995, Microsoft Press, (1236 pages) Copyright 1995.
Kruglinski, D.; "Inside Visual C++ - The Standard Reference for Programming with Microsoft Visual C++ version 4", 1996, Microsoft Press, (946 pages) Copyright 1996.
Chappell, D.; "Understanding ActiveX and OLE - A Guide for Developers and Managers", 1996, Microsoft Press, (347 pages) Copyright 1996.
Redmond III, F.; "DCOM - Microsoft Distributed Component Object Model", Sep. 22, 1997, IDG Books Worldwide, Inc., (371 pages) Copyright 1997.
Richter, J.; "Advanced Windows NT - The Developer's Guide to the Win32 Application Programming Interface", 1994, Microsoft Press, (732 pages) Copyright 1994.
Kruglinski, D.; "Inside Visual C++ - Version 1.5; Second Edition", 1994, Microsoft Press, (754 pages) Copyright 1994.
Microsoft Press; "Microsoft Windows NT(TM) 3.5 Guidelines for Security, Audit, and Control", 1994, (296 pages) Copyright 1994.
Collett, T.; Gerkey, B.; "Player 2.0: Toward a Practical Robot Programming Framework", Nov. 18, 2005, (8 pages) pdf creation date Nov. 18, 2005.
Tribelhorn, B.; Dodds, Z.; "Envisioning the Roomba as AI Resource: A Classroom and Laboratory Evaluation", 2006, American Association for Artificial Intelligence, (6 pages) copyright date 2006.
IRobot; "Mobility Robot Integration Software Users Guide", 2000, 129 pages.
Bruyninckx, H.; "OROCOS: design and implementation of a robot control software framework", Apr. 1, 2002, Orocos.Org, (9 pages).
Robot Information Forum; "Robot Information Forum in OMG TM (Quebec) and Associated Presentations", Aug. 24, 2004, (55 pages).
Fumio, O.; "Open Robot Controller Architecture (ORCA)", Oct. 29, 2004, Toshiba Corporation, (38 pages) pdf creation date Oct. 29, 2004.
Munich, M.; Ostrowski, J.; Pirjanian, P.; "ERSP: A Software Platform and Architecture for the Service Robot Industry", 2005, International Conference on Intelligent Robots and Systems, (8 pages) Proc. of the Int. Conf. on Intelligent Robots and Systems (IROS) 2005.
Narita, M.; Shimamura, M.; Oya, M.; "Reliable Protocol for Robot Communication on Web Services", 2005, IEEE Computer Society Press, (8 pages) Proceedings of the 2005 International Conference on Cyberworlds (CW05).
Smith, G.; Smith, R.; Wardhani, A.; "Software reuse across robotic platforms: Limiting the effects of diversity", 2005, Australian Software Engineering Conference, (10 pages) copyright 2005, Proceedings of the 2005 ASWEC.
AIST (Nat. Inst. of Adv. Industrial Sicence and Tech.); "Robotics DSIG Plenary Meeting and Associated Presentations", Apr. 3, 2005, (57 pages).
Narita, M.; Shimamura, M.; Oya, M.; "Reliable Robot Communication on Web Services", Apr. 12, 2005, Journal of Robotics and Mechatronics, (2 pages) vol. 18, No. 1, 2006, pp. 36-37.
Tansley, S.; "Robots in Academia", Jun. 20, 2005, Microsoft Corporation, (31 pages) pdf creation date Jun. 20, 2005.
Mallet, A.; Fleury, S.; Bruyninckx, H.; "A specification of generic robotics software components: future evolutions of GenoM in the Orocos context", Nov. 24, 2003, 6 pages. pdf creation date Nov. 24, 2003.
Popovic, D.; Bhatkar, V.; "Distributed Computer Control for Industrial Automation", 1990, Marcel Dekker, Inc., (721 pages).
Amy, L.; "Automation Systems for Control and Data Acquisition", 1992, Instrument Society of America, (235 pages).
Shinskey, F.; "Process Control Systems: Application, Design, and Tuning - Fourth Edition", 1996, McGraw-Hill Inc., (450 pages).
Johnson, C.; "Process Control Instrumentation Technology - Fifth Edition", 1997, Prentice-Hall, Inc., (645 pages).
Pava, G.; "Design Specification for the Real Time Platform Middleware - Revision 2.4", Jan. 13, 2005, (51 pages).
Ha, Y.; Sohn, J.; Cho, Y.; Yoon, H.; "Towards a Ubiquitous Robotic Companion: Design and Implementation of Ubiquitous Robotic Service Framework", Jul. 20, 2005, ETRI Journal, (11 pages) vol. 27, No. 6, Dec. 2005.
EPO: "Foreign FileHist: European Patent Application No. EP04809804 - Search Report", Sep. 2, 2010, (3 pages).

* cited by examiner

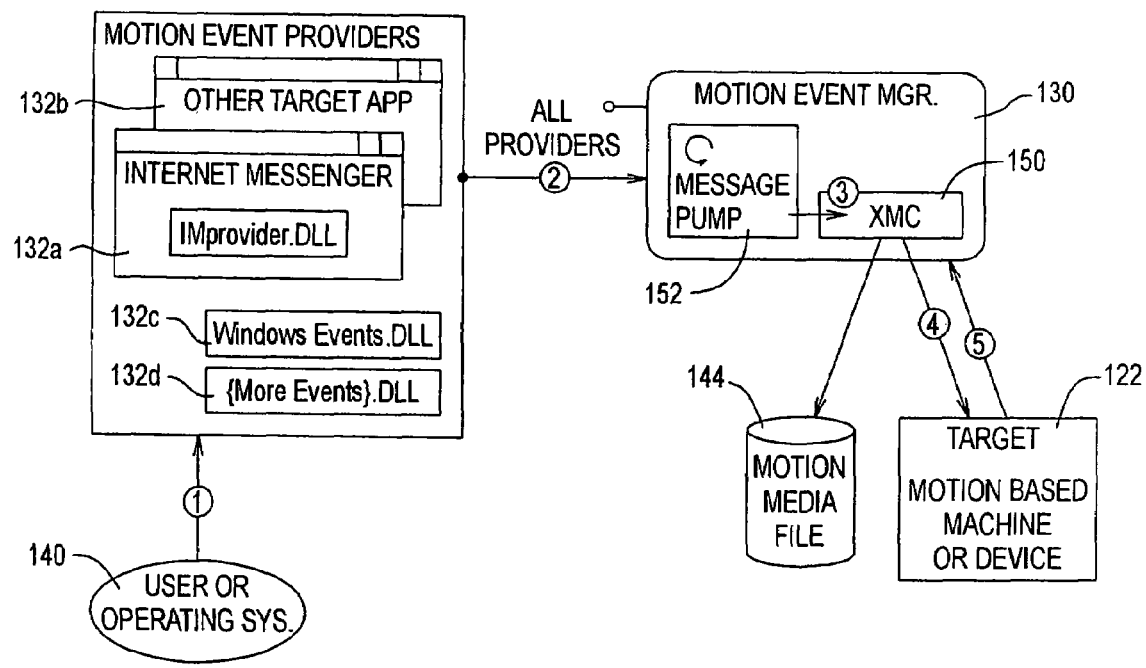

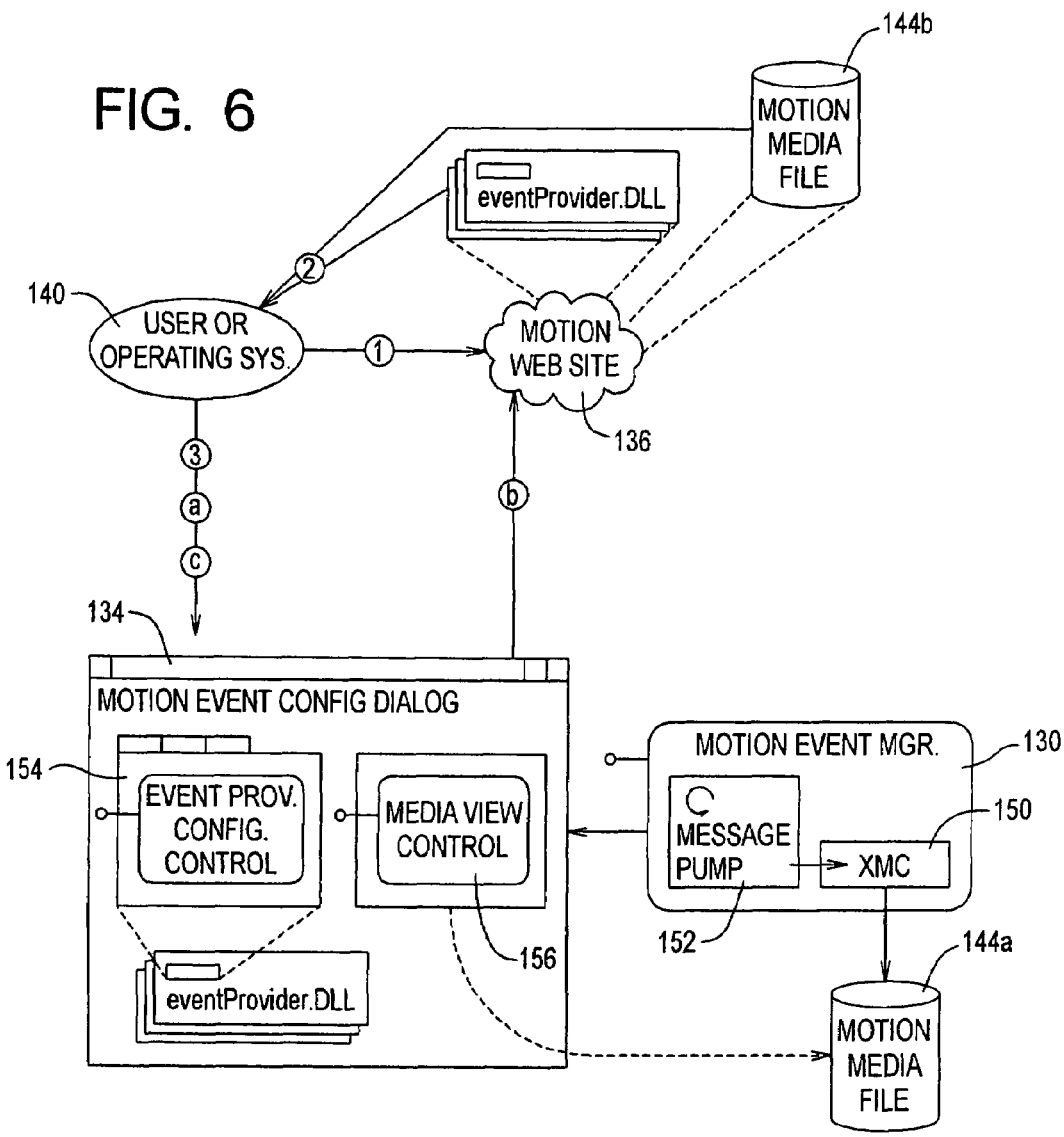
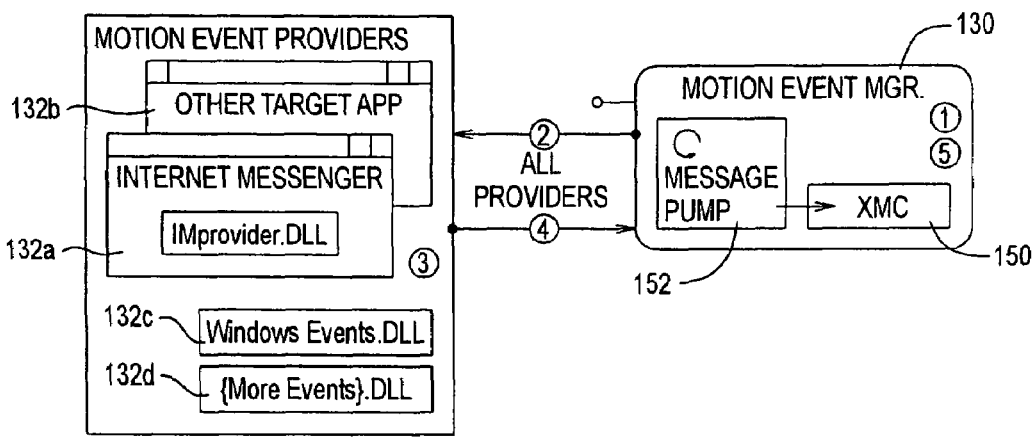

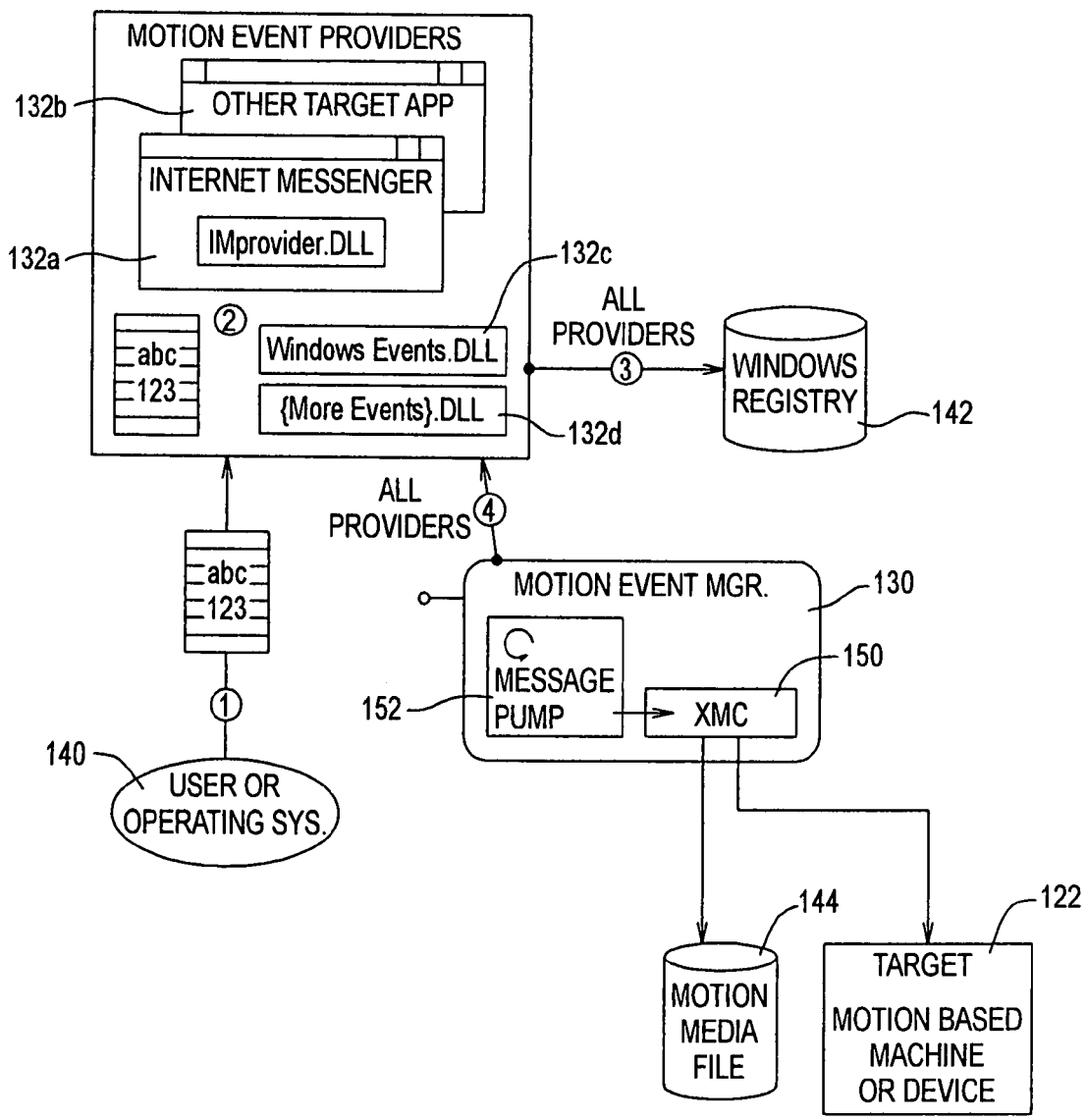

EVENT MANAGEMENT SYSTEMS AND METHODS FOR MOTION CONTROL SYSTEMS

RELATED APPLICATIONS

This application is a continuation of U.S. patent application Ser. No. 11/368,231 filed on Mar. 3, 2006 now abandoned, which claims priority of U.S. Provisional Application Ser. No. 60/658,746 filed on Mar. 3, 2005, and the '231 application is a continuation-in-part of U.S. patent application Ser. No. 10/074,577 filed on Feb. 11, 2002, now U.S. Pat. No. 7,031,798, and which claims priority of U.S. Provisional Application Ser. No. 60/267,645 filed on Feb. 9, 2001. The contents of all related applications listed above are incorporated herein by reference.

TECHNICAL FIELD

The present invention relates to motion control systems and, more specifically, to an event management system optimized for the processing and distribution of events associated with a motion control device.

BACKGROUND OF THE INVENTION

Electromechanical systems are used in numerous environments to translate electrical signals into mechanical movement. As examples, factory automation systems, toys, appliances, and the like all may use one or more electromechanical transducers that move in response to electrical control signals.

Typically, an application programmer familiar with a specific environment creates an application program defining a desired sequence of movements. U.S. Pat. Nos. 5,691,897, 5,867,385, and 6,209,037 to Brown et al. disclose systems and methods for generating, processing, and/or distributing control commands to one or more motion control devices based on such an application program.

The present invention may be embodied as a part of an overall motion control system as described in the Brown et al. patents and will be described herein in that context. However, as described below, the principles of the present invention may have broader application to other motion control systems and methods, and the scope of the present invention should be determined by the claims appended hereto and not the following detailed description.

SUMMARY OF THE INVENTION

The present invention may be embodied as a motion control system comprising a machine platform, at least one event destination, and an event handler. The machine platform carries out automated tasks and generates events. The event handler is configurable to receive at least one event from the machine platform and send the at least one event to the at least one event destination.

DESCRIPTION OF THE DRAWING

FIG. 5 is a scenario map depicting the process of handling a motion event;

FIG. 6 is a scenario map depicting how a user may obtain new motion media and motion event providers 132 from the motion web site 136;

FIG. 7 is a scenario map depicting shut down of the system of FIG. 1;

FIG. 8 is a scenario map depicting the mapping of text to motion events;

DETAILED DESCRIPTION OF THE INVENTION

Figure 1:
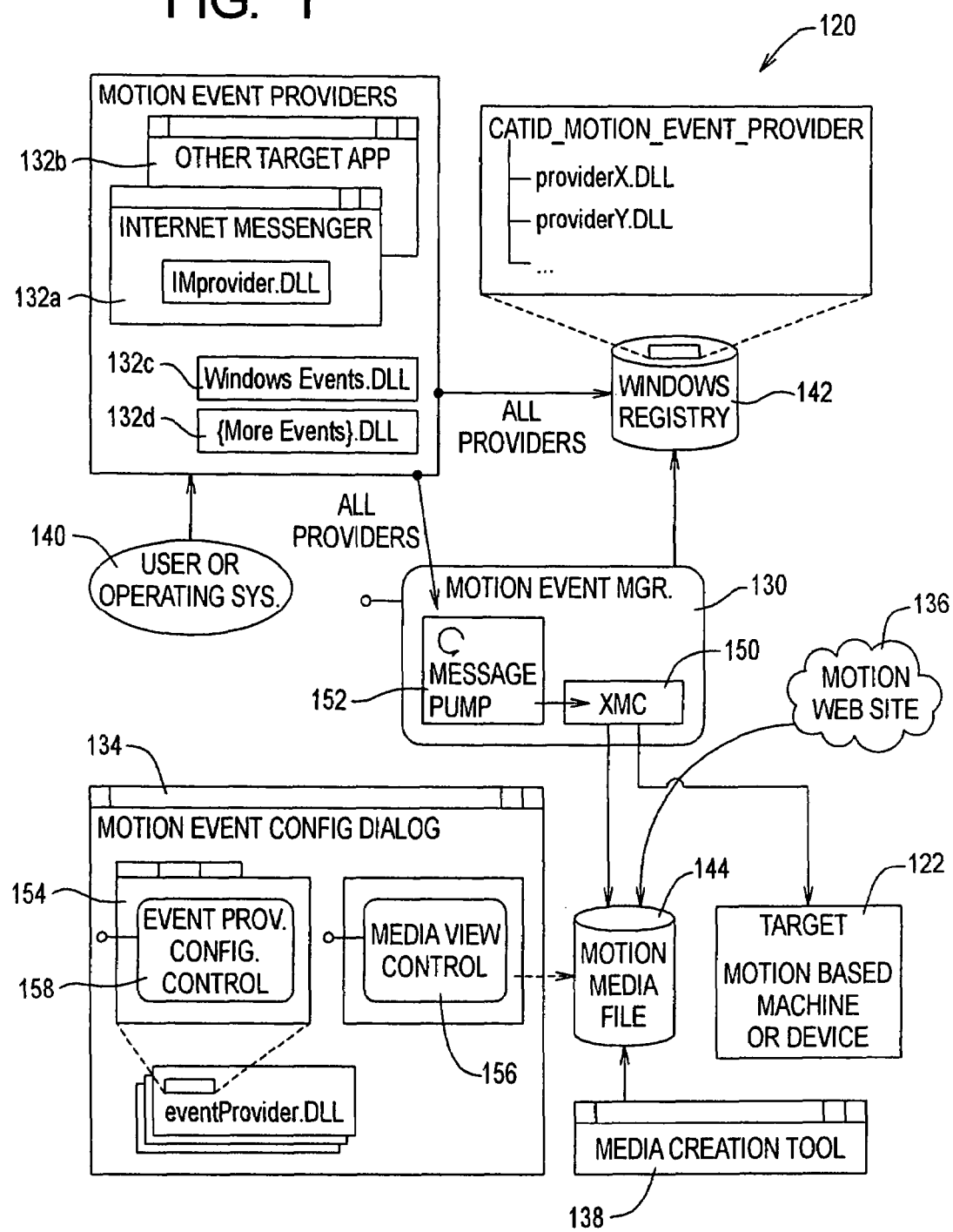
FIG. 1 is a module interaction map depicting a motion control system incorporating an event management system of the present invention.

Referring initially to FIG. 1, depicted therein is a motion control system 120 constructed in accordance with, and embodying, the principles of the present invention. The motion control system 120 is an event-based system used to control, configure, and query one or more motion based devices or machines such as indicated by reference character 122 in the drawing. The motion based devices or machines 122 will be referred to herein as the target device.

In the context of the motion control systems described herein, data is often associated with events. The term "data" (or data items) includes any numeric or string data values collected from a target machine or device in an analog or digital format that is made compatible for computer systems. For example, BIT, BYTE, WORD, DWORD, LONG, REAL, DOUBLE, FLOAT, STRING, ASCII STRING are a few data types that represent data items. Data may be collected from data sources by reading register values on the data source, reading shared memory provided by the data source, sending commands to the data source for which a data response is given containing the data requested, reading variables provided by the data source, reading and writing to variables in a sequence necessary to produce data values, querying data using a proprietary or standard data protocol, calling a function provided by the target data source, etc. The term "variable" as used herein refers to a data item that has both a name and optionally associated data. A data item may be a function call, a named data variable, a tag within a database, or the like. The terms "variable" and "data item" are used interchangeably to refer to a data point that includes one or more atomic data elements.

In the following discussion, the components or objects that form the motion control system 120 and the basic operation of the system 120 will first be described. After that will follow a discussion of the interaction between those objects and several detailed scenarios of typical actions of this system 120.

Referring initially to FIG. 1 of the drawing, it can be seen that the motion control system 120 comprises the motion based machine or device 122, a motion event manager 130, one or more motion event provider objects 132, a motion event interface 134, a motion web site 136, and a media creation tool 138.

The system 120 is adapted to be run on a general purpose computer platform comprising computer hardware and an operating system 140. The exemplary operating system 140 is a Windows variant and comprises a registry 142.

The web site 136 and media creation tool 138 provide access to one or more motion media files 144. The motion media files 144 contain what will be referred to herein as motion media.

The term "motion media" includes motion scripts, motion application programs, and/or individual motion instructions capable of causing the target device 122 to perform a desired motion operation comprising a discrete movement or sequence of movements.

The motion media comprises what will be referred to as motion commands. The term "motion commands" will be used herein to refer to both control commands and media commands associated with a desired motion operation. The term "control commands" as used herein refers to device-specific commands that may be directly run by a target device to obtain a desired motion operation.

The term "media commands" used herein refers to machine independent instructions that generically define a desired motion operation. Normally, media commands are converted into control commands before the target device executes the desired motion operation corresponding to a particular media command or set of media commands.

The term "application program" will be used to refer to a set of control and/or media commands associated with a sequence of discrete movements. In general, the term "application" refers to client software that uses the functionality of the example motion control systems described herein. An application is typically an executable, but may also be a DLL, component, or other module that takes advantage of the functionality of the motion control systems described herein.

The term "module" as used herein refers to a binary block of computer logic that contains functions, objects, components, ActiveX components, .NET source, HTML, XML and/or other computer code that can be executed in real-time or in script form. Several examples of a module include an executable EXE, a dynamic link library DLL, an OLE component or set of components housed within a DLL or EXE, an ActiveX Control, an HTML or XML based Control, a VB script source file, a Java Serverlet, Java Control, Java Object, .NET Package, etc.

The motion event manager 130 comprises a motion control component 150 and an event handling component 152. The motion event interface 134 further comprises a event provider configuration control 154 and a media view control 156. As used herein, the term "component" refers to a logical organization of computer logic designed to perform a set of operations. Several examples of a component are an OLE Component, an ActiveX Control, an HTML or XML based Control, an HTML or XML based object, a NET object, a Visual Basic based object, etc.

The motion control system 120 operates basically as follows. The motion event providers 132 generate what will be referred to as event tokens based on the occurrence of a predetermined event. The event token is associated with the predetermined event in advance and thus identifies the predetermined event. The event token may also contain additional information such as the source of the predetermined event, parameters associated with the predetermined event, and the like.

The event tokens are sent to the motion event manager 130. The motion event providers 132 and motion event manager 130 run in separate processes and could perhaps run on separate physical machines connected over a network. As used herein, the term "network" refers to a link between two or more computer systems and may be in the form of a packet based network, a streaming based network, broadcast based network, or peer-to-peer based network. Several network examples include a TCP/IP network, the Internet, an Intranet, a wireless network using WiFi, a wireless network using radio waves and/or other light based signals, etc.

The motion event providers 132 and motion event manager 130 thus use the system for the inter-process communication provided by the operating system to transmit the event tokens from the event providers 132 to the motion event manager 130.

The motion event manager 130 notifies the motion control component 150 when the event token is received and the identity of the event token. The action taken by the motion control component 150 upon receipt of an event token depends upon the nature of the event token. The received event token may contain or identify a particular control command, and the motion control component 150 can simply pass that control command to the target device 122. The received event token may contain or identify a particular media command, in which case the motion control component 150 may be required to convert the media command into a control command capable of being run by the target device 122. Another event token may start, stop, or otherwise control a separate application program run by the motion control component 150.

In the exemplary system 120, the association of motion media with event tokens is preferably made by the motion event manager 130. This association is typically represented by a table, spreadsheet, or other data storage means capable of defining relationships between event tokens and motion media. Upon receipt of each event token, the motion event manager 130 will identify the motion media previously associated with the received token and send the identified motion media to the motion control component 150 for control of the target device 122.

With the foregoing understanding of the basic operation of the system 120, the details of this exemplary motion control system 120 will now be described.

The motion event manager 130 handles the creation of each event provider 132 installed on the system by creating in-proc providers or injecting other providers into their target processes. The event manager 130 also catches events fired from each provider 132 and initiates the appropriate motion request for each event. In the exemplary system 120, the event manager 130 is the only object that communicates directly with the motion control component 150, as will be described in further detail below. The exemplary event manager 130 is accessible by double clicking its icon in the Windows System Tray in a conventional manner.

The purpose of the event handling component 152 is to handle the inter-process communications between the motion event manager 130 and the motion event providers 132. The exemplary event handling component 152 is or may be a conventional software object referred to as a message pump.

The motion event provider objects 132 are individually designed to monitor user configurable events from a given source. The exemplary system 120 employs two types of motion event providers 132: simple in-proc servers 132a,b hosted by the motion event manager 130 and specialty DLLs 132c,d that are injected into a target process to monitor event cases. Each motion event provider object 132 also contains an event configuration control 154 that, as will be described below, allows a user to configure all events supported by the motion event provider objects 132. The motion event provider objects 132 notify the motion event manager 130 of each event caught by the objects 132.

The motion event manager 130 and motion control component 150 operate together to allow interaction between the motion event providers 132 and the target device 122.

The motion control component 150 may be or incorporate parts of a software system as disclosed, for example, in U.S. Pat. Nos. 5,691,897 and 5,867,385. The systems disclosed in the '897 and '385 patents are capable of generating device-specific control commands based on hardware independent media commands written to a predetermined application programming interface.

As an alternative, the motion control component 150 may act as a conduit that passes device-specific control commands and query responses between the motion event providers 132 and the target device 122. A motion control component implemented in this manner would not convert between hardware independent media commands and device specific control commands.

A preferred implementation of the motion control component 152 would be to be for the component 152 to function in both a translation mode and in a pass-through mode. In the translation mode, the component 152 converts media commands into control commands. In the pass-through mode, the component 152 simply passes control commands from the motion event providers 132 to the target devices 122. In either mode, query responses are returned from the target devices 122 to the event provider 132 in an appropriate format.

The motion event configuration interface 134 is preferably a visual interface displayed on a screen to allow a user to configure all motion event providers 132 installed on the system 120. The exemplary interface 134 also provides access to the motion web site 136 where new motion media and motion event providers 132 may be downloaded and installed.

As will be described in more detail below, the configuration options allowed by the interface 134 include the ability to enable/disable event providers 132 and map motion media to particular events supported by each provider 132. The interface 134 also provides access to the motion web site 136, allowing for new motion media and motion event providers 132 to be downloaded and installed onto the current system.

Each motion event provider 132 contains a visual configuration control 158 that allows the user to configure the events supported by each provider 132. The exemplary configuration controls 158 use the media view control object 156 to gain access to the available motion media in the motion media file 144 that can be mapped to each available event.

These controls may also be configured to allow the user to add new, customized events to the motion event providers 132. The dynamic events can be defined using parameters such as text (usernames, messages, email, etc.), date/time, or any other parameter particular to an event provider's event source.

The media view control object 156 provides access to all installed motion media scripts as represented by the motion media file 144. Preferably, the media view control object 156 displays a conventional browse/select dialog to allow identification and selection of the available motion media. This object 156 is used by the event provider configuration controls 158 and allows the configuration controls 158 to remain independent of the motion media format.

The media creation tool application 138 allows the user to customize and/or create motion media. This application 138 preferably implements a graphical, easier to use, front-end user interface design.

The motion web site 136 provides a location for the user to download new motion media as well as new and/or updated motion event providers 132. The motion media is preferably stored in a single meta file. New motion media downloaded from the motion web site 136 will be added to this meta file.

The present invention is preferably embodied using the Windows registry; typically, a component category is created for each of the motion event providers 132, allowing the motion event manager 130 to enumerate all providers 132 installed on the system. Primary event sources 132 are user actions (in any active application supported via a motion event provider) and operating system tasks.

With the foregoing understanding of the modules that form the exemplary system 120, various scenarios in which these modules typically interact will now be described.

Figure 2:
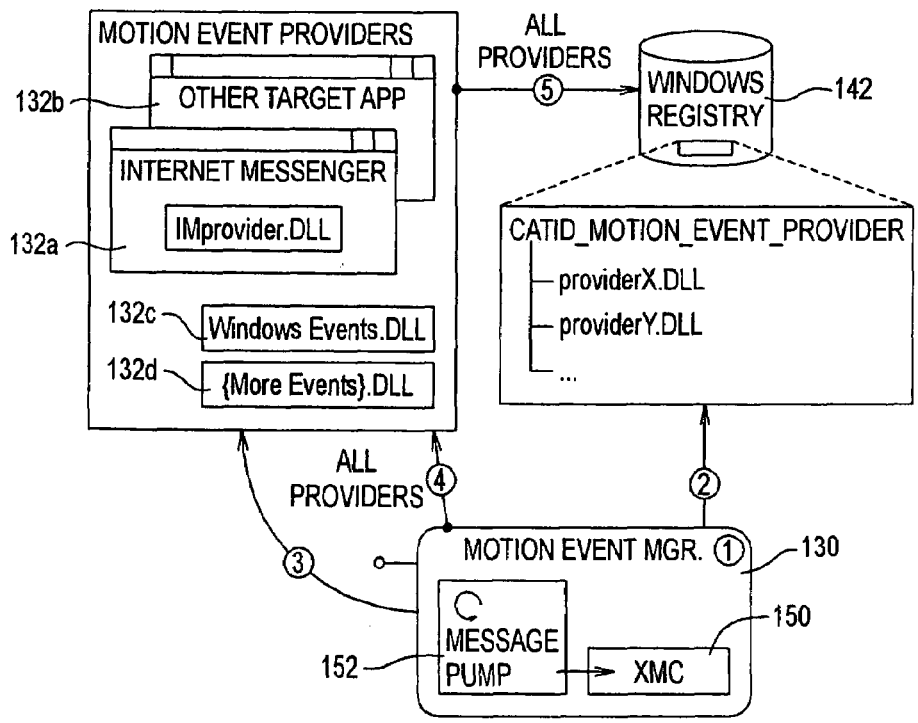
FIG. 2 is a scenario map depicting the startup and initialization of the system of FIG. 1.

Referring now to FIG. 2, depicted therein is the scenario describing the startup process of the motion event manager 130 of the system 120. Each of the steps of this startup process will now be described with reference to FIG. 2.

The motion event manager 130 process 130 begins on system startup. The motion event manager 130 process 130 next queries the MOTION_EVENT_PROVIDER component category in the Windows Registry to enumerate all motion event providers 132 installed on the system.

Third, the registry entry of each of the event providers 132 contains startup information indicating if the particular event provider is either a standard in-proc provider or a specialty provider that is injected into a target process to monitor event conditions.

Fourth, the motion event manger 130 creates a new instance of each provider 132. If the event provider 132 is a specialty provider that is injected into a target application process, the event manger 130 will read the target-process information from the provider's registry entry, find the target process, and perform the DLL-injection. If the target process is not active, the motion event manager 130 will continually monitor the creation of new applications, and perform the injection when/if the requested application is launched.

Fifth, once the event providers 132 are created, the motion event manager 130 will send the appropriate initialization information to each provider 132, including callback information to allow the event providers 132 to post event messages back to the event manager 130.

Finally, the event provider 132 reads initialize message data and establish the necessary event syncs to monitor the events. The initialize message data includes a registry key identifying the location of the event configurations and preferences as last set by the motion event configuration interface 134 or the default installed set.

Figure 3:
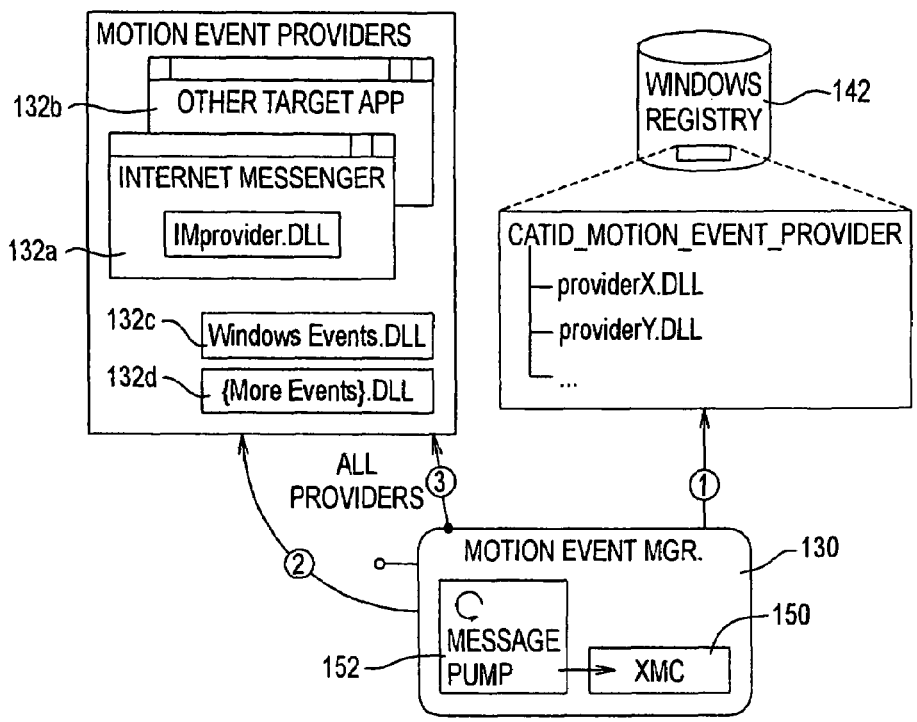
FIG. 3 is a scenario map depicting the process of injecting a motion event provider DLL into the address space of a target application.

Referring now to FIG. 3, depicted therein is the DLL injection scenario map. This scenario describes the process of injecting a motion event provider DLL into the address space of a target application.

As shown in FIG. 3, the first step of this process is for the motion event manager 130 to determine which process into which the motion event provider 132 must be injected based on the registry entry of the provider 132.

Once the target process has been identified, the next step is for the event manager 130 to install a Windows message hook in the target process. This causes the event provider DLL to be loaded into the target address space of the target process. The event provider DLL has now been loaded into the required process, and will now wait for the "initialize" message from the motion event provider 132.

Figure 4:
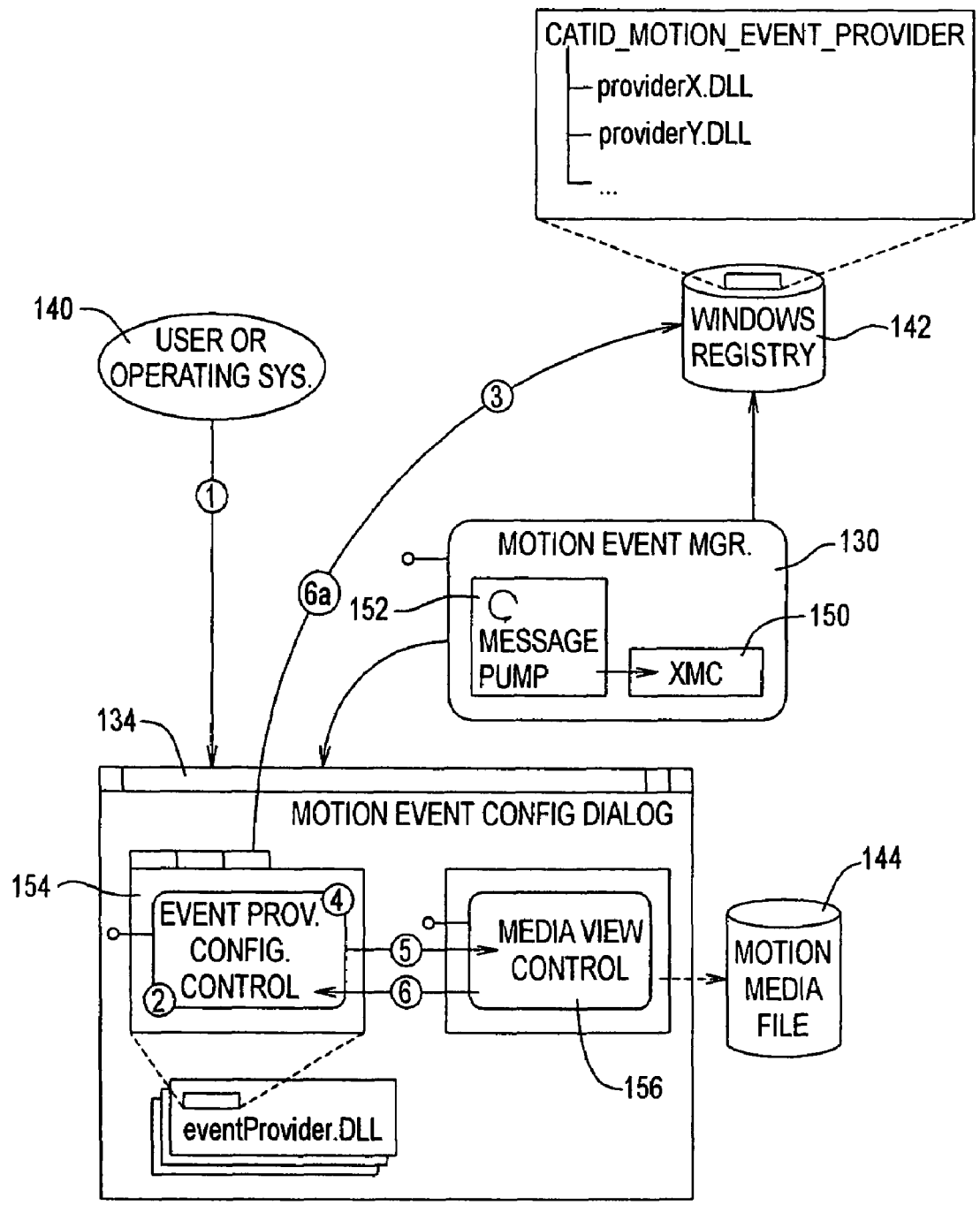
FIG. 4 is a scenario map depicting the process of configuring motion events provided by each of one or more motion event providers 132.

Referring now to FIG. 4, depicted therein is the motion event configuration scenario map. This scenario map describes the process of configuring motion events of each of the motion event providers 132.

First, the user launches the motion event configuration interface 134 from system tray interface of the motion event manager 130.

Each event provider object 132 supports a custom visual control 154 that can be used to edit the object's supported events. The event configuration interface 134 creates and hosts these visual controls 154 for the user.

Next, when the event provider configuration control 154 is created and initialized, it will receive the location in the Windows Registry 142 of its persisted event data, which will be loaded into the control 154.

Next, the user will select an event provider 132 to configure. Individual events may be mapped to motion actions, and particular events (as well as the entire event provider itself) may be deactivated if desired. As noted above, these event configuration controls 154 may also provide the means to add additional, customized events based on input user parameters (custom text strings, buddy chat names, email messages, etc).

When the user selects an event to configure, the event provider configuration control 154 will defer to the media view control object 156. The media view control object 156 displays all available motion media via a dialog box, allowing the user to make a selection.

Finally, once the user makes a motion media selection, the media view control object 156 returns data back to the event provider configuration control object 154 (including human-readable description text of the event for display as well as a data token which can later be used to identify media selection). The configuration control object 154 then persists this information to the Windows Registry 142.

Referring now to FIG. 5, depicted therein is a motion event scenario map. This scenario describes the process of handling a motion event.

The scenario depicted in FIG. 5 begins whenever an event occurs. The occurrence of an event may be caused from a user action, operating system event, or an event situation monitored in a third-party application.

The event provider 132 then fires a event token associated with this event to the event manager 130. The event token has previously been stored in the registry during the event configuration process. If the provider 132 requires queried data to be returned, the provider 132 will also pass the necessary callback data to the event manager 130.

The event manager 130 next receives the event and passes the requested media information to the motion control component 150. The motion control component 150 then executes the specified motion media on the target motion device 122.

Finally, if a query action was requested, the motion control component 150 will return the appropriate data. The motion event manger 130 will send the data through the specified event provider callback mechanism.

Depicted in FIG. 6 is a motion web site scenario map. The scenario of FIG. 6 describes how a user may obtain new motion media and motion event providers 132 from the motion web site 136.

This process may be started when users visit the motion web site 136 to browse currently available motion event providers 132 and new motion media. In FIG. 6, the reference character 144*a* is used to represent a motion media file stored locally by the system 120, while the reference character 144 represents a motion media file stored at a remote location.

Next, the user selects the desired provider/media download option, and the new software is installed into the motion event manager 130 including the motion control component 150.

The next time the motion event configuration interface 134 is launched, the user will be able to configure the new event provider 132 or motion media in the local motion media file 144*a*.

Alternatively, users may download new event providers 132 and motion media directly from within the motion event Configuration dialog interface. This configuration dialog will provide the following options to the user: Download new Motion Media and/or Download/install new motion event providers 132. The user or the motion event manager 130 may also check for new versions of currently installed motion media and/or event providers 132.

Next, the user selects the desired provide/media download or update option, and the configuration dialog interface object 134 automatically downloads and installs the new software from the media web site 136.

Finally, once the new software is installed the configuration dialog 134 will automatically update to provide access to the new components and/or media.

Referring now to FIG. 7, depicted therein is the system shutdown scenario map. This scenario describes the process of shutting down the exemplary event manager module 130 associated with the motion control component 150.

Upon operating system shutdown, the motion event manager 130 will prepare to terminate.

The event manager 130 next posts a shutdown message to each event provider 132 currently being managed by the manager 130. Specialty event providers 132 that have been injected into external processes may have already finished if the target process has been shutdown. In this case those event providers 132 would have already notified the event manager 130 that they are no longer available.

Each event provider 132 performs any required shutdown tasks.

Upon finishing any shutdown tasks, each provider 132 will notify the event manager 132 that the provider 132 is now finished.

Once the event manager 130 receives notifications that each of the event providers 132 managed thereby have been shutdown, the event manager 130 itself is now finished.

Referring now to FIG. 8, depicted therein is a scenario map illustrating the mapping of text to motion events. This scenario generally describes the mapping of text based event situations to motion.

The first step of this process is for a text based event situation to occur. This text could be one or more of the following: (a) a particular sub-string in an Instant Message or the entire message string itself; (b) an Instant Message sent from a target screen or 'buddy' name; (c) a text string converted from a speech-to-text engine installed on the user's machine; and/or (d) an email message meeting previously configured criteria (Sent From, Subject, message content, etc). In the case of an event created using a peer-to-peer networked application such as Instant Messenger-type process, text is entered at a remote source application and sent as a text message to a receiving application.

The motion event provider 132 monitoring the specific text based event catches the event, and performs any pre-processing of the text required to identify the particular event. In the peer-to-peer application described above, a DLL functioning as the event provider 132 is injected into the receiving application; the DLL event provider 132 intercepts the message received by the receiving application and treats the received message as an event.

Once an event has been identified, the event provider 132 will lookup the corresponding motion event token as previously configured. As generally described above, the motion event tokens are pre-loaded upon initialization. In the peer-to-peer example described above, the DLL functioning as the event provider 132 sends the text message as part of the event token to the event manager 130 using a process-to-process communication system as generally described above.

After the event token containing the text message is sent to the motion event manager 130, the event manager 130 determines the type of event represented by the received token.

If the event manager 130 determines that the received event token corresponds to a text event, the event manager 130 next parses the text parameter from the event token. The motion event manager 130 looks up the motion media associated with the event type and event text parameter. The appropriate motion media is then sent to the motion control component 150 for execution on the target motion device 122 as described above with reference to FIG. 5.

The process described above with reference to FIG. 8 can also occur in the reverse. In particular, the event manager 130 uses the motion control component 150 to continually query the target device 122 for state information. When the state information meets certain parameters, the control component 150 causes the event manager to 'create' a new event (such as a text event) and send it to an event provider 132.

The event provider 132 in turn then causes the receiving application to sent a message to a remote peer-to-peer application; again, the receiving and remote peer-to-peer applications may be Instant Messenger compatible applications.

An example of the use of the present system to verify motion status would be for the event manager 130 to continually or periodically query the target device 122 through the motion control component 150 for status parameters that indicate a fault condition. Once a fault condition occurs, the event manager 130 builds a text message that describes the fault and then sends the text message to a remote application, such as an Instant Messenger user, using process-to-process communication system and the peer-to-peer networked application.

The following Table A describes the interface specifications for components of the exemplary motion control system 120 described above using the exemplary motion control component 150.

TABLE A

| component | interface | method(s)/description |
|---|---|---|
| motion event manager 30 | | |

TABLE A-continued

| component | interface | method(s)/description |
|---|---|---|
| | IXMCEventProviderMgt | EnumerateProviders used by configuration dialog object to get a list of all installed motion event providers 132 EnableProvider( ) used to enable/disable given event providers. will be called from the configuration dialog object |
| | IXMCEventScheme | GetSchemes( ) used by configuration dialog object to get current list of schemes on the system AddScheme( ) - used by configuration dialog object to add a new scheme RemoveScheme( ) - used by configuration dialog object to remove a given scheme RenameScheme( ) - used by configuration dialog object to rename a given scheme |
| Event configuration controls 158 | IXMCEventConfig | Initialize( ) - called by the configuration dialog object which hosts this control, used to pass required init data, such as 1) current registry location where event configuration data may be loaded/persisted, 2) interface to the media view control 156, etc . . . |
| Media View Control 156 | IXMCMediaViewCtrl | method: SelectMedia( ) - called by each event configuration control. This method will display a dialog to visualize all motion media available on the system and return a tokenized data param that can later identify the media item selected |

In the following discussion, the details of a number of the exemplary components of the system 120 will now be described.

The Windows Registry 142 is used to persist event management with motion control configuration data.

Data associated with the motion event providers 132 is persisted to the Windows Registry 142 primarily to accommodate event provider DLLs that need to be injected into a target process, an environment where those DLLs may not be able to rely on standard COM storage alternatives.

At runtime, when the motion event manager 130 initializes an event provider, the provider will receive a location in the registry where it should read its previously configured event data.

At design time, when hosted within the motion event configuration interface 134, the event configuration controls 156 of the event providers 132 receive the registry location, and will persist configuration changes to that location.

Event providers will persist both standard (hard coded) and custom events to their registry storage location. Associated with each event will be the configured motion event token data, which the provider will use when firing event notifications back to the motion event manager 130.

The motion event manager 130 manages all registry locations for the event provider objects.

The event manager provides a mechanism to support different event schemes. This allows configurations unique for several different users, situations, or motion devices. When a new scheme is selected via the motion event configuration interface 134, the event manager 130 will pass the new scheme registry location to each event provider object 132, allowing access to the new scheme data. Each scheme will be located in a unique sub key under the primary event manager registry location.

The user interface components 154 and 156 of the system 120 may be implemented in many different forms. The motion event configuration control 154 is used to configure all motion event providers 132 installed on the system, as well as to provide access to the motion web site 136 where new motion media and motion providers may be downloaded and installed. The interface of the media creation tool 138 is a preferably graphical representation of the motion device or system, where simple drag-drop, click, and record operations will facilitate the creating and modification of motion media.

The system 120 is designed to be easily extendible via new motion event provider and motion media components. The system 120 is also capable of supporting any number of additional event sources with the addition of new motion event providers 132 by registering these new providers with the system 120. These event providers 132 can link to virtually any event source to a target system 122.

The motion media formats can be modified and extended without requiring changes to any event provider objects. For example, a XMCMediaCtrl object proxies the raw motion media format to the event providers. Accordingly, once the XMCMediaCtrl component is updated to handle any new media formats, the event providers 132 may, by design, make use of the changes.

Instead of triggering entire motion programs as described above with reference to FIG. 6, a motion program or media set may be streamed to the device 122 through the system 120. Whether or not and how the media plays may be controlled by captured events. For example, a media player may fire events based on different musical notes or tones. When such events are received, one media stream may be selected over another, thus causing the motion device 122 to perform different actions. This may also occur with the standard motion programs described above.

Very large motion programs may be downloaded in partial form and then either downloaded in full over time or as certain specified events occur in the system.

Similar to streaming media support, single motion operations may also be supported in which a specified event causes a single motion operation to take place immediately. One example of this would be an event that causes movement of one axis in the clockwise direction.

Figure 9:
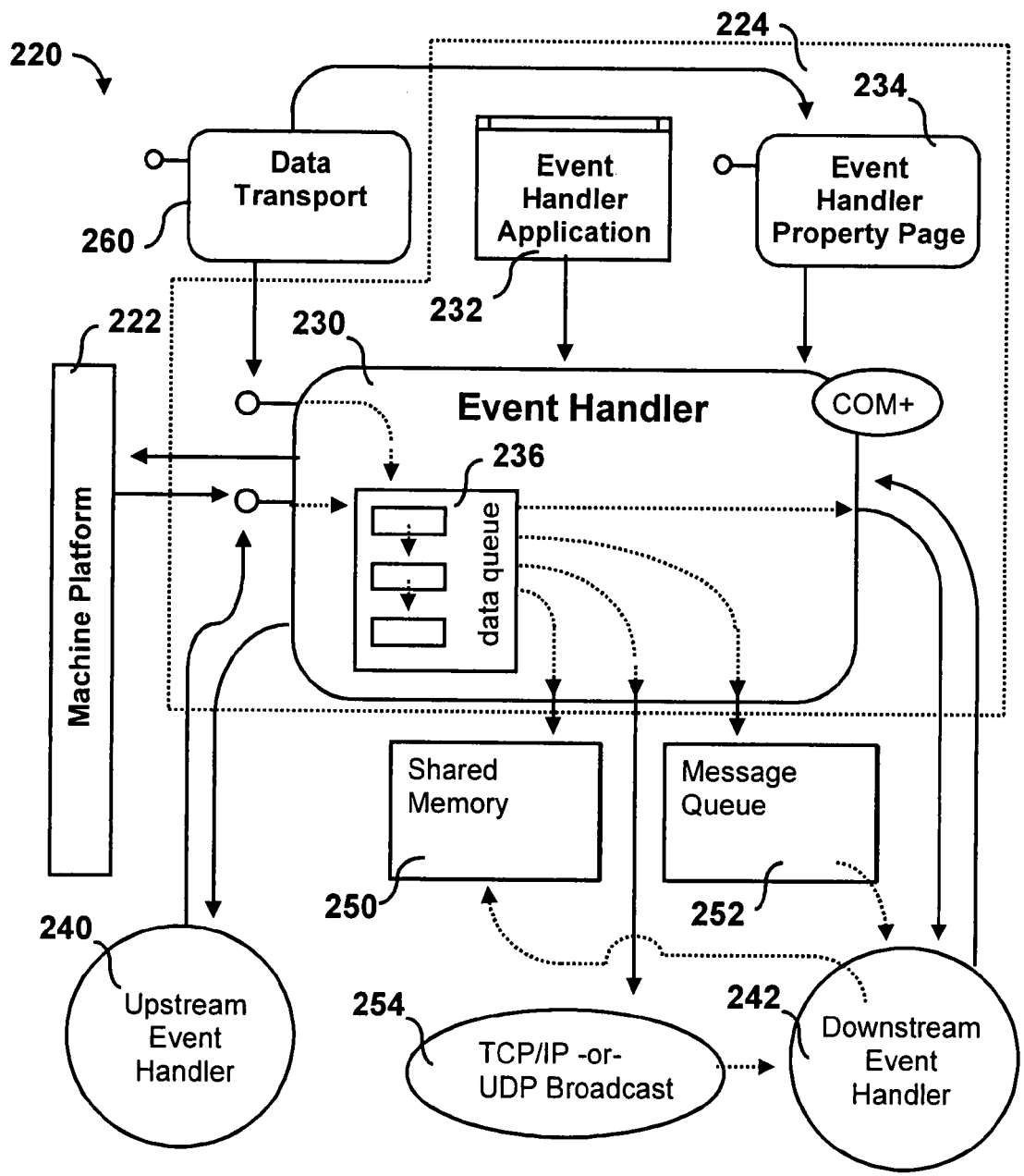
FIG. 9 is a module interaction map depicting interactions of modules forming another example motion control system of the present invention.

Referring now to FIG. 9, depicted therein is a second example of a motion control system 220 constructed in accordance with, and embodying, the principles of the present invention. The motion control system 220 comprises a machine platform 222 and an event notification system 224.

The machine platform 222 may be implemented using a controller neutral platform technology as described, for example, in U.S. Pat. Nos. 5,691,897, 5,867,385, 6,209,037, 6,480,896, 6,513,058, 6,516,236, 6,542,925 and/or 6,571,141, which are incorporated herein by reference. However, the machine platform 222 is or may be any motion control system, whether controller dependent or controller neutral, that comprises a machine converts motion commands into movement of an object.

In the context of the present application, the term "controller" refers to the hardware or software that contains the logic used to run the machine. Typically the controller one or more of a PLC, CNC Controller, or Motion Controller. The controller contains the main control loop used to position, monitor, or otherwise direct a machine to carry out useful automated tasks.

The term "machine" is used herein to refer to a physical machine or device asset used to perform a specified task. For example, a machine may be a CNC Mill used to shape metal, a pick-n-place machine used to position parts on a circuit board, a robotic machine used to perform surgery, a medical data input device used to collect the vitals from a human being (i.e. blood glucose meter, asthma meter, etc), a gaming device used when playing a game, a robotic toy, an animatronics figure, a robotic machine used to deliver goods to a warehouse or to people, an automobile, truck or farm vehicle, a boat or ship that maneuvers in water, a airplane, jet, helicopter and/or spacecraft. Any self powered machine or device (mobile or not) that is either directly controlled by humans or automatically controlled via a computer based system falls within the definition of "machine" as used herein. The term "device" as used herein is essentially synonymous with the term "machine," but may be used in reference to a machine with a relatively small footprint.

The example event notification system 224 comprises a main event handler 230, one or more event handler applications 232, and one or more event handler property pages 234. The example main event handler 230 comprises a data queue 236.

The main event handler 230 is a component that is in communication with the machine platform 222 such that the main event handler 230 receives one or more events from the machine platform 222. The example data queue 236 within the main event handler 230 is a standard data queue that employs first-in/last-out technology. Optionally, the data queue 236 may be implemented as a priority queue that allows the items in the queue to be organized based on given priorities associated with the data contents of each item in the queue. The data queue 236 may optionally use a timing scheme that ensures that all items within the queue are processed within a given time frame, such that no items within the queue are 'starved-out' when a high frequency of higher priority items are received.

The event handler application 232 is used to configure and run the main event handler 230. The example event handler application 232 is a Windows System Tray application. The event handler application 232 is optional, and the main event handler 230 may be run and configured using other systems and methods. The event handler property page 234 is used to configure the settings of the main event handler 230 by presenting a user interface that allows the user to see the settings of the main event handler 230 and/or to change these settings.

The main event handler 230 is also in communication with one or more possible event destinations such as an upstream event handler 240 and/or a downstream event handler 242.

The example upstream event handler 240 is a module similar to the main event handler 230 that serves data to the main event handler 230. The example downstream event handler 242 is also a module similar to the main event handler 230, but one that receives data from the main event handler 230. From the perspective of the upstream event handler 240, the main event handler 230 is a downstream event client. From the perspective of the downstream event handler 242, the main event handler 230 is an upstream event client.

The main event handler 230 may also be in communication with one or more event destinations through an intermediate destination such as a shared memory system 250, a memory queue 252, and/or a network protocol 254. The shared memory system 250 is a block of memory that is accessible to different modules and/or applications. The example memory queue 252 uses Microsoft Message Queue (MSMQ) technology or a similar technology. MSMQ allows for communication with other modules and/or applications using a delayed messaging technology called Message Queuing. The example network protocol 254 is formed using TCP/IP or UDP broadcast protocols as a mechanism of sending output data to another target. The TCP/IP protocol specifies specific data target(s), and the UDP protocol broadcasts data to all nodes on a given network.

The main event handler 230 delegates one or more events received from the machine platform 222 to one or more event destinations such as the upstream event handler 240 and/or the downstream event handler 242. In addition or instead, the main event handler 230 may delegate one or more events received from the machine platform 222 to additional event destinations using one or more of the intermediate destinations such as the shared memory system 250, the memory queue 252, and/or the network protocol 254.

The main event handler 230 may further be in communication with an alternate event source such as a data transport system 260. The data transport system may be implemented using the data router technology described in co-pending U.S. patent application Ser. No. 10/844,025, which is incorporated herein by reference. The data transport system 260 routes data outputs to various output sources, one of which may be the main event handler 230.

If the motion control system 220 employs the data transport system 260, the main event handler 230 may also be configured to delegate events from the data transport system 260 to the event destinations such as the upstream client 240 and/or the downstream event handler 242 and/or to intermediate destinations such as the shared memory system 250, the memory queue 252, and/or the network protocol 254.

Figure 10:
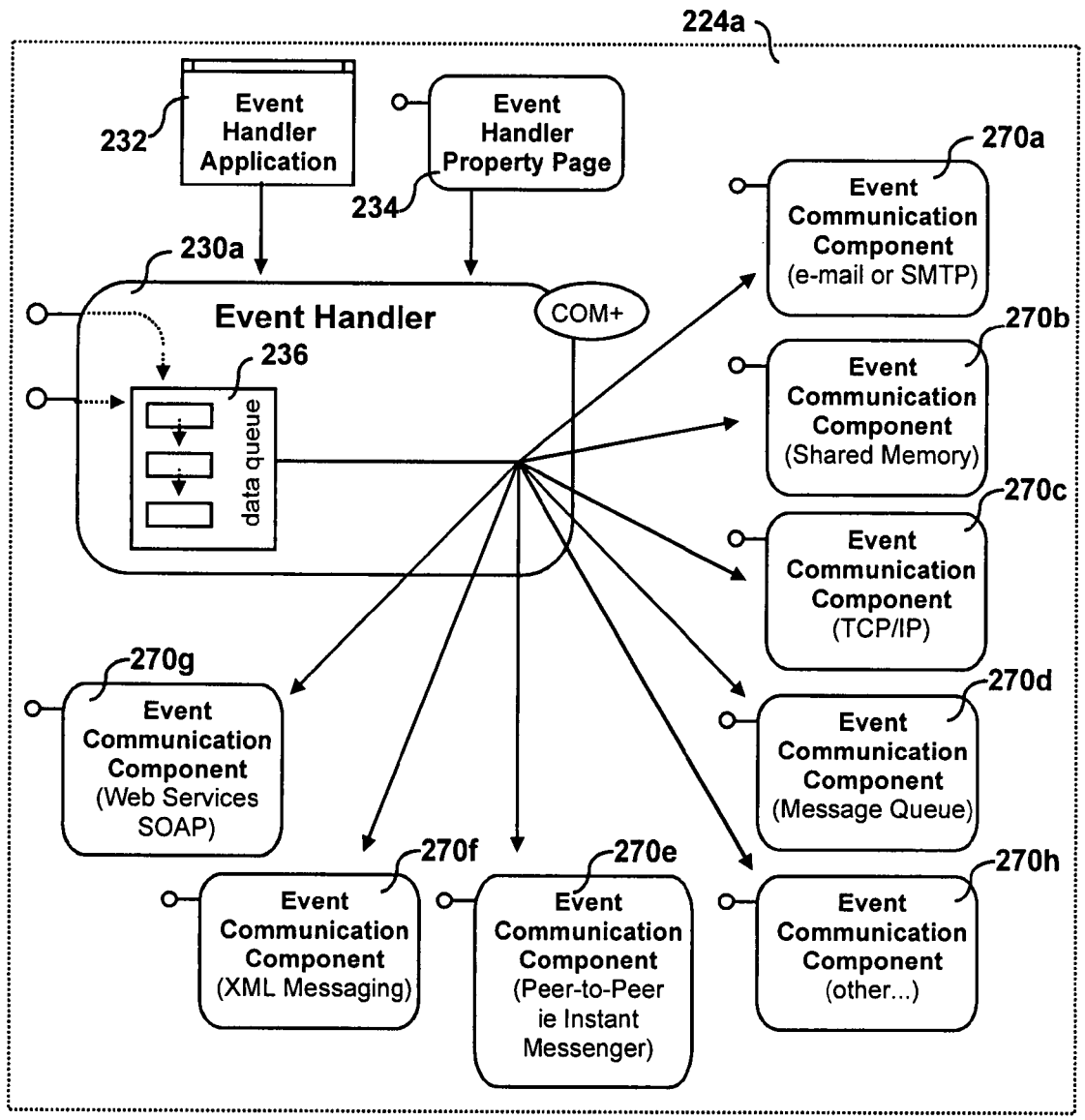
FIG. 10 is a module interaction map depicting an event handling system constructed using a modular output model.

The event notification system 224 may use an event handler, such as the main event handler 230, which is internally configured to handle communications with the event destinations and/or intermediate destinations as shown in FIG. 9. Alternatively, the motion control system 320 may use an event notification system 224a having a modular main event handler 230a as depicted in FIG. 10. The modular event handler 230a is a more modular design where each output is modularized, thus giving the event handler 230a the capability to select from a list of destination modules either programmatically or through a user interface.

In particular, the example modular main event handler 230a further comprises at least one event communication component 270 configured to handle the details of communicating with one or more of the event destinations and intermediate destinations. FIG. 10 shows that the modular main event handler 230a is in communication with the following event communication components: a component 270a configured to communicate using e-mail or SMTP protocols; a component 270b configured to access shared memory such as the shared memory system 250; a component 270c configured to communicate with a network protocol such as the network protocol 254; a component 270d configured to communicate with a memory queue such as the memory queue 252; a component 270e configured to communicate with a peer-to-peer communication system such as Instant Messenger; a component 270f configured to communicate using XML messaging; a component 270g configured to communicate using envelope based communication services such as SOAP; and/or other communications components 270h.

More than one event communication component 270 of the same type may be used simultaneously. For example, the event handler 230a may use two event client components configured to communicate with a network protocol where each component is capable of sending data to a different destination network address.

Figure 11:
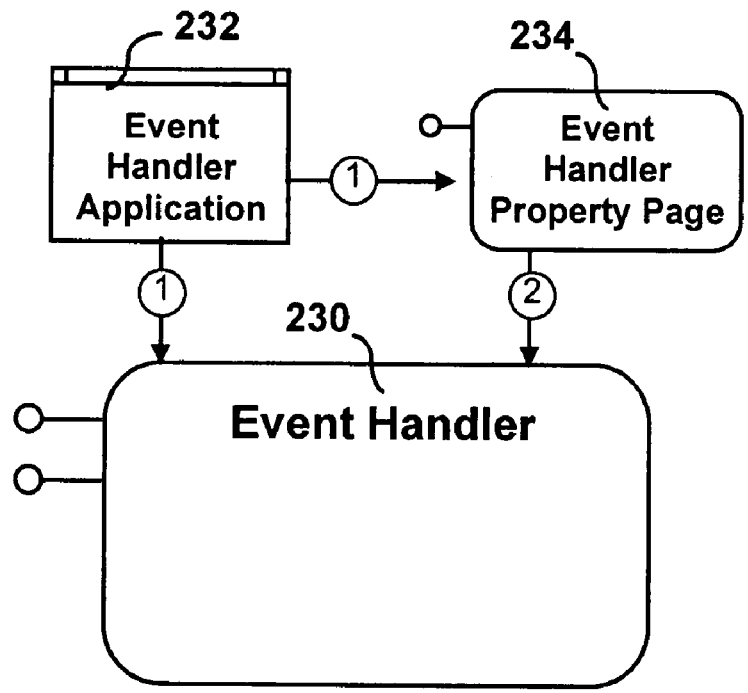
FIG. 11 is a use case depicting the configuration of an event handling component from an application.

FIG. 11 depicts the steps that take place when configuring the system 220 using an application such as the event handler application 301 described above. Initially, in a first step the event handler application 232 queries the event handler 230 for its event handler property page or pages 234. Once received, the event handler property page or pages 234 are displayed to the user. In a second step, configuration changes are saved to the main event handler 230 by changing the properties and/or calling methods of the event handler 230.

Figure 12:
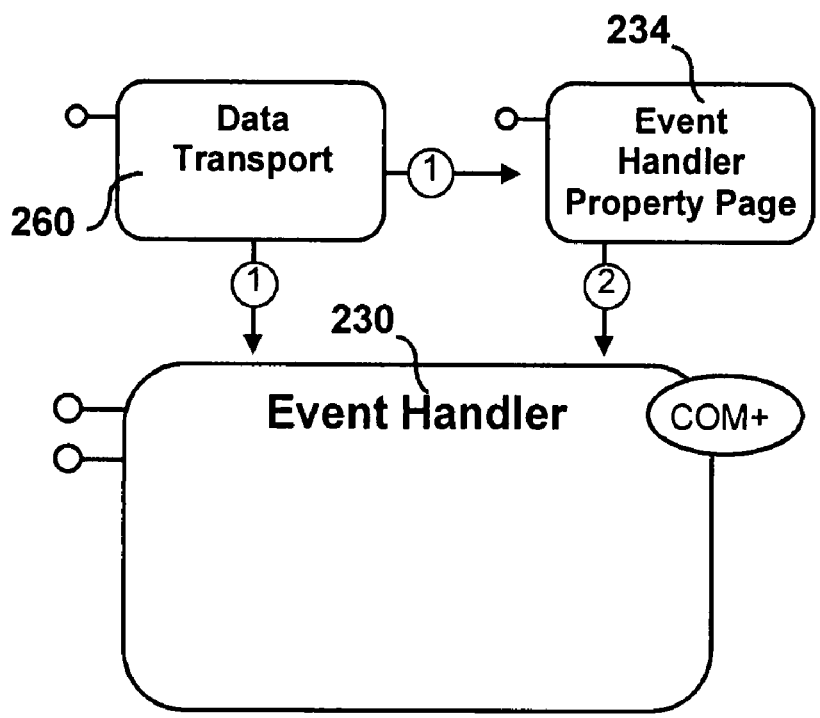
FIG. 12 is a use case depicting the configuration of an event handling component from another component.

FIG. 12 depicts the steps that occur when configuring the event handler 230 from another component. In a first step, the other component, such as the data transport 260, queries the event handler 230 for its event handler property page(s) 234, which, once received, are displayed to the user. For example, this may occur via a property page of the calling component. In a second step, configuration changes are saved to the event handler 230 by changing the properties of the event handler 230 and/or calling methods on the event handler 230. When configuring the event handler 230, each output may be enabled or disabled. Later, when processing data, data is only sent to each enabled output.

Figure 13:
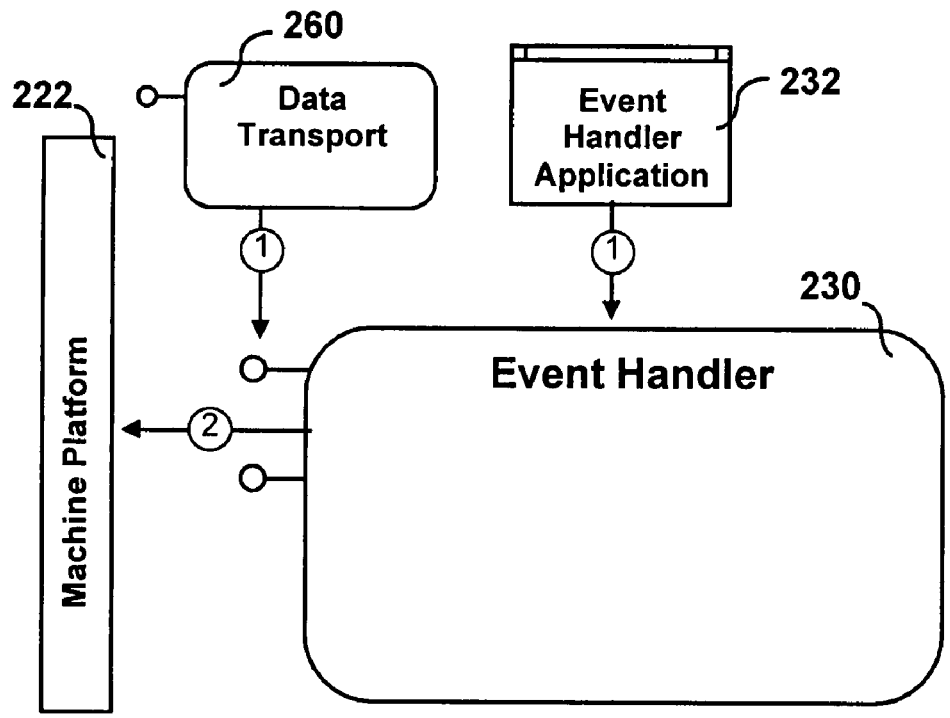
FIG. 13 is a use case depicting the initialization of an event handling component.

Once configured, the event handler 230 must be initialized to prepare it for use. FIG. 13 depicts the steps that take place when initializing the event handler 230. First, a component, such as the data transport 260 and/or the event handler application 232, directs the event handler 230 to initialize itself. Next, the event handler 230 uses its internal properties, which were previously configured during the configuration stage, to connect to a machine platform 222 or an upstream event client 240, and subscribe to the data items specified in the configuration data.

In practice, the data items specified in the configuration data must be data that are published by the machine platform 222, or failures may occur. As used herein, the term "publish" (or publish/subscribe) refers to a method of receiving data updates where the client subscribes to data published by the server. For example, a server may have three data items available for subscriptions: A, B, C. The client may then subscribe to any of these data items upon which the client may receive data updates based upon certain criteria such as the data value of the subscribed data item changing, a time period passing, or some other event occurring in the system such as a trigger variable firing, etc. The term "trigger variable" refers to variable or data item that causes the registered actions to be carried out when the variable or data item's event conditions are met.

Figure 14:
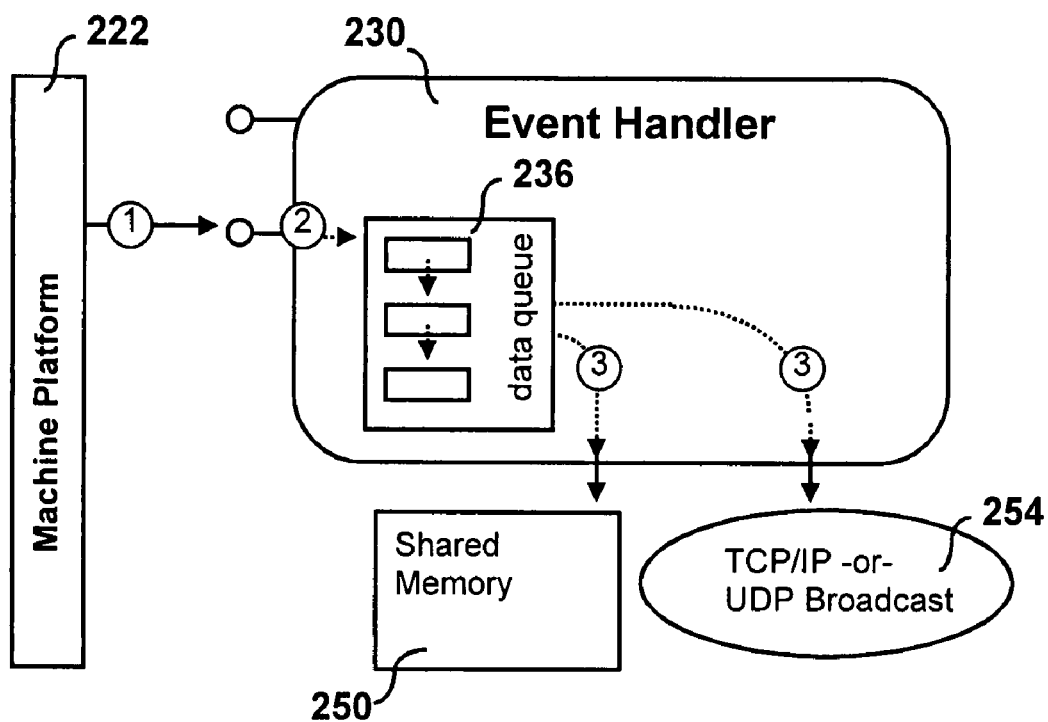
FIG. 14 is a use case depicting the manner in which the event handling component processes events.

Once configured and initialized the event handler 230 is ready to receive events for each of the subscribed data items. FIG. 14 depicts the steps that take place when processing events. First, the event is received from an upstream component such as the machine platform 222 and/or an upstream event handler 240 that is daisy chained to the main event handler 230.

Upon receiving the event, the data is optionally placed at the back of the internal data queue 236. If a queue is not used, the data is immediately sent to all event destinations, such as shared memory system 250 or the network protocol 254, that are in an enabled state for that event. If the internal data queue 236 is used, data items are pulled off the data queue according to the rules for that queue and sent to all outputs that are in an enabled state for that event. As described above, the data queue 236 may be a first-in/last-out queue, a priority queue, and/or a queue implementing a timing scheme.

Figure 15:
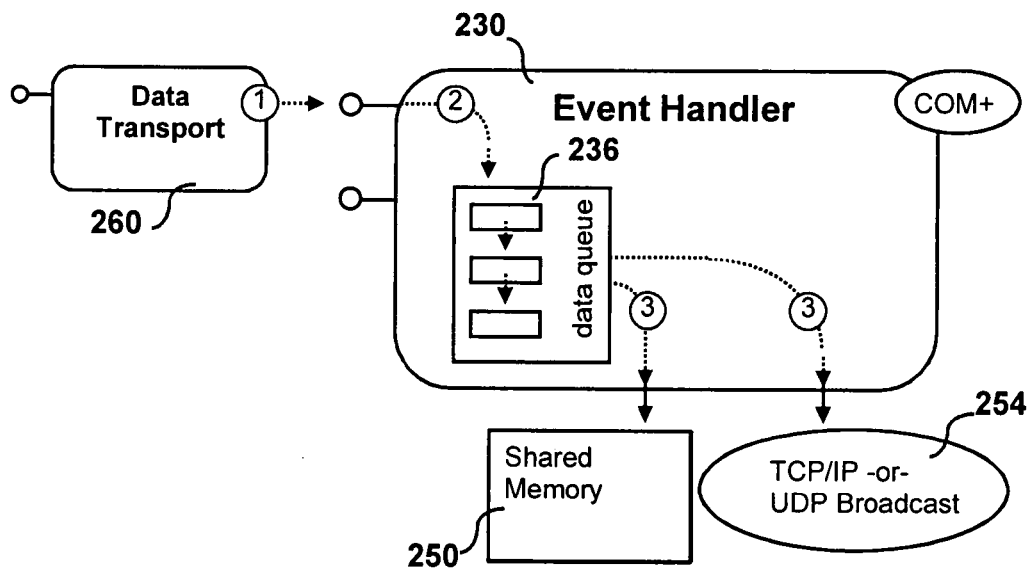
FIG. 15 is a use case depicting the manner in which the event handling component processes commands.
Figure 17:
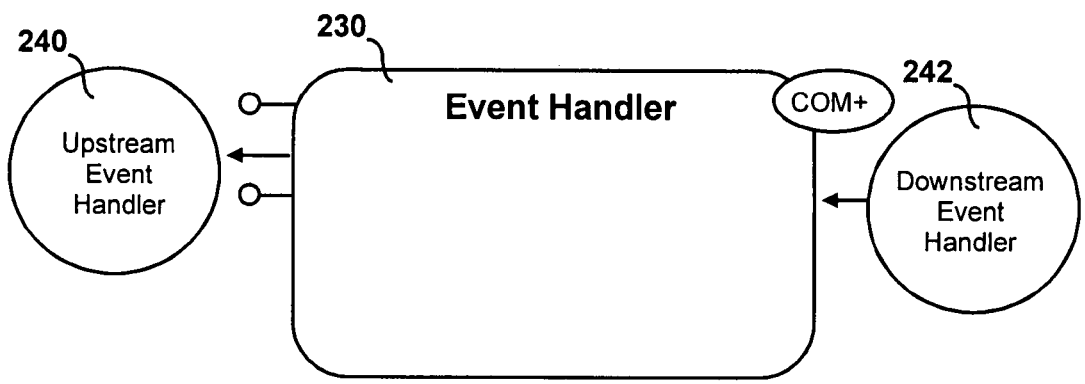
FIG. 17 is a use case depicting the manner in which an event handling component passes configuration data to other event handling components in a daisy chain configuration.

In addition to processing events, the event handler 230 may also process commands via API calls to one of its interfaces. For example, the data transport 260 may direct the event handler 230 to send data to an event destination by calling an API of the event handler 230. FIG. 15 depicts the steps that occur when processing a command using API calls. First, the remote component such as the data transport 260 may call an event handler API through which the data is passed. When called, the API may optionally place the data into an internal data queue 236. If a data queue is not used, the data is passed directly to all outputs, such as the shared memory system 250 or the network protocol 254, that are in an enabled state for a given event.

Figure 16:
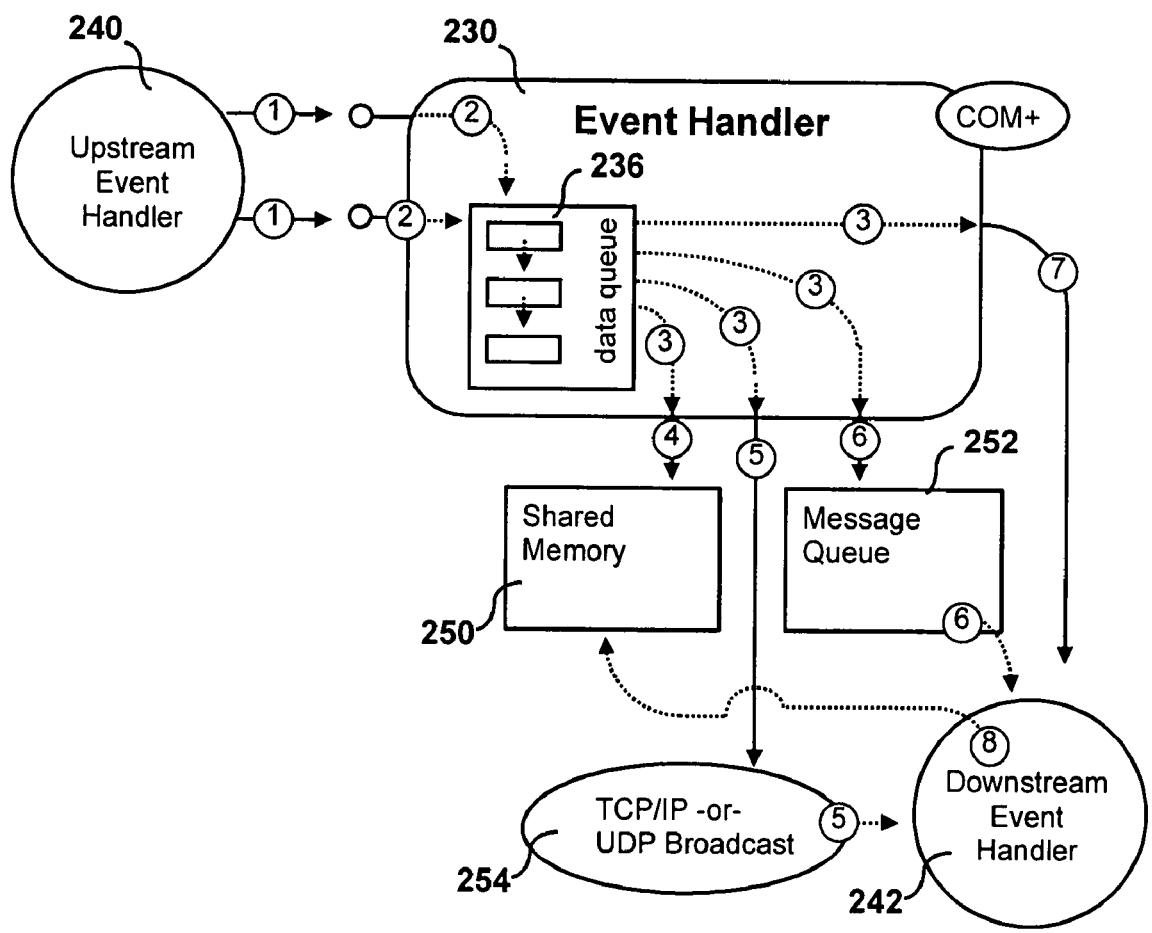
FIG. 16 is a use case depicting the manner in which events and commands are processed in a daisy chain of event handling components.

Optionally, the main event handler 230 may be daisy chained with one or more upstream event handlers 240 and/or one or more downstream event handlers 242. In this case, data is received from upstream event handlers 240 and/or sent to downstream event handlers 242. FIG. 16 depicts the steps that occur when processing events or commands in a daisy chained configuration.

First, if an event handler is connected upstream to the main event handler 230, the data is received from that upstream event handler 240 as an event and/or as an API call. If an upstream event handler 240 is not used, data may be received in the normal manner either via an event or API call. Next, upon receiving the data as an event and/or as an API call, the data may be placed at the back of an internal data queue 236 if used. If a data queue is not used, the data is sent directly to all outputs (such as shared memory system 250 or network protocol 254) that are in an enabled state.

Third, when using the internal data queue 236, the data is pulled from the data queue and sent to all enabled outputs. Again, the data queue may be a first-in/last-out queue, a priority queue, and/or a queue implementing a timing scheme.

Fourth, if a shared memory 306 output is used and is enabled, the data is sent to a shared memory block.

Fifth, if a network protocol 254 is used and is enabled, the data is sent to zero, one, or more event destinations previously configured for this output in the case of a TCP/IP network. As described above, the data may be sent as a UDP broadcast to all nodes on a network or group of networks. TCP/IP may also be used to send the data via a tunneling mechanism, such as is used within a Virtual Private Network (like those implemented with Microsoft RRAS), from the current event handler 230 to another event handler 230 (or even to a group of event handlers 230), where the receiving component receives the TCP/IP or UDP data and then translates it into an event or API input.

Sixth, if a message queue 252, such as a MSMQ, event destination is used and enabled, the data is sent via the message queue 252 to another application or component, or even to another event handler 230 (or group of components).

Seventh, if one or more upstream event handlers 240 and/or one or more downstream event handlers 242 are used and enabled, the main event handler 230 sends data directly to any such event handlers 24- and/or 242.

As an optional eighth step, a downstream event handler 242 may be configured to communicate with the upstream event handler 230 via the shared memory 306 and/or other standard synchronization events such as the event object supported within Win32.

When daisy chaining event handlers, it may also be important to pass configuration data (and other data) between the event handler components. When configuring any such event handler components as depicted in FIG. 15, the downstream event handler 242 may pass configuration information on to the main event handler 230. For example, when subscribing to data, any downstream event handler will notify any upstream event handler of all data items that are to be subscribed. The subscribing data may be continually passed along the daisy chain to modify any upstream event handlers and/or directly notify the machine platform 222, if it is connected directly to the machine platform 222.

The event handler 230 is preferably a modular system made up of a set of components (i.e. each component is based on a component technology such as OLE/COM from Microsoft Corporation). Optionally, each component may use a separate 'parallel' ActiveX component and/or a property page component to implement all user interface aspects of the main component. Each ActiveX and/or property page component may be implemented either within the main component module or separately in its own module. Bundling each object within one module is not required as they may be located at any location (i.e. across a network, and so forth), but doing so may optimize all communication between modules. How and where components are implemented is a logistical decision. Once components are built and deployed to the field, it is difficult to update a single component if all components are implemented within a single DLL or EXE module.

Figure 18:
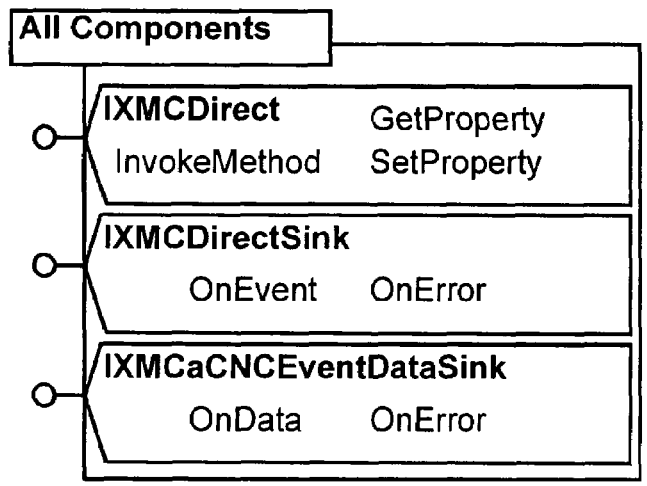
FIG. 18 is a module layout depicting the interfaces exposed by the event handling component.

FIG. 18 depicts an example of the interfaces exposed by the example event handler components. In the example motion control system 220, all components making up the system 220 at a minimum implement a single interface—the IXMCDirect interface. Optionally, if they are to receive events from other components, the event handler components 230, 240, and 242 implement the IXMCDirectSink interface as well. And finally, the event handler components 230, 240, and 242 may optionally implement the IXMCaCNCEventDataSink interface if they are to receive events directly from the machine platform 222. The IXMCDirect, IXMCDirectSink, and IXMCaCNCEventDataSink interfaces will be described in further detail below.

OLE Categories are used to determine how many components fall into a certain group of components. Currently, components used to form the event handler components use what will be referred to herein as the XMC Data Router components. The XMC Data Router components are general data router components support the general read, write, and configure API.

The IXMCDirect interface is used for most communications between all components making up the event handler 230. The following methods make up this interface (as specified in the standard OLE/COM IDL format).

The IXMCDirect interface is made up of the following functions.

GetProperty—This method is used to query a specific property from the component implementing the interface.

SetProperty—This method is used to set a specific property from the component implementing the interface.

InvokeMethod—This method is used to invoke a specific action on the component implementing the interface. It should be noted that an action can cause an event to occur, carry out a certain operation, query a value and/or set a value within the component implementing the method.

A more detailed description of each method implemented by the object is described below.

| IXMCDirect::GetProperty | |
|---|---|
| Syntax | HRESULT GetProperty( LPCTSTR pszPropName, LPXMC_PARAM_DATA rgData, DWORD dwCount ); |
| Parameters | LPCTSTR pszPropName - string name of the property to query.<br>LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases, a property is made up of a single element, thus a single element array is passed to this method. For more information on the XMC_PARAM_DATA type, see below.<br>DWORD dwCount - number of XMC_PARAM_DATA elements in the rgData array. |
| Return Value | HRESULT - NOERROR on success, or error code on failure. |

The IXMCDirect::GetProperty method is used to query the property corresponding to the property name 'pszPropName'. Each component defines the properties that it supports.

| IXMCDirect::SetProperty | |
|---|---|
| Syntax | HRESULT SetProperty( LPCTSTR pszPropName, LPXMC_PARAM_DATA rgData, DWORD dwCount ); |
| Parameters | LPCTSTR pszPropName - string name of the property to set.<br>LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases, a property is made up of a single element, thus a single element array is passed to this method. For more information on the XMC_PARAM_DATA type, see below.<br>DWORD dwCount - number of XMC_PARAM_DATA elements in the rgData array. |
| Return Value | HRESULT - NOERROR on success, or error code on failure. |

This IXMCDirect::SetProperty method is used to set a property in the component corresponding to the 'pszPropName' property. For the set of properties supported by the component, see the specific component description.

| IXMCDirect::InvokeMethod | |
|---|---|
| Syntax | HRESULT InvokeMethod( DWORD dwMethodIdx, LPXMC_PARAM_DATA rgData, DWORD dwCount ); |
| Parameters | DWORD dwMethodIdx - number corresponding to the specific method to invoke. For more information on the method indexes available, see the set of namespaces defined for the component.<br>LPXMC_PARAM_DATA rgData [optional] - array of XMC_PARAM_DATA types that specify each parameter for the method called. For more information on the XMC_PARAM_DATA type, see below.<br>NOTE: if no parameters exist for the method called, a value of NULL must be passed in.<br>DWORD dwCount [optional] - number of XMC_PARAM_DATA elements in the rgData array.<br>NOTE: if no parameters exist for the method called, a value of 0 (zero) must be passed in for this parameter.<br>LPXMC_PARAM_DATA rgData [optional] - namespace associated with the instance of the custom extension module added. |
| Return Value | HRESULT - NOERROR on success, or error code on failure. |

The IXMCDirect::InvokeMethod method is used to call a specific method implemented by the component. For more information on the methods supported, see the description of the specific component.

The IXMCDirectSink interface is an event reception point on which one component can send event data to another. The component implementing this interface is the event receiver, and the event source calls the interface passing to it event data.

The IXMCDirectSink interface is made up of the following functions:

OnEvent—This method is called by the event source when an event occurs (i.e. the conditions defining the event are met).

OnError—This method is called by the event source when an error occurs.

A more detailed description of each method implemented by the object is described below.

| IXMCDirectSink::OnEvent | |
|---|---|
| Syntax | HRESULT OnEvent( long lApiIdx, SAFEARRAY** ppSA ); |
| Parameters | long lApiIdx - index associated with the event type . . .<br>SAFEARRAY** ppSA - pointer to a pointer to a SAFEARRAY containing an array of XMC_PARAM_DATA structures. For more information on the XMC_PARAM_DATA type, see below. |
| Return Value | HRESULT - NOERROR on success, or error code on failure. |
| Notes | The SAFEARRAY passed to this method contains an array of XMC_PARAM_DATA structures. This array has the following entries: |
| rgData[0] | LONG lConnection Cookie - unique cookie associated with this connection to the XMC Motion Server (returned when calling the InitializeHardware method on the XMC Motion Server). |
| rgData[1] | DWORD dwSubscription Cookie - unique cookie associated with the subscription for which this event has fired. This cookie is returned when making the subscription. |
| rgData[2] | DWORD dwDataCookie - unique cookie associated with the specific data change that triggered the event. This cookie is generated within the XMC Motion Server. |
| rgData[3] | LPCTSTR pszItemName - name of the item or variable for which the subscription is associated. |
| rgData[4] | double dfTimeStamp - number of milliseconds passed from the time that the event pump, implemented by the XMC Motion Server, was first started. |
| rgData[5] | DWORD dwDataCount - number of data values associated with the event (i.e. the number of structure elements that follow). |
| rgData[6 + n] | Number or String - actual data values associated with the event. |

The IXMCDirectSink::OnEvent method is called by the event source and passed the event data in a SAFEARRAY form for easy marshalling across process boundaries.

| | IXMCDirectSink::OnError |
|---|---|
| Syntax | HRESULT OnError( long IApiIdx, SAFEARRAY** ppSA ); |
| Parameters | long IApiIdx - index associated with the event type . . . |
| | SAFEARRAY** ppSA - pointer to a pointer to a SAFEARRAY containing an array of XMC__PARAM__DATA structures. For more information on the XMC__PARAM__DATA type, see below. |
| Return Value | HRESULT - NOERROR on success, or error code on failure. |
| Notes | The SAFEARRAY passed to this method contains an array of XMC__PARAM__DATA structures. This array has the following entries: |
| rgData[0] | LONG IConnectionCookie - unique cookie associated with this connection to the XMC Motion Server (returned when calling the InitializeHardware method on the XMC Motion Server). |
| rgData[1] | DWORD dwSubscriptionCookie - unique cookie associated with the subscription for which this event has fired. This cookie is returned when making the subscription. |
| rgData[2] | DWORD dwDataCookie - unique cookie associated with the specific data change that triggered the event. This cookie is generated within the XMC Motion Server. |
| rgData[3] | LPCTSTR pszItemName - name of the item or variable for which the subscription is associated. |
| rgData[4] | double dfTimeStamp - number of milliseconds passed from the time that the event pump, implemented by the XMC Motion Server, was first started. |
| rgData[5] | HRESULT hrResult - result code of the error for which the event is associated. |
| rgData[6] | LPCTSTR pszError - string description of the error. |
| rgData[7] | LONG ISrcError - error code describing the source of the error. For example, this may be an error code returned by a computer controlled piece of hardware. |
| rgData[8] | LPCTSTR pszSrcError - string describing the source error. |

The IXMCDirectSink::OnError method is called by the event source when an error occurs and passed the event error data in a SAFEARRAY form for easy marshalling across process boundaries.

In order to receive events directly from the machine platform 222, the event handler 230 also supports the IXMCaC-NCEventDataSink interface as specified in the machine platform 222 product sold by ROY-G-BIV Corporation.

```
[
    object,
    uuid(15D1A3C6-9948-47c7-AFC1-3932AF4518D7),
    dual,
    helpstring("IXMCaCNCEventDataSink Interface"),
    pointer__default(unique),
    oleautomation
]
interface IXMCaCNCEventDataSink : IDispatch
{
        [id(1), helpstring("method OnData")]
        HRESULT OnData(    [in] long IConnectionCookie,
                           [in] long ISubscriptionCookie,
                           [in] long lDataCookie,
                           [in] BSTR bstrName,
                           [in, out] SAFEARRAY (VARIANT) *
pvData,
                           [in] double dfTimeStamp );
        [id(2), helpstring("method OnError")]
        HRESULT OnError(   [in] long IConnectionCookie,
                           [in] long ISubscriptionCookie,
                           [in] long lDataCookie,
                           [in] BSTR bstrName,
                           [in] long hrErr,
                           [in] BSTR bstrErr,
                           [in] long lSrcErr,
                           [in] BSTR bstrSrcErr );
};
```

Figure 19:
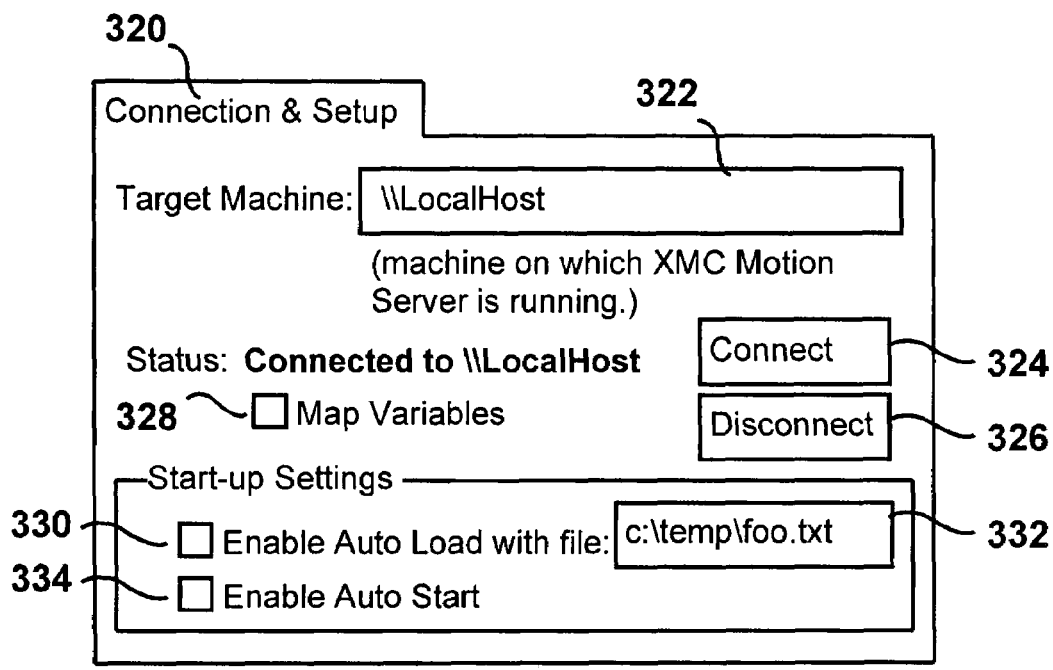
FIG. 19 depicts an example a user interface screen used to configure connection and start-up settings.

Referring now to FIG. 19 of the drawing, depicted there in is an example of the IXMCaCNCEventDataSink OLE Interface.

The following methods make up the IXMCaCNCEvent-DataSink interface.

| Event Name | Description |
|---|---|
| OnData | This event is called on the client application each time the event conditions are met for a given enabled subscription. |
| OnError | This event is called on the client application each time an error occurs while processing a subscription. |

| OnData Event | |
|---|---|
| Syntax | //C++<br>HRESULT OnData( [in] long IConnectionCookie,<br>    [in] long ISubscriptionCookie,<br>    [in] long IDataCookie,<br>    [in] BSTR bstrName,<br>    [in, out] SAFEARRAY(VARIANT)* pvData,<br>    [in] double dfTimeStamp)<br>'OLE Automation<br>Event OnData( IConnectionCookie As Long,<br>    ISubscriptionCookie As Long,<br>    IDataCookie As Long,<br>    bstrName As String,<br>    pvData( ) As Variant,<br>    dfTimeStamp As Double ) |
| Parameters | IConnectionCookie As Long - this is the connection cookie returned by the call to InitializeHardware. Each connection cookie is unique to each application.<br>ISubscriptionCookie As Long - this is the subscription cookie returned by the call to SubscribeVariable.<br>IDataCookie As Long - this is the data cookie that is unique to each operation made by the internal data processing performed by XMC. For example each unsolicited read made by XMC is associated a unique data cookie.<br>bstrName As String - this is the name of the subscribed variable for which the event data is associated.<br>pvData( ) As Variant - this is the actual data for the event and is in the following form:<br>    pvData(0) = number of elements.<br>    pvData(1 + n) = data values.<br>dfTimeStamp As Double - this is the timestamp of the data specified in milliseconds from the start of the XMC Motion Server. |

The OnData event is called each time the event condition for an enabled subscription is met for a subscription configured by a client application. Deadlock can occur when running in multi-application mode and calls to other XMC API are made from within this event hander or another event raised by this event handler. To avoid this situation, applications that implement this method should copy all data from this method into a temporary buffer and immediately return without calling other XMC API.

| OnError Event | |
|---|---|
| Syntax | // C++<br>HRESULT OnError( [in] long IConnectionCookie,<br>    [in] long ISubscriptionCookie,<br>    [in] long IDataCookie, |

| | OnError Event |
|---|---|
| | [in] BSTR bstrName,<br>[in] HRESULT hrErr,<br>[in] BSTR bstrErr,<br>[in] long lSrcErr,<br>[in] BSTR bstrSrcErr,<br>[in] double dfTimeStamp )<br>'OLE Automation<br>Event OnError( IConnectionCookie As Long,<br>    ISubscriptionCookie As Long,<br>    IDataCookie As Long,<br>    bstrName As String,<br>    hrErr As Long,<br>    bstrErr As String,<br>    lSrcErr As Long,<br>    bstrSrcErr As String,<br>    dfTimeStamp As Double ) |
| Parameters | IConnectionCookie As Long - this is the connection cookie returned by the call to InitializeHardware. Each connection cookie is unique to each application.<br>ISubscriptionCookie As Long - this is the subscription cookie returned by the call to SubscribeVariable.<br>IDataCookie As Long - this is the data cookie that is unique to each operation made by the internal data processing performed by XMC. For example each unsolicited read made by XMC is associated a unique data cookie.<br>bstrName As String - this is the name of the subscribed variable for which the event data is associated.<br>hrErr As Long - this is the operating system error received.<br>bstrErr As String - this is a string describing the operating system error received.<br>lSrcErr As Long - this is the source error received that describes the error information in the context of the target control system. This error value is only provided when available.<br>bstrSrcErr As String - this is a string description of the source error received (when available).<br>dfTimeStamp As Double - this is the timestamp of the data specified in milliseconds from the start of the XMC Motion Server. |

The OnError event is called each time an error occurs for a subscription configured by a client application. Applications that implement this method should immediately copy the data received in a temporary buffer and or array and immediately return so as to not cause deadlock within their application. Deadlock can occur when running in multi-application mode and calls to other XMC API are made from within this event handler or another event raised by this event handler.

The Methods and properties exposed by the XMC Event Client component will now be described in further detail.

This section describes the general component properties of each property supported by the event handler 230 component.

| | |
|---|---|
| TARGETMACHINE | rgData[0] - (string); name of the target machine for which the XMC Event Client component is to connect up to and receive data from. |
| OPTIONS | rgData[0] - (DWORD); options describing how the XMC Event Client is to operate. The following options are supported.<br>OF_AUTOLOAD_ENABLED - when specified, the component automatically loads the configuration settings specified in the configuration file specified in the CONFIGFILE property.<br>OF_AUTOSTART_ENABLED - when specified, the component automatically connects and starts monitoring data items that are specified.<br>OF_MAPVARIABLES_ENABLED - when specified, the variables listed in the variable mapping file specified in VARMAPFILE property are loaded.<br>OF_QUEUE_EVENT_ENABLED - when specified, all data received through an event are placed at the back of the data queue.<br>OF_QUEUE_API_CALLS_ENABLED - when specified, all data received on the Write API are placed at the back of the data queue.<br>OF_WAIT_FOR_DATA_RECEIVED - when specified, the component waits until an external application signals the data ready event before placing more data in the output(s).<br>OF_DELETE_OLD_QUEUE_ITEMS - when specified, data items within the data queue that have been in the data queue for a time period longer than the amount specified in the DATAOLDTIMEOUT property are purged from the data queue.<br>OF_COLLECT_DATA_ALWAYS - when specified, data items are subscribed in such a way that updates are always sent, even when the data items does not change. |
| QUEUEMAXSIZE | rgData[0] - (DWORD); specifies the maximum number of items allowed in the data queue. Items received after this maximum value is reached are ignored. |
| DATARE-<br>CEIVEDTIMEOUT | rgData[0] - (DWORD); specifies the amount of time to wait for an application to signal the data ready event. If this value is surpassed, the data in the front of the data queue is sent to the outputs. |
| DATAOLDTIMEOUT | rgData[0] - (DWORD); specifies how long data items are allowed to remain in the data queue before being purged. |
| CONFIGFILE | rgData[0] - (string); specifies the name of the file from which all auto-load configuration settings are read. |
| VARMAPFILE | rgData[0] - (string); specifies the name of the file from which all variable mappings are loaded. |
| VAR_MONI-<br>TOR_COUNT | rgData[0] - (DWORD); specifies the total number of variables to monitor. |
| VAR_MONITOR_ | rgData[0] - (string); specifies the name of the 'n'th variable to monitor. |
| VAR_READ_COUNT | rgData[0] - (DWORD); specifies the total number of variables to read. |
| VAR_READ_ | rgData[0] - (string); specifies the name of the 'n'th variable to read.<br>rgData[1] - (string); specifies the name of the 'm'th variable to monitor for which this variable is associated. |

This section describes the general component methods supported by the majority of the components. For the specific list of methods supported by any given component, see the section describing that given component.

| XMC_DE_BROWSE_GET_COUNT | |
|---|---|
| Index | 8020 |
| Data In | None |
| Data Out | rgData[0] - (number) DWORD, number of browse elements. |

The XMC_DE_BROWSE_GET_COUNT method returns the number of data items in the browse set supported by the component.

| XMC_DE_BROWSE_GET_ITEMS | |
|---|---|
| Index | 8021 |
| Data In | rgData[0] - (number) DWORD, maximum number of elements to collect. |

| XMC_DE_BROWSE_GET_ITEMS | |
|---|---|
| Index | 8021 |
| Data Out | rgData[0] - (number) number of elements collected, total number of elements will equal (rgData[0] * 2 + 1).<br>rgData[1] - (string) name of the first browse element.<br>rgData[2] - (number) adt of the first browse element.<br>rgData[1 + n*2] - (string) name of the n'th browse element.<br>rgData[2 + n*2] - (number) adt of the n'th browse element. |

The XMC_DE_BROWSE_GET_ITEMS method returns the number of data items in the browse set supported by the component.

| XMC_DE_SYSTEM_CONNECT_CMPNT | |
|---|---|
| Index | 8000 |
| Data In | rgData[0] - (number) DWORD, type of component. The type of component is a value that is server specific. For component type information, see the description for this method under each server's description.<br>rgData[1] - (string) LPTSTR, component class id as an ASCII string. |
| Data Out | None. |

The XMC_DE_SYSTEM_CONNECT_CMPNT method is used to connect one server to another so that they may interact with one another.

| XMC_DE_SYSTEM_DISCONNECT_CMPNT | |
|---|---|
| Index | 8001 |
| Data In | rgData[0] - (number) DWORD, type of component. The type of component is a value that is server specific. For component type information, see the description for this method under each server's description.<br>rgData[1] - (string) LPTSTR, component class id as an ASCII string. |
| Data Out | None. |

The XMC_DE_SYSTEM_DISCONNECT_CMPNT method is used to disconnect one server to another so that they stop interacting with one another.

| XMC_DE_DATA_PROCESS | |
|---|---|
| Index | 8063 |
| Data In | rgData[0] - (number) DWORD, number of data items input.<br>rgData[1 + n*2] - (string) LPCTSTR, name of the data item input.<br>rgData[2 + n*2] - (number or string), value of the data item. |
| Data Out | rgData[0] - (number) DWORD, number of data items output.<br>rgData[1 + n*2] - (string) LPCTSTR, name of the data item output.<br>rgData[2 + n*2] - (number) value of the data item. |

The XMC_DE_DATA_PROCESS method is called by a client to process data where a data set is input, processed in some way by the server, and then the resulting data is returned as output.

| XMC_DE_DATA_PROCESS_CONFIGURE | |
|---|---|
| Index | 8062 |
| Data In | rgData[0] - (number) DWORD, flag describing the type of data to be returned when processing data. The following flags are supported:<br>XMC_DE_READ_DATA_FLAG_TIMESTAMP - requests that the time stamp recorded when processing the data is returned.<br>NOTE: by default, the data item value is always returned. |
| Data Out | None. |

The XMC_DE_DATA_PROCESS_CONFIGURE method is used to configure what type of data is returned when processing a given data item. For example in the server may be configured to return the minimal amount of data on each read (i.e. just the data item value), or the server may be requested to return more substantial data.

| XMC_DE_DATA_READ | |
|---|---|
| Index | 8061 |
| Data In | rgData[0] - (string) LPCTSTR, name of the data item to read. |
| Data Out | rgData[0] - (number or string), data item value.<br>rgData[1] - (OPTIONAL number) DWORD, data item time-stamp as a system time value.<br>NOTE: Since the last items are optional, only those items specified when configuring the data to receive are actually sent. |

The XMC_DE_DATA_READ method is called by a client application to poll for data from the server. As used herein, the term "poll" refers to the process of continually reading a data item so that the most recent value of the data is always on hand.

| XMC_DE_DATA_READ_CONFIGURE | |
|---|---|
| Index | 8060 |
| Data In | rgData[0] - (number) DWORD, flag describing the type of data to be returned on each read. The following flags are supported:<br>XMC_DE_READ_DATA_FLAG_TIMESTAMP - requests that the time stamp recorded when reading the data is returned.<br>NOTE: by default, the data item value is always returned. |
| Data Out | None. |

The XMC_DE_DATA_READ_CONFIGURE method is used to configure what type of data is returned when reading a given data item. For example in the server may be configured to return the minimal amount of data on each read (i.e. just the data item value), or the server may be requested to return more substantial data.

| XMC_DE_DATA_WRITE | |
|---|---|
| Index | 8064 |
| Data In | rgData[0] - (number) DWORD, number of data items.<br>rgData[1 + n*2] - (string) LPCTSTR, name of the data item.<br>rgData[2 + n*2] - (number or string), value of the data item. |
| Data Out | None. |

The XMC_DE_DATA_WRITE method is used to write data to a server.

| XMC_DE_EVENT_ENABLE | |
|---|---|
| Index | 2892 |
| Data In | rgData[0] - (number) DWORD, cookie (unique identifier) associated with the subscription. This value is returned to the client when calling the subscription XMCAPI above. NOTE: using a cookie value of zero (0) will enable/disable ALL items subscribed to the server.<br>rgData[1] - (number) BOOL, TRUE to enable the subscription(s), FALSE to disable the subscription(s). Only enabled subscriptions actually fire events. |
| Data Out | None. |

The XMC_DE_EVENT_ENABLE method enables/disables a previously subscribed data item in the subscription list maintained by the server. Only enabled subscriptions actually fire.

| XMC_DE_EVENT_RECEIVE_DATA | |
|---|---|
| Index | 8045 |
| Data In | rgData[0] - (number) DWORD, subscription cookie corresponding to the subscribed data item.<br>rgData[1] - (number or string), data item value.<br>rgData[2] - (OPTIONAL number) DWORD, data item timestamp as a system time value.<br>rgData[3] - (OPTIONAL string) LPSTR, data item ASCII text name.<br>rgData[4] - (OPTIONAL number) DWORD, data item unique cookie.<br>NOTE: Since the last three items are optional, only those items specified when configuring the data to receive are actually sent. If, for example, one or more data items are NOT requested, then the items are returned in slots shifted up toward rgData[1]. For example if only the data item name is requested in addition to the default data items, the data returned would look like the following:<br>rgData[0] - (number) DWORD, subscription cookie.<br>rgData[1] - (number or string), data item value.<br>rgData[2] - (string) LPSTR, data item name. |
| Data Out | None. |

The XMC_DE_EVENT_RECEIVE_DATA method is called by the server (and implemented by the client) when each subscribed event fires.

| XMC_DE_EVENT_RECEIVE_DATA_CONFIGURE | |
|---|---|
| Index | 8044 |
| Data In | rgData[0] - (number) DWORD, flag describing the type of data to be returned on each event. The following flags are supported:<br>XMC_DE_EVENT_DATA_FLAG_TIMESTAMP - requests that the time stamp recorded when reading the data is returned.<br>XMC_DE_EVENT_DATA_FLAG_NAME - requests that the data items ASCII text name be returned.<br>XMC_DE_EVENT_DATA_FLAG_DATA_COOKIE - requests that the unique data item cookie corresponding to the read made for the data item be returned.<br>NOTE: by default, the subscription cookie and data item value are always returned. |
| Data Out | None. |

The XMC_DE_EVENT_RECEIVE_DATA_CONFIGURE method is used to configure what type of data is returned on each event that is fired. For example in the server may be configured to send the minimal amount of data on each event (i.e. subscription cookie and data item value), or the server may be requested to return more substantial data.

| XMC_DE_EVENT_SUBSCRIBE | |
|---|---|
| Index | 2890 |
| Data In | rgData[0] - (number) DWORD, flags describing the initial state of the subscription. The following flags are supported:<br>XMC_DE_EVENT_FLAG_ENABLED - subscription is immediately enabled upon subscription.<br>XMC_DE_EVENT_FLAG_DISABLED - subscription is disabled upon making the subscription. The Enable function must be called to enable the subscription.<br>rgData[1] - (number) DWORD, number of subscription criteria rules.<br>rgData[2 + (2*n)] - (number) DWORD, event condition type where the following types are supported:<br>XMC_CNC_EVENTCONDITION_DATA_CHANGE - any data changes in the data type above will trigger the event.<br>XMC_CNC_EVENTCONDITION_DATA_EQUAL<br>XMC_CNC_EVENTCONDITION_DATA_LESSTHAN<br>XMC_CNC_EVENTCONDITION_DATA_GREATERTHAN<br>XMC_CNC_EVENTCONDITION_DATA_AND<br>XMC_CNC_EVENTCONDITION_DATA_OR<br>Each of the conditions above are used in a combined manner. Where the logical condition (=, <, >) are applied for each type respectively.<br>For example, in an array that contains the following items:<br>rgData[2] = 4 (4 condition values)<br>rgData[3] = XMC_CNC_EVENTCONDITION_EQUAL<br>rgData[4] = 3.0<br>rgData[5] = XMC_CNC_EVENTCONDITION_LESSTHAN<br>rgData[6] = 3.0<br>rgData[7] = XMC_CNC_EVENTCONDITION_OR<br>rgData[8] = 1.0<br>rgData[9] = XMC_CNC_EVENTCONDITION_GREATHERTHAN<br>rgData[10] = 5.0<br>the array would be evaluated using the following logic:<br>If (DATA <= 3.0 OR DATA > 5.0) then Trigger Event<br>rgData[3 + (2*n)] - (number) double, the value for the condition. See above. |
| Data Out | rgData[0] - (number) DWORD, cookie (unique identifier) representing the subscription. |

The XMC_DE_EVENT_SUBSCRIBE method subscribes to a given data item activating the event interface when the subscription criteria are met for the data item. All subscribing components must use the IXMCDirect interface to receive events received from the server for which they are subscribed.

| XMC_DE_EVENT_UNSUBSCRIBE | |
|---|---|
| Index | 2891 |
| Data In | rgData[0] - (number) DWORD, cookie (unique identifier) associated with the subscription. This value is returned to the client when calling the subscription XMCAPI above. NOTE: using a cookie value of zero (0) will unsubscribe ALL items subscribed to the server. |
| Data Out | None. |

The XMC_DE_EVENT_UNSUBSCRIBE method removes a previously subscribed data item from the subscription list maintained by the server.

| XMC_DE_SYSTEM_INITIALIZEHW | |
|---|---|
| Index | 500 |
| Data In | None |
| Data Out | None. |

The XMC_DE_SYSTEM_INITIALIZEHW method is used to initialize any hardware systems associated with the component.

| XMC_DE_SYSTEM_SHUTDOWNHW | |
|---|---|
| Index | 501 |
| Data In | None. |
| Data Out | None. |

The XMC_DE_SYSTEM_SHUTDOWNHW method is used to shutdown any hardware systems associated with the component.

The event handler 230 component implements the following general methods listed in the General Component Methods section above.

| Method | Implemented | Not Implemented |
|---|---|---|
| XMC_DE_BROWSE_GET_COUNT | X | |
| XMC_DE_BROWSE_GET_ITEMS | X | |
| XMC_DE_DATA_PROCESS | | X |
| XMC_DE_DATA_PROCESS_CONFIGURE | | X |
| XMC_DE_DATA_READ | X | |
| XMC_DE_DATA_READ_CONFIGURE | | X |
| XMC_DE_DATA_WRITE | X | |
| XMC_DE_EVENT_ENABLE | X | |
| XMC_DE_EVENT_RECEIVE_DATA | X | |
| XMC_DE_EVENT_RECEIVE_DATA_CONFIGURE | X | |
| XMC_DE_EVENT_SUBSCRIBE* | X | |
| XMC_DE_EVENT_UNSUBSCRIBE* | X | |
| XMC_DE_SYSTEM_CONNECT_CMPNT | X | |
| XMC_DE_SYSTEM_DISCONNECT_CMPNT | X | |
| XMC_DE_SYSTEM_INITIALIZEHW | X | |
| XMC_DE_SYSTEM_SHUTDOWNHW | X | |

The following methods have special notes for this component. The XMC_DE_EVENT_SUBSCRIBE method is only needed when daisy chaining components together. The XMC_DE_EVENT_UNSUBSCRIBE method is only needed when daisy chaining components together.

The visual elements presented by the event handler 230 component, namely the event handler property pages 234, will now be described in further detail.

The example property page depicted in FIG. 19 allows the user to set-up the connection settings used to connect to the target machine from which data will be received. In addition, this property page allows the user to configure how the component is connected and starts-up when it is first run.

As shown in FIG. 19, the following user interface elements form the connection and start-up property page 320. A "target machine" field 322 identifies the target machine 222 from which data is to be received using the TARGETMACHINE method. A "connect" button 324 tests the connection with the target machine using a CONNECT method. A "disconnect" button 326 disconnects the system 224 from the target machine 222 using the DISCONNECT method.

A "map variables" check box 328 specifies whether or not to load mapped variables from a file when connecting using OPTIONS, (OF_MAPVARIABLES_ENABLED), and VARMAPFILE properties. When checked, a dialog appears allowing the user to select the file to load mapped variables from.

An "enable auto load" check box 330 specifies whether or not the auto load feature should be enabled and, when enabled, from which file to load the settings from as identified in a "file" field 332 using OPTIONS, (OF_AUTOLOAD_ENABLED), CONFIGFILE properties.

An "enable auto start" check box 334 specifies whether or not to enable auto start using OPTIONS (OF_AUTOSTART_ENABLED) properties.

Figure 20:
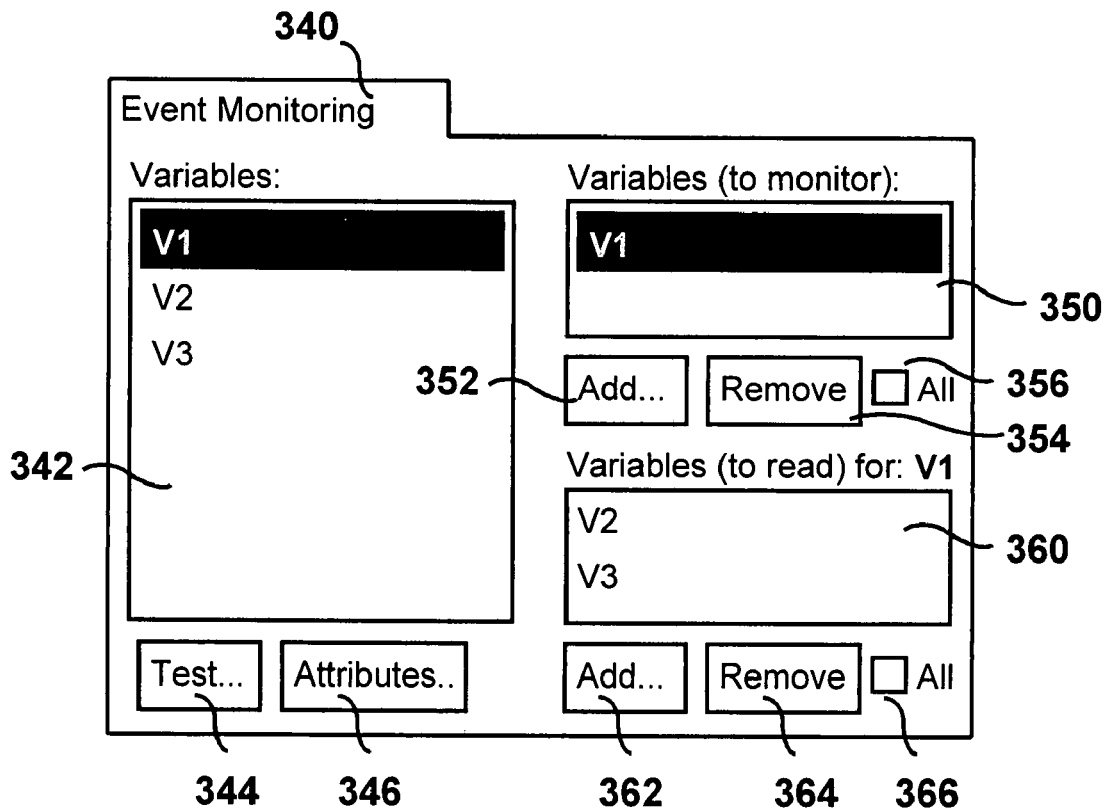
FIG. 20 depicts an example user interface screen used to configure event monitoring settings.

An event monitoring property page 340 depicted in FIG. 20 allows the user to configure which variables are to be monitored. The event monitoring property page 340 comprises the following interface elements.

A "variables" box 342 contains a list of all variables that are available for monitoring. A "test" button 344 directs the application to test a selected (highlighted) variable by reading it using a READ method. An "attributes" 346 button retrieves the attributes of the selected (highlighted) variable using the READ('attrib') method.

A "variables" (to monitor) box 350 contains a list of all variables that have been selected for monitoring using VAR_MONITOR_COUNT and VAR_MONITOR_properties.

A first "add . . . " button 352 directs the event handler 330 to add a variable from the "variable" list in the box 342 to the "variables (to monitor)" list in the box 350. A first "remove" button 354 directs the event handler 330 to remove the selected variable from the "variables (to monitor)" list in the box 350. When a first "all" check box 356 is checked, pressing the first "remove" button 354 directs the event handler 330 to remove all variables from the "variables (to monitor)" list box 350.

A "variables (to read)" box 360 contains a list of all variables that have been selected for reading using VAR_READ_COUNT and VAR_READ_properties. A second "add . . . " button 362 directs the event handler 330 to add a variable from the "variable" list in the box 342 to the "variables (to read)" list in the box 360. A second "remove" button 354 directs the event handler 330 to remove the selected variable from the "variables (to read)" list in the box 360. When a second "all" check box 366 is checked, pressing the second "remove" button 364 directs the event handler 330 to remove all variables from the "variables (to read)" list box 360.

Figure 21:
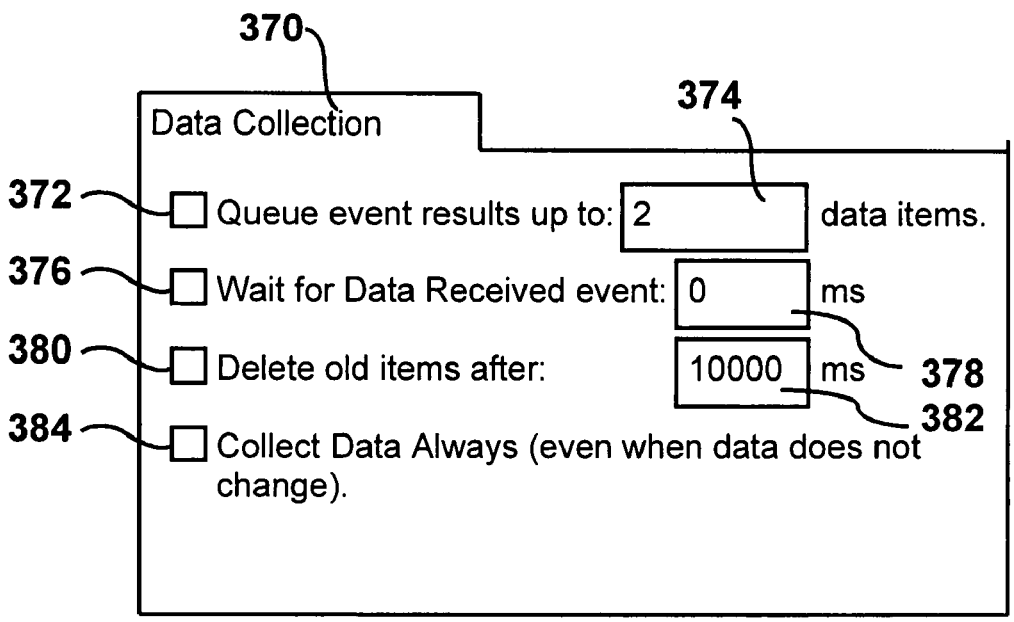
FIG. 21 depicts an example user interface screen used to configure data collection settings.

Referring now to FIG. 21, depicted therein is an example of a data collection property page 370 that allows the user to specify how the variable data is collected. The data collection property page 370 comprises the following user interface elements.

A "queue event results up to:" check box 372 and associated edit field 374 specify the maximum number of items to be placed in the optional data queue 236 using the following properties: OPTIONS (OF_QUEUE_API_CALLS_ENABLED), OPTIONS (OF_QUEUE_EVENTS_ENABLED), and QUEUEMAXSIZE.

A "wait for data received event:" check box 374 and associated edit field 374 specify the amount of time to wait for the recipient of the data to respond by signaling the data ready event using the following properties:

OPTIONS (OF_WAIT_FOR_DATA_RECEIVED) and DATARECEIVEDTIMEOUT method.

A "delete old items after:" check box 380 and associated edit field 372 specify the amount of time that data items may remain in the queue after which they are purged, using the following properties: OPTIONS (OF_DELETE_OLD_QUEUE_ITEMS) and DATAOLDTIMEOUT method.

The "collect data always" check box 384 specifies whether or not data should always be collected, even when the data does not change, using the following properties: OPTIONS (OP_COLLECT_DATA_ALWAYS).

The present invention may be embodied in forms other than those described above. The scope of the present invention should thus be determined with reference to the following claims and not the foregoing exemplary detailed description.

Appendix A

Data Types

This Appendix A contains the definitions of all special types used by the methods and properties of each component making up the example XMC Program Engine system that may form a part of the present invention.

XMC_PARAM_DATA Structure

All methods exposed by each component in the XMC Program Engine system use the standard XMC parameters set to describe data used to set and query properties as well as invoke methods. The standard parameters are in the following format:

pObj→InvokeMethod(LPXMC_PARAM_DATA rgData, DWORD dwCount);

Each element in the rgData array corresponds to a parameter, with the first element in the array corresponding to the first parameter. The XMC_PARAM_DATA structure can contain either a numerical or a string value and is defined as follows:

```
typedef struct tagXMC_PARAM-DATA
{
  LNG_PARAM_DATATYPE adt;
  union
  {
    double df;
    LPTSTR psz;
  };
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
| --- | --- |
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |
| LNG_ADT_MEM_STRING | Use this value when passing a string value via the 'psz' member of the XMC_PARAM_DATA structure. LNG_ADT_MEM_STRING denotes that the string must be freed from memory during cleanup. |
| LNG_ADT_NOP | This value is used to ignore items within the XMC_PARAM_DATA array. When specifies, this parameter is not used. |

Boolean Types

When querying and setting boolean TRUE/FALSE values, any non-zero value is considered TRUE, whereas a zero value is considered FALSE.

We claim:

1. A motion system comprising:
  a set of motion data;
  a set of motion control devices capable of storing motion data;
  a set of motion events;
  a set of text events, where at least one text event corresponds to at least one of the motion events;
  a text event source capable of generating at least one text event;
  a set of selectable first components, where each selectable first component
    is associated with at least one motion control device, and
    implements at least one first component function capable of exchanging motion data with at least one motion control device;
  a second module, where the second module
    allows the selection of at least one first component,
    calls at least one first component function implemented by at least one first component, and
    implements at least one second component function that is capable of exchanging motion data with at least one first component; and
  an event manager, where the event manager
    receives at least one text event from the text event source,
    maps at least one text event to at least one second component function, and
    causes the second module to call at least one second component function that exchanges motion data with at least one first component.

2. A system as recited in claim 1, wherein the second component is capable of calling at least one first component function to receive motion data and convert the motion data into a motion device independent motion data.

3. A system as recited in claim 1, wherein the second component converts a motion data in a motion device independent format into a motion data that is compatible with at least one first component.

4. A system as recited in claim 1, wherein at least one first component is capable of reading motion data from at least one motion control device.

5. A system as recited in claim 1, wherein at least one first component is capable of writing motion data to at least one motion control device.

6. A system as recited in claim 1, further comprising motion data that, when exchanged with at least one second component, causes at least one motion control device to move an object.

7. A system as recited in claim 1, further comprising motion data that, when exchanged with at least one second component, causes at least one motion control device to move.

8. A system as recited in claim 1, in which the text event source is an element of a user interface.

9. A system as recited in claim 1, in which the text event source is a software element within an operating system.

10. A system as recited in claim 1, further comprising a user interface that allows the selection of at least one first component.

11. A motion system comprising:
  a set of motion data;
  a set of motion control devices capable of storing motion data;
  a set of motion events;
  a set of text events, where at least one text event is associated with at least one motion event;

a text event source capable of generating at least one text event;

a set of selectable components, where each selectable component is associated with at least one motion control device, and
- implements at least one component function capable of exchanging motion data with the motion control device;

a module, where the module
- calls at least one component function implemented by at least one selectable component, and
- implements at least one module function capable of exchanging motion data with at least one selectable component; and an event manager, where the event manager
- receives at least one text event,
- maps at least one text event to at least one module function, and
- causes at least one component function to be called from the module to exchange motion data with at least one selectable component.

12. A system as recited in claim 11, wherein the module is capable of calling at least one component function to receive motion data and convert the motion data into a motion device independent motion data.

13. A system as recited in claim 11, wherein the module converts a motion device independent motion data into a motion data that is compatible with at least one selectable component and then exchanging the motion data with the at least one selectable component.

14. A system as recited in claim 11, wherein at least one selectable component is capable of reading motion data from at least one motion control device.

15. A system as recited in claim 11, wherein at least one selectable component that is capable of writing motion data to at least one motion control device.

16. A system as recited in claim 11, further comprising motion data that, when exchanged with at least one module, is capable of causing at least one motion control device to move an object.

17. A system as recited in claim 11, further comprising motion data that, when exchanged with at least one module, is capable of causing at least one motion control device to move.

18. A system as recited in claim 11, in which the text event source is an element of a user interface.

19. A system as recited in claim 11, in which the text event source is a software element within an operating system.

20. A system as recited in claim 11, further comprising a user interface that allows selection of at least one selectable component.

21. A motion system comprising:

a set of motion data;

a set of motion control devices capable of storing motion data;

a set of motion events;

a set of text events comprising at least one event descriptor that describes at least one motion event;

a text event source capable of causing the generation of at least one text base event;

a set of selectable components, where each selectable first component
- is associated with at least one motion control device, and
- implements at least one component function capable of exchanging motion data with at least one motion control device;

a module capable of
- calling at least one component function implemented by at least one selectable component,
- implementing at least one module function, and
- exchanging motion data with a software application; and an event manager capable of
- receiving at least one text event,
- mapping at least one text event to at least one module function, and
- causing at least one module function to be called from the module to exchange motion data with one of the selectable components.

22. A system as recited in claim 21, wherein the module is capable of calling at least one component function to receive motion data and convert the motion data into a motion device independent motion data.

23. A system as recited in claim 21, wherein the module is capable of converting a device independent motion data into a motion data that is compatible with at least one selectable component and then exchanging the motion data with the at least one selectable component.

24. A system as recited in claim 21, wherein at least one selectable component is capable of reading motion data from at least one motion control device.

25. A system as recited in claim 21, wherein at least one selectable component is capable of writing motion data to at least one motion control device.

26. A system as recited in claim 21, further comprising motion data that is capable of causing at least one motion control device to move an object.

27. A system as recited in claim 21, further comprising motion data that is capable of causing at least one motion control device to move.

28. A system as recited in claim 21, in which the text event source is an element of a user interface.

29. A system as recited in claim 21, in which the text event source is a software element within an operating system.

30. A system as recited in claim 21, further comprising a user interface used for the selection of at least one selectable component.

* * * * *